US012388168B2

(12) United States Patent
Parker et al.

(10) Patent No.: US 12,388,168 B2
(45) Date of Patent: Aug. 12, 2025

(54) PORTABLE ELECTRONIC DEVICE HAVING INTEGRATED ANTENNA ELEMENTS

(71) Applicant: Apple Inc., Cupertino, CA (US)

(72) Inventors: Michael R. Parker, Cupertino, CA (US); Devon K. Copeland, Cupertino, CA (US); Jody C. Fu, Cupertino, CA (US); Tyler S. Atura Bushnell, Mountain View, CA (US); Trent Canales, Roseville, CA (US)

(73) Assignee: APPLE INC., Cupertino, CA (US)

( * ) Notice: Subject to any disclaimer, the term of this patent is extended or adjusted under 35 U.S.C. 154(b) by 62 days.

(21) Appl. No.: 17/903,994

(22) Filed: Sep. 6, 2022

(65) Prior Publication Data

US 2023/0091853 A1 Mar. 23, 2023

Related U.S. Application Data

(60) Provisional application No. 63/247,674, filed on Sep. 23, 2021, provisional application No. 63/344,473, filed on May 20, 2022.

(51) Int. Cl.
*H01Q 1/27* (2006.01)
*H01Q 1/24* (2006.01)
(Continued)

(52) U.S. Cl.
CPC ............. *H01Q 1/273* (2013.01); *H01Q 1/243* (2013.01); *H01Q 1/44* (2013.01); *H01Q 13/10* (2013.01);
(Continued)

(58) Field of Classification Search
CPC .......... H01Q 1/243; H01Q 1/273; H01Q 1/44; H01Q 13/10; H01Q 13/106; H01Q 21/064
See application file for complete search history.

(56) References Cited

U.S. PATENT DOCUMENTS 4,567,318 A 1/1986 Shu
6,532,152 B1 3/2003 White et al.
(Continued)

FOREIGN PATENT DOCUMENTS

CN 102076189 5/2011
CN 202540623 11/2012
(Continued)

OTHER PUBLICATIONS

Bourchak et al., "Effect of Preheating and Post-Curing Time on the Mechanical Properties of Epoxy Resin," Advanced Composites Letters, vol. 22, Issue 5, 2013.
(Continued)

*Primary Examiner* — Ab Salam Alkassim, Jr.
(74) *Attorney, Agent, or Firm* — Brownstein Hyatt Farber Schreck, LLP

(57) ABSTRACT

Housings for electronic devices are disclosed, as well as electronic devices including the housings. A wireless communication system of the electronic device may include an antenna element within a display assembly. The antenna element within the display assembly may be operatively coupled to a conductive upper portion of the housing. The housing may define a slot between the conductive upper portion and a conductive lower portion of the housing, and a dielectric material may be positioned within the slot.

20 Claims, 23 Drawing Sheets

(51) Int. Cl.
*H01Q 1/44* (2006.01)
*H01Q 13/10* (2006.01)
*H01Q 21/06* (2006.01)

(52) U.S. Cl.
CPC ......... *H01Q 13/106* (2013.01); *H01Q 21/064* (2013.01)

(56) References Cited

U.S. PATENT DOCUMENTS

| | | | | |
|---|---|---|---|---|
| 6,625,394 | B2 | 9/2003 | Smith et al. | |
| 6,775,133 | B2 | 8/2004 | Konishi | |
| 7,271,774 | B2 * | 9/2007 | Puuri | H01Q 1/273 343/718 |
| 7,377,767 | B2 | 5/2008 | Dubuis et al. | |
| 7,684,178 | B2 | 3/2010 | Hsu et al. | |
| 7,697,281 | B2 | 4/2010 | Dabov et al. | |
| 7,713,054 | B2 | 5/2010 | Mai | |
| 7,798,804 | B2 | 9/2010 | Kmoch et al. | |
| 7,829,786 | B2 | 11/2010 | Fuerstenberg et al. | |
| 7,830,317 | B2 | 11/2010 | Yamazaki | |
| 8,191,756 | B2 | 6/2012 | Coppeta et al. | |
| 8,345,410 | B2 | 1/2013 | Ternus et al. | |
| 8,373,980 | B2 | 2/2013 | Reber | |
| 8,380,258 | B2 | 2/2013 | Kim et al. | |
| 8,506,327 | B2 | 8/2013 | Jol | |
| 8,519,286 | B1 | 8/2013 | Bloch | |
| 8,537,543 | B2 | 9/2013 | Wang et al. | |
| 8,553,907 | B2 | 10/2013 | Thomason et al. | |
| 8,620,395 | B2 | 12/2013 | Kang et al. | |
| 8,654,029 | B2 | 2/2014 | Fan et al. | |
| 8,665,160 | B2 | 3/2014 | Uttermann et al. | |
| 8,686,297 | B2 | 4/2014 | Shiu et al. | |
| 8,773,847 | B2 | 7/2014 | Byun et al. | |
| 8,878,060 | B2 | 11/2014 | Wright et al. | |
| 8,884,826 | B2 | 11/2014 | Wu et al. | |
| 8,947,303 | B2 | 2/2015 | Golko et al. | |
| 8,980,026 | B2 | 3/2015 | Ely | |
| 9,036,358 | B2 | 5/2015 | Shoji et al. | |
| 9,049,801 | B2 | 6/2015 | Rothkopf et al. | |
| 9,075,567 | B2 | 7/2015 | Mathew et al. | |
| 9,109,093 | B2 | 8/2015 | Pilliod et al. | |
| 9,146,588 | B2 | 9/2015 | Kole et al. | |
| 9,209,513 | B2 | 12/2015 | Ely et al. | |
| 9,223,349 | B2 | 12/2015 | Franklin et al. | |
| 9,229,675 | B2 | 1/2016 | Beeze et al. | |
| 9,282,657 | B2 | 3/2016 | Miyaoka et al. | |
| 9,338,909 | B2 | 5/2016 | Tanaka | |
| 9,338,910 | B2 | 5/2016 | Hattori | |
| 9,360,889 | B2 | 6/2016 | Idsinga et al. | |
| 9,408,009 | B1 | 8/2016 | Witte et al. | |
| 9,469,469 | B2 | 10/2016 | Rayner | |
| 9,516,150 | B2 | 12/2016 | Jeon et al. | |
| 9,520,638 | B2 | 12/2016 | Baringer et al. | |
| 9,537,526 | B2 | 1/2017 | Wilson et al. | |
| 9,564,677 | B2 | 2/2017 | Tian et al. | |
| 9,578,145 | B2 | 2/2017 | Chang | |
| 9,591,110 | B2 | 3/2017 | Hill et al. | |
| 9,606,579 | B2 | 3/2017 | Pakula et al. | |
| 9,629,268 | B2 | 4/2017 | Lee et al. | |
| 9,643,349 | B2 | 5/2017 | Montevirgen | |
| 9,680,206 | B2 | 6/2017 | Youn et al. | |
| 9,791,893 | B2 | 10/2017 | Yamaguchi et al. | |
| 9,795,044 | B2 | 10/2017 | Lai et al. | |
| 9,871,898 | B2 | 1/2018 | Kwong | |
| 9,907,191 | B2 | 2/2018 | Shi et al. | |
| 9,977,460 | B2 | 5/2018 | Wagman et al. | |
| 9,985,345 | B2 | 5/2018 | Ferretti et al. | |
| 10,144,000 | B2 | 12/2018 | Goyal et al. | |
| 10,158,384 | B1 | 12/2018 | Yarga et al. | |
| 10,180,702 | B2 | 1/2019 | Dabov et al. | |
| 10,191,519 | B2 | 1/2019 | Lilje | |
| 10,218,827 | B2 | 2/2019 | Hill et al. | |
| 10,264,685 | B2 | 4/2019 | Shi et al. | |
| 10,367,538 | B2 | 7/2019 | Lai et al. | |
| 10,368,456 | B2 | 7/2019 | Shinn | |
| 10,372,166 | B2 | 8/2019 | Gable et al. | |
| 10,418,693 | B2 | 9/2019 | Xu et al. | |
| 10,559,872 | B2 | 2/2020 | Hill et al. | |
| 10,617,016 | B2 | 4/2020 | Shi et al. | |
| 10,879,601 | B2 * | 12/2020 | Wu | H01Q 1/273 |
| 10,897,825 | B2 | 1/2021 | Shi et al. | |
| 11,223,105 | B2 | 1/2022 | Hill et al. | |
| 11,522,983 | B2 | 12/2022 | Bates et al. | |
| 2008/0268083 | A1 | 10/2008 | Ferenc | |
| 2009/0141436 | A1 | 6/2009 | Matsuoka et al. | |
| 2010/0230155 | A1 | 9/2010 | Hashizume et al. | |
| 2012/0041170 | A1 | 2/2012 | Benes et al. | |
| 2012/0319907 | A1 | 12/2012 | Wu et al. | |
| 2013/0235538 | A1 | 9/2013 | Hashimoto et al. | |
| 2014/0004294 | A1 | 1/2014 | Christophy et al. | |
| 2014/0023430 | A1 | 1/2014 | Prest et al. | |
| 2014/0071651 | A1 | 3/2014 | Wittenberg et al. | |
| 2014/0206420 | A1 | 7/2014 | Neichi | |
| 2014/0313086 | A1 * | 10/2014 | Montevirgen | H01Q 1/04 343/702 |
| 2014/0361945 | A1 | 12/2014 | Misra et al. | |
| 2015/0062807 | A1 | 3/2015 | Gwin et al. | |
| 2015/0167193 | A1 | 6/2015 | Demers | |
| 2015/0188215 | A1 | 7/2015 | Jarvis | |
| 2016/0006109 | A1 * | 1/2016 | Apaydin | H01Q 13/18 343/702 |
| 2016/0113113 | A1 | 4/2016 | Sethumadhavan et al. | |
| 2016/0120046 | A1 | 4/2016 | Ou et al. | |
| 2016/0261032 | A1 * | 9/2016 | Chang | H01Q 1/273 |
| 2016/0294038 | A1 * | 10/2016 | Lo | H01Q 1/48 |
| 2017/0048991 | A1 * | 2/2017 | Kim | G04G 17/04 |
| 2017/0069956 | A1 | 3/2017 | Hill et al. | |
| 2017/0308123 | A1 | 10/2017 | McClure et al. | |
| 2017/0347470 | A1 | 11/2017 | Seo et al. | |
| 2018/0004247 | A1 * | 1/2018 | Liu | H01Q 13/10 |
| 2018/0026341 | A1 | 1/2018 | Mow et al. | |
| 2018/0081400 | A1 | 3/2018 | Pandya et al. | |
| 2018/0128924 | A1 * | 5/2018 | Wu | H01Q 1/38 |
| 2018/0129170 | A1 * | 5/2018 | Yun | H01Q 1/273 |
| 2018/0261921 | A1 * | 9/2018 | Ha | H01Q 9/42 |
| 2018/0262226 | A1 * | 9/2018 | Erentok | H04B 1/385 |
| 2018/0287248 | A1 * | 10/2018 | Han | H01Q 1/48 |
| 2018/0309194 | A1 * | 10/2018 | Wang | H01Q 1/273 |
| 2019/0254185 | A1 | 8/2019 | Cater et al. | |
| 2020/0014098 | A1 | 1/2020 | Xu et al. | |
| 2020/0026108 | A1 | 1/2020 | Metin et al. | |
| 2020/0044316 | A1 * | 2/2020 | Ruaro | H01Q 1/243 |
| 2020/0068054 | A1 * | 2/2020 | Kim | H01Q 5/378 |
| 2020/0073445 | A1 | 3/2020 | Kuna et al. | |
| 2020/0099138 | A1 * | 3/2020 | Garrido Lopez | H01Q 9/0407 |
| 2020/0221002 | A1 | 7/2020 | Akana et al. | |
| 2020/0249724 | A1 | 8/2020 | Myers et al. | |
| 2020/0365974 | A1 * | 11/2020 | Wei | H01Q 9/42 |
| 2021/0096515 | A1 * | 4/2021 | Ruaro | G04G 21/04 |
| 2022/0024182 | A1 | 1/2022 | Liao et al. | |
| 2022/0085843 | A1 | 3/2022 | Bloom et al. | |
| 2022/0115770 | A1 | 4/2022 | Hill et al. | |
| 2023/0198129 | A1 | 6/2023 | Hill et al. | |
| 2023/0421196 | A1 | 12/2023 | Bloom et al. | |
| 2024/0387984 | A1 * | 11/2024 | Marin | G04R 60/06 |
| 2025/0068130 | A1 * | 2/2025 | Verdonk | G04R 60/06 |

FOREIGN PATENT DOCUMENTS

| | | |
|---|---|---|
| CN | 111052502 | 4/2020 |
| EP | 1225652 | 7/2002 |
| EP | 2838157 | 2/2015 |
| WO | WO2020/055377 | 3/2020 |

OTHER PUBLICATIONS

Domun et al., "Improving the fracture toughness and the strength of epoxy using nanomaterials—a review of the current status," Royal Society of Chemistry, Nanoscale, 7, pp. 10294-10329, 2015.

* cited by examiner

PORTABLE ELECTRONIC DEVICE HAVING INTEGRATED ANTENNA ELEMENTS

CROSS-REFERENCE TO RELATED APPLICATION(S)

This application is a nonprovisional application of and claims the benefit of U.S. Provisional Patent Application No. 63/247,674, filed Sep. 23, 2021 and titled "Portable Electronic Device Having Integrated Antenna Elements," and U.S. Provisional Patent Application No. 63/344,473, filed May 20, 2022 and titled "Portable Electronic Device Having Integrated Antenna Elements," the disclosures of which are hereby incorporated herein by reference in their entireties.

FIELD

The described embodiments relate generally to housings for electronic devices and electronic devices including the housings. More particularly, the present embodiments relate to an electronic device including an antenna element within a display assembly which is operatively coupled to a conductive upper portion of the housing.

BACKGROUND

Some electronic devices include internal antennas and other electronics that can be used to conduct wireless communication. When the electronic device includes an antenna inside a housing that is formed from a metal material, the conductive nature of the metal material may interfere with signal transmission from the antenna.

The systems and techniques described herein are directed to electronic devices that include a conductive housing that is configured to facilitate operation of an antenna.

SUMMARY

Some embodiments are directed to an electronic device having a wireless communication system that includes an antenna element within the display assembly and an antenna element defined by the housing. Each of these antenna elements may be a resonating antenna element. The two resonating antenna elements may be operably coupled during operation of the wireless communication system. Such a wireless communication system may be particularly useful for electronic devices having relatively small housings, such as wearable electronic devices.

In embodiments, the housing defines an upper conductive portion, a lower conductive portion, and a slot positioned between the upper and lower portions. The housing may further include a dielectric portion positioned within the slot. The upper conductive portion defines a resonating antenna element of the housing. In some cases, the two resonating antenna elements may be operably coupled by conductively coupling the upper conductive portion of the housing to the resonating antenna element of the display.

In some embodiments, the slot (with the dielectric portion) may be configured to operate as a radiating element of the wireless communication system. In some cases, the slot is oriented so that a long direction of the slot extends across at least one side of the housing. In additional cases, the long direction of the slot extends across two more sides of the housing.

The wireless communication system includes a feed and a ground. In embodiments, the feed is coupled to at least one of the resonating antenna element of the display or the resonating antenna element of the housing, which is the upper conductive portion of the housing. The feed may be coupled to one or more of a transmitter, a receiver, or a transceiver. The ground may be coupled to the lower conductive portion of the housing.

The disclosure provides an electronic device comprising a display assembly comprising a first antenna element of a wireless communication system, a cover positioned over the display assembly, and a housing. The housing defines an upper conductive portion, the upper conductive portion defining a second antenna element of the wireless communication system, the second antenna element operably coupled to the first antenna element, a lower conductive portion, a slot defined between the upper conductive portion and the lower conductive portion of the housing, and a dielectric portion positioned at least partly within the slot.

The disclosure also provides an electronic device comprising a display assembly comprising a display component and a first antenna element, a front cover positioned over the display assembly, and a housing. The housing comprises a housing member formed from a conductive material, the housing member defining an upper portion at least partly surrounding the front cover and defining a second antenna element and a lower portion. The housing further comprises a dielectric member positioned at least partially within a slot defined between the upper portion and the lower portion. The electronic device further comprises a wireless communication circuit operably coupled to the first antenna element and the second antenna element and configured to transmit wireless signals along a region of the housing including the slot.

In addition, the disclosure provides an electronic device comprising a display assembly comprising a circuit assembly comprising a first antenna element of a wireless communication system, a housing, and a cover positioned over the display assembly. The housing defines an upper conductive portion defining a second antenna element of the wireless communication system, a lower conductive portion, a conductive bridge portion connecting the upper and the lower conductive portions, the conductive bridge portion, the upper conductive portion, and the lower conductive portion defining a slot. The housing further comprises a dielectric portion positioned at least partially within the slot.

BRIEF DESCRIPTION OF THE DRAWINGS

The disclosure will be readily understood by the following detailed description in conjunction with the accompanying drawings, wherein like reference numerals designate like elements.

Figure 1:
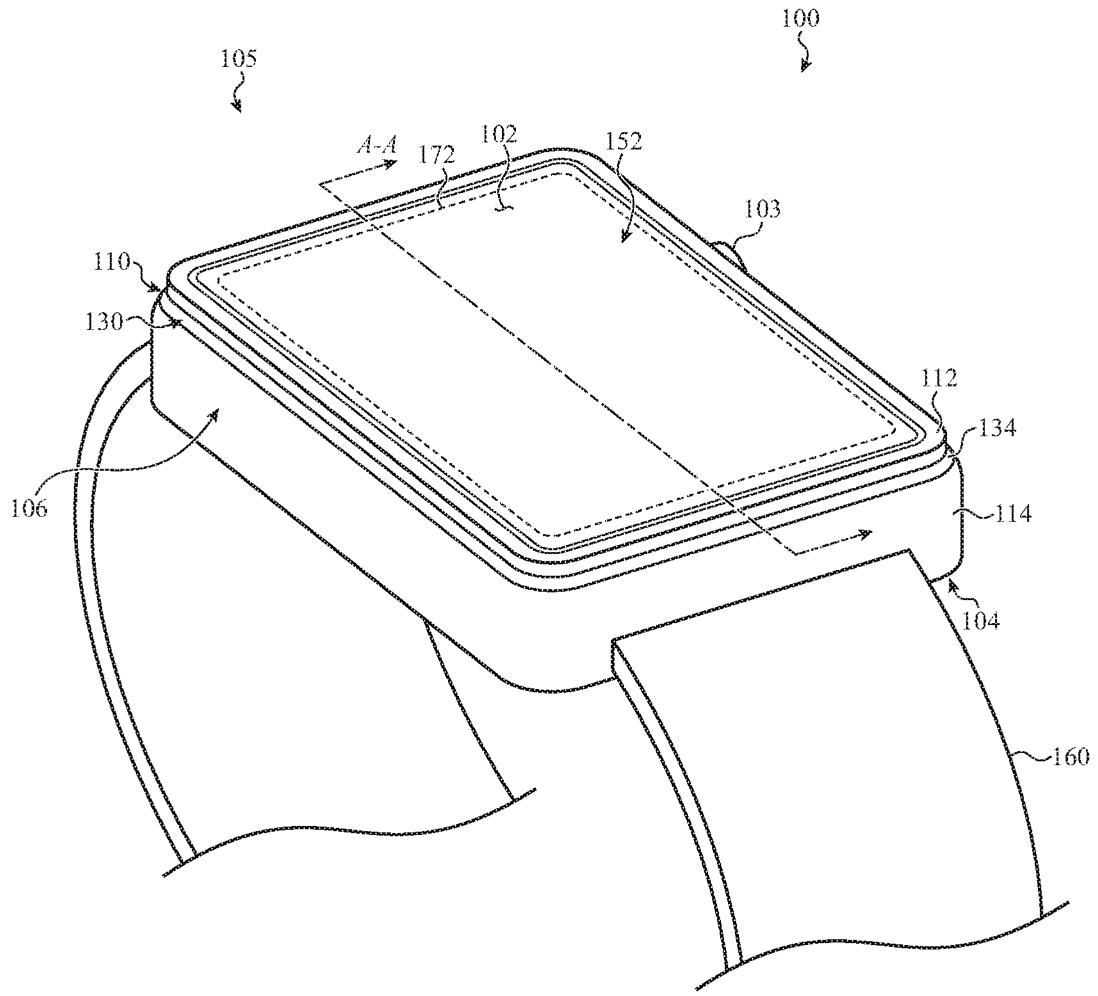
FIG. 1 shows a view of an example electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Some embodiments are directed to an electronic device having a wireless communication system that includes an antenna element within the display assembly and an antenna element defined by the housing. Each of these antenna elements may be a resonating antenna element. The two resonating antenna elements may be operably coupled during operation of the wireless communication system. Such a wireless communication system may be particularly useful for electronic devices having relatively small housings, such as wearable electronic devices.

In embodiments, the housing defines an upper conductive portion, a lower conductive portion, and a slot positioned between the upper and lower portions. The housing may include a dielectric portion positioned within the slot. The upper conductive portion defines a resonating antenna element of the device. The upper portion may also define a top surface of the housing and may at least partially surround a side surface of a cover positioned over the display assembly. The lower portion may define a bottom surface of the housing and may define one or more openings, which may accommodate input members such as a button and/or a dial.

In some embodiments, the opening or slot (filled with the dielectric portion) may be configured to operate as a radiating element of the wireless communication system. In some cases, the slot is oriented so that a long direction of the slot extends across at least one side of the housing. In additional cases, the long direction of the slot extends across two more sides of the housing.

The display assembly may be disposed within an internal cavity defined by the housing. In some cases, the two resonating antenna elements may be operably coupled by conductively coupling the upper conductive portion of the housing to the resonating antenna element of the display. In some cases, the display assembly includes a display component and a circuit assembly, and the circuit assembly includes the resonating antenna element of the display. When the resonating antenna element of the display is included in a circuit assembly, the circuit assembly may be conductively coupled to the resonating antenna element of the housing. If desired, an electrically insulating element may be included in the electronic device to maintain antenna performance as discussed in more detail with respect to FIGS. 1, 2B, and 16-21.

The wireless communication system includes a wireless communication circuit. A feed and a ground of the wireless communication system may be coupled to the wireless communication circuit. In embodiments, the feed is coupled to at least one of the resonating antenna element of the display or the resonating antenna element of the housing, which is the upper conductive portion of the housing. The feed may be coupled to one or more of a transmitter, a receiver, or a transceiver. The ground is coupled to the lower conductive portion of the housing.

The electronic devices described herein can provide several advantages. For example, the electronic devices described herein do not rely on a substantial gap between the housing and a display assembly for operation of the wireless communication system. The size of the display can therefore be enlarged when this gap is reduced. As an additional example, forming a radiating element in the housing can provide a radiating element having a length that can extend around a substantial portion of the periphery of the housing. When the electronic device has a relatively small housing, this radiating element can have a length suitable for frequency signals on the order of 1 GHz.

In some embodiments, the electronic device may be configured to maintain the performance of the electronic device when the device is submerged or subjected to wet environmental conditions. In some cases, ingress of a conducting fluid like water into a gap (alternately, void) between an interior surface of the housing and one or more internal components of the device can change the electrical properties of one or more device systems, which may result in a change in a performance of a wireless communication system and/or a sensor system of the device. To help reduce the impact of moisture or liquid ingress, the electronic device may include an electrically insulating element configured to maintain dielectric insulation between internal and external components of the electronic device. As described in greater detail below, the electrically insulating element may maintain the operation of one or more antenna(s) of a wireless communication system by maintaining dielectric insulation between a conductive portion of the housing and an internal component of the wireless communication system that is operable coupled to the conductive portion of the housing. In additional examples, the electrically insulating element may maintain the operation of one or more sensor systems of the electronic device by maintaining dielectric insulation between a conductive portion of the housing and an internal component of the sensor system that is operably coupled to the conductive portion of the housing. In some cases, the conductive portion of the housing may form an electrode or a terminal for the sensor system. In some examples, the sensor system is a health monitoring or biosensor system that may be configured to measure a physical state or condition of a user at least in part through physical contact between a user and the electrode or terminal defined by the conductive portion of the housing. The sensor system may be an electrocardiogram (ECG) sensor system, a heart rate sensor system, a galvanic skin response system, a bioimpedance sensor system, or the like.

These and other embodiments are discussed below with reference to FIGS. 1-22. However, those skilled in the art will readily appreciate that the detailed description given herein with respect to these figures is for explanatory purposes only and should not be construed as limiting.

FIG. 1 shows a view of an example electronic device or simply "device" 100. For the purposes of this disclosure, the device 100 may be a portable electronic device including, for example, a wearable electronic device (e.g., a watch or other wrist-worn device), a health monitor device, a mobile phone, a tablet computer, a portable computer, a portable music player, a portable terminal, a wireless charging device, a device accessory, or other portable or mobile device. In some cases, the electronic device 100 may be a watch sometimes referred to as an electronic watch or a smartwatch.

The electronic device 100 includes an enclosure 105. The enclosure includes a housing 110 and a front cover 152. The front cover 152 is positioned over a display assembly 172. The enclosure may also include a rear cover, as shown in the cross-section view of FIG. 2A and the rear cover may be positioned over a sensing panel. The device 100 defines an exterior including a front surface 102, a rear surface 104, and a side surface 106. In the example of FIG. 1, the device 100 has an exterior that defines four sides, each of which may define a side surface. The electronic device also includes an input device 103, which may be a dial having an outer surface configured to receive a rotary input. A band 160 is attached to the housing 110 and configured to secure the electronic device 100 to a user.

Figure 3:
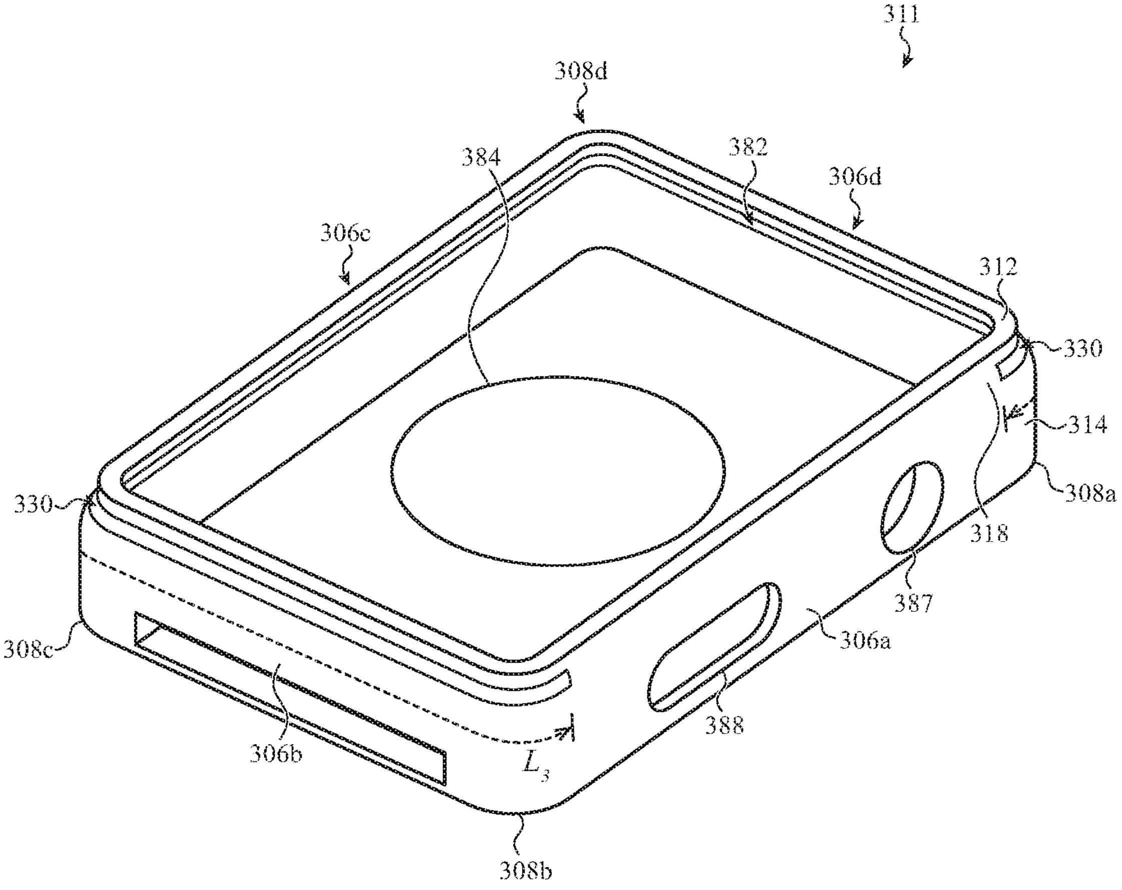
FIG. 3 shows a view of an example conductive housing member.

In the example of FIG. 1, the housing 110 includes an upper portion 112, a lower portion 114, and a dielectric portion 134. In embodiments, each of the upper portion 112 and the lower portion 114 is conductive (and may also be referred to as an upper conductive portion 112 and a lower conductive portion 114). For example, each of the upper portion 112 and the lower portion 114 may be formed of a conductive material. In some cases, the conductive material comprises one or more metals and, in some cases, may be an iron-based alloy (such as steel), a titanium-based alloy, an aluminum-based alloy, a magnesium-based alloy, or the like. In some examples, the upper portion 112 and the lower portion 114 may form a unitary housing member in combination with a bridge portion of the housing, as shown in the example of FIG. 3. In these examples, the upper portion 112, the lower portion 114, and the bridge portion may be formed from a single piece of material.

The housing 110 defines a slot 130 between the upper portion 112 and the lower portion 114. The slot 130 may also be referred to herein as an opening. The slot 130 is positioned on at least one side 106 of the electronic device and may therefore also be referred to as a side slot. As shown in FIG. 1, the dielectric portion 134 of the housing 110 is positioned within the slot 130 and substantially fills the slot 130. For reference, FIG. 3 shows an example of a conductive housing member 311 prior to filling the slot 330 with a dielectric material. The slot 130 of FIG. 1 is "closed" in the sense that the perimeter of the slot is surrounded on all sides by other portions of the housing.

Figure 2A:
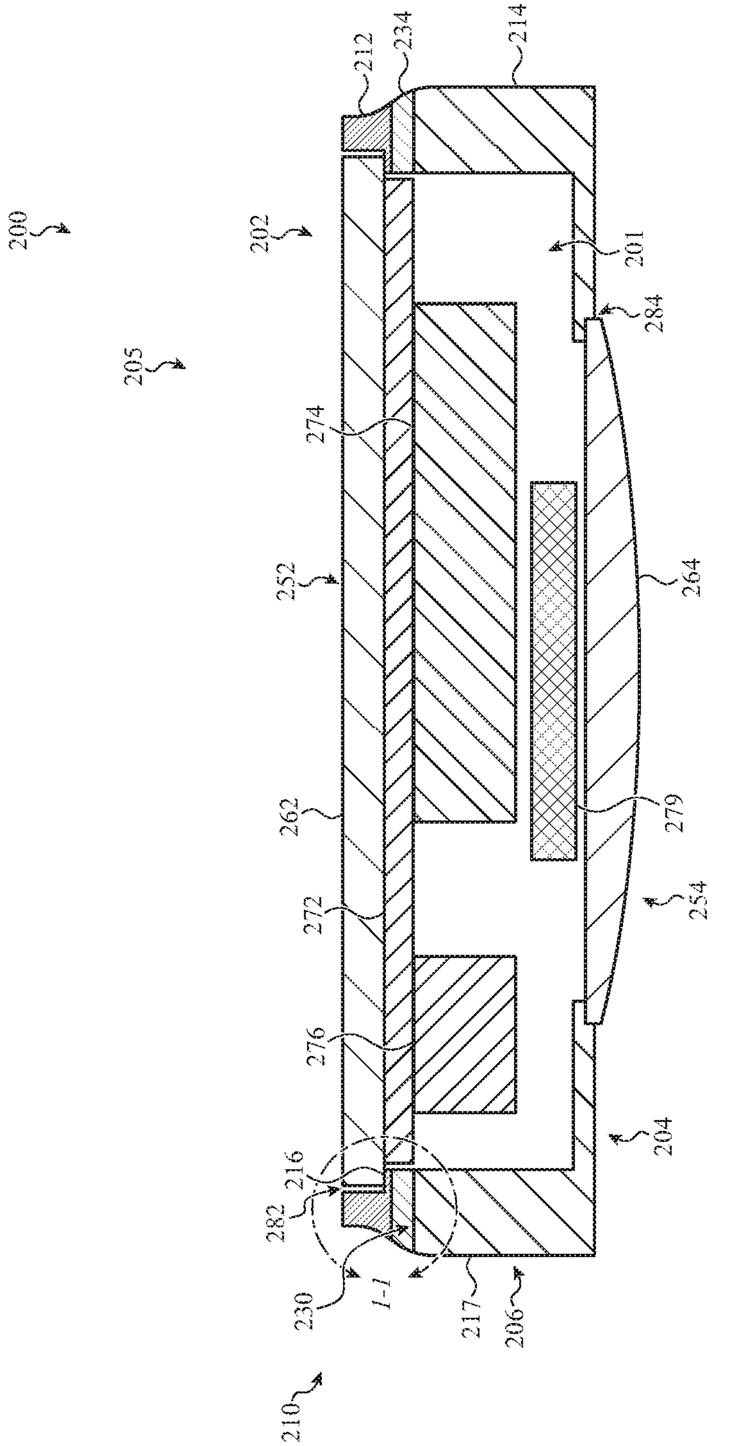
FIG. 2A shows an example cross-sectional view of an electronic device.
Figure 2B:
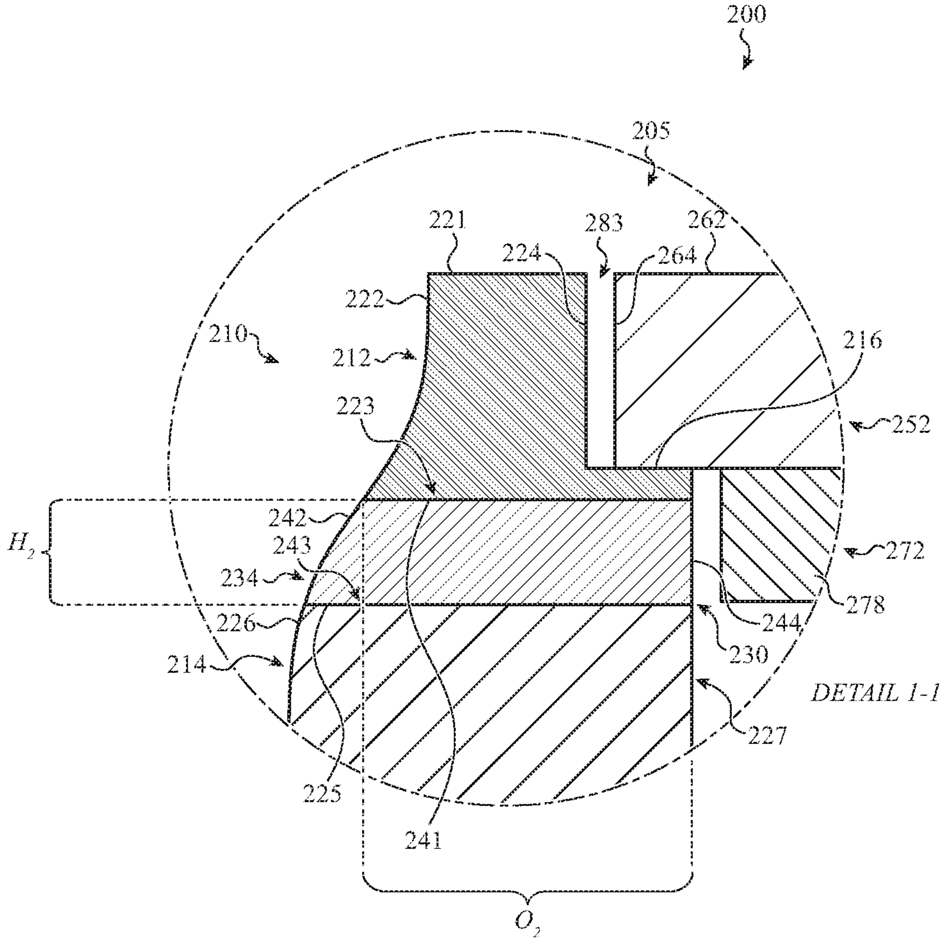
FIG. 2B shows a detail view of an electronic device.

The dielectric portion 134 of the housing 110 may be formed of a (solid) dielectric material such as a polymer, silica, a ceramic material such as zirconia, alumina and/or titanium dioxide, or a combination thereof (e.g., a composite of particles of silica and/or a ceramic in a polymer matrix). The additional description of suitable dielectric materials provided with respect to FIGS. 2A and 2B is applicable to FIG. 1 and is not repeated here. The dielectric portion 134 may be bonded to the upper portion 112 and the lower portion 114. The bonding of the dielectric portion 134 to the upper portion 112 and the lower portion 114 may be enhanced by surface modification of and/or formation of one or more retention features (also referred to as interlock features) on the upper portion 112 and/or the lower portion 114 as described further with respect to FIGS. 10A, 10B, and 13-15. Retention features may take a variety of forms, such as a protrusion, a depression or groove, a hole, an angled surface, a stepped surface, and the like. In some cases, a dielectric portion such as the dielectric portion 134 may extend around a retention feature and in some cases may encapsulate a retention feature.

In embodiments, the front cover 152 is substantially transparent or includes one or more substantially transparent portions over the display assembly 172. For example, the transmission may be at least 80%, 85%, 90%, or 95% over a visible wavelength range (e.g., the visible spectrum). The front cover 152 may be formed of a glass, a glass ceramic, a ceramic (such as sapphire), or combinations thereof. In addition, the front cover 152 may be formed of one or more layers of a glass, a glass ceramic, a ceramic (such as sapphire), a polymer, or combinations thereof. In addition, an exterior coating and/or an interior coating may be disposed on the front cover 152. Examples of exterior coatings include, but are not limited to, smudge-resistant (e.g., oleophobic) and anti-reflective coatings. Examples of interior coatings include, but are not limited to, masking layers. In some cases, the front cover 152 may be part of a cover assembly that includes a mounting frame which is coupled to an interior and/or side surface of the cover 152 and to the enclosure component 110. The front cover 152 (in combination with any exterior surface coatings) may at least partially define a front surface 102 of the device.

The device 100 may also include a rear cover (e.g., rear cover 254 of FIG. 2A). In some embodiments, the rear cover is positioned over a sensing panel (e.g., a rear-facing sensing panel) of the device 100. As discussed in more detail with respect to FIG. 2A, the sensing panel may include one or more optical modules and the rear cover may be configured to transmit light in one or more frequencies used by the optical modules. In additional embodiments, the rear cover may define one or more openings positioned over one or more of the optical modules and windows may be placed over the openings. The rear cover may be formed of a glass, a glass ceramic, a ceramic (such as sapphire), or combinations thereof. In addition, the rear cover may be formed of one or more layers of a glass, a glass ceramic, a ceramic (such as sapphire), a polymer, or combinations thereof. In addition, an exterior coating and/or an interior coating may be disposed on the rear cover. Examples of exterior coatings include, but are not limited to, smudge-resistant (e.g., oleophobic) and anti-reflective coatings. Examples of interior coatings include, but are not limited to, masking layers. The rear cover (in combination with any exterior surface coatings) may at least partially define a rear surface 104 of the device.

The display assembly 172 may be disposed within the internal cavity. The dashed lines in FIG. 1 indicate a periphery of the display assembly 172. The display assembly 172 may be configured to produce graphical output which is transmitted through a substantially transparent portion of the front cover 152. The display assembly 172 may include a display component such as a pixel definition layer, a touch sensitive layer, and the like. As examples, the display component may include one or more layers of a liquid-crystal display (LCD), a light-emitting diode (LED) display, an LED-backlit LCD display, an organic light-emitting diode (OLED) display, an active layer organic light-emitting diode (AMOLED) display, and the like. In some cases, the display assembly 172 includes a touch sensitive layer. A display component including both a display layer and a touch sensitive layer may be referred to as a touch sensitive display component (or simply as a touch sensitive display). The display assembly may also include a display control circuit. In some embodiments, the display assembly 172 may be attached to (or may abut) the front cover 152.

In embodiments, the display assembly 172 also includes a first antenna element of a wireless communication system. In some cases, the first antenna element may be a resonating antenna element and may therefore also be referred to as a first resonating antenna element or as a display resonating antenna element. The first antenna element 278 is indicated in the detail view of FIG. 2B and the description provided with respect to FIGS. 2A and 2B is generally applicable herein.

Figure 9:
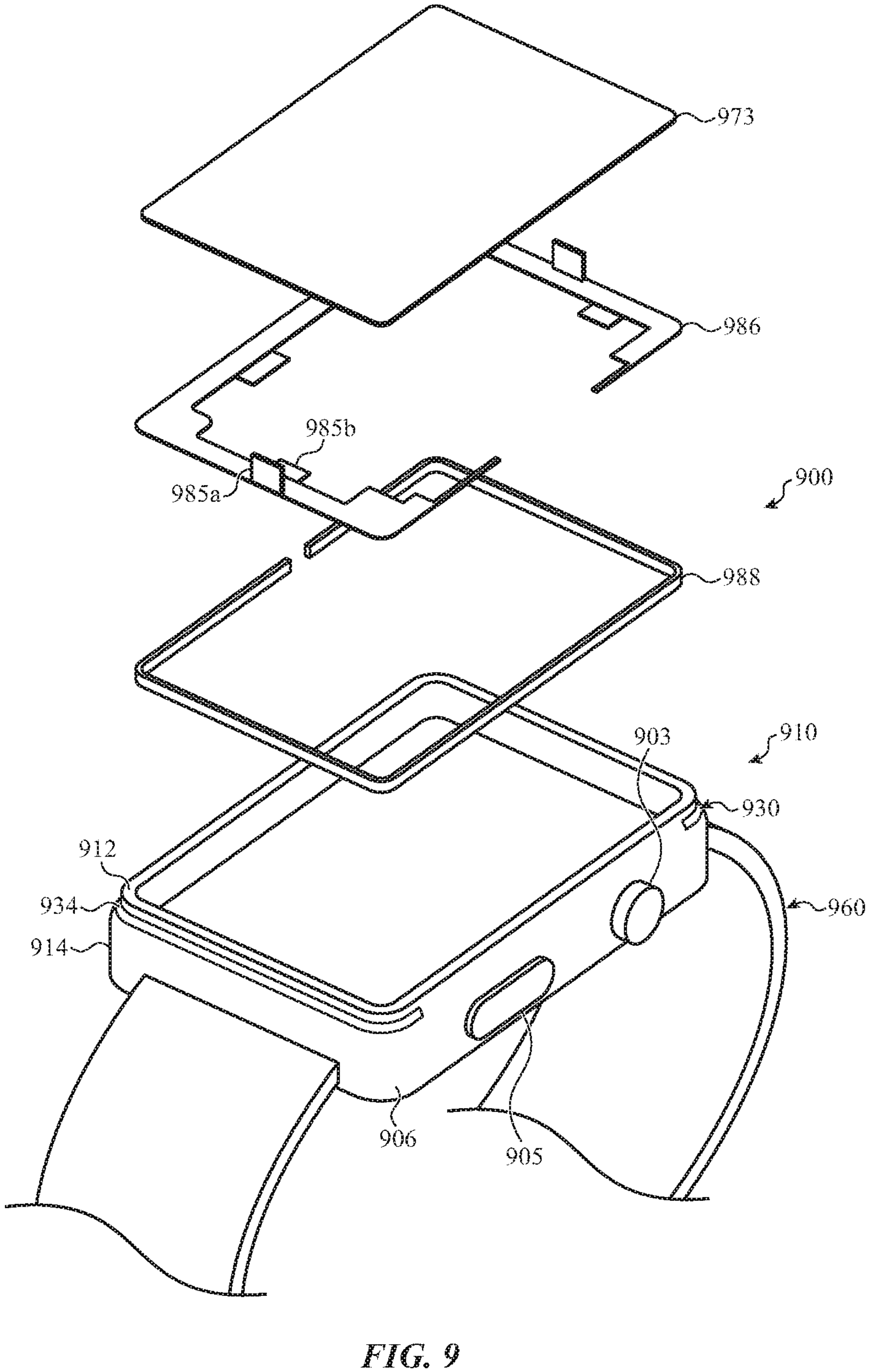
FIG. 9 shows a partial exploded view of an example electronic device.

In embodiments, the first antenna element may comprise one or more conductive elements (alternately, structures) in the display assembly. In some cases, one or more of the conductive elements may be a dedicated or separate element of the display assembly. Alternatively, one or more of the conductive elements may not be a dedicated or separate element of the display and may be time-multiplexed or otherwise operated in a fashion that allows it to serve multiple functions, as an antenna and as an operational element of the display. In some examples, the antenna element is formed by a functional electrode layer or existing conductive layer of the display assembly. In some embodiments, the display assembly comprises a circuit assembly (e.g., 973 of FIG. 9) and the circuit assembly comprises the first antenna element. The conductive elements may be provided on a dielectric substrate of the circuit assembly, such as a circuit board. The additional discussion of the circuit assembly 973 provided with respect to FIG. 9 is generally applicable herein and is not repeated here.

In some embodiments, the housing 110 defines a second antenna element of the wireless communication system. In some cases, the second antenna element may be a resonating antenna element and may therefore also be referred to herein as a second resonating antenna element or as a housing resonating antenna element. In additional embodiments, the conductive upper portion 112 of the housing defines the second antenna element. The first antenna element may be operatively coupled to the second antenna element. For example, the first antenna element may be conductively coupled to the second antenna element (e.g., the conductive upper portion 112 of the housing 110). When the first antenna element is included in a circuit assembly, the circuit assembly may be conductively coupled to the second antenna element (e.g., the conductive upper portion 112 of the housing 110). In embodiments, connections between the display assembly and the upper portion of the housing are made at a plurality of discrete locations, such as from 2 to 10 locations, from 3 to 10 locations, from 4 to 10 locations, or from 4 to 8 locations. The lower portion 114 of the housing 110 may define an antenna ground.

In embodiments, the wireless communication system includes a feed and a ground. In some embodiments, the feed is coupled to at least one of the first antenna element or the second antenna element. For example, the feed may include a positive feed terminal coupled to at least one of the first antenna element or the second antenna element (e.g., the conductive upper portion 112 of the housing 110). In this example, the positive feed terminal may also be coupled to one or more of a transmitter (alternately, an emitter), a receiver, or a transceiver. In additional embodiments, an electrical ground (e.g., a system ground, also referred to as a ground reference potential or simply as a ground) is coupled to the antenna ground defined by the housing (e.g., the conductive lower portion 114). In some cases, an antenna ground within the display assembly is also coupled to the ground, such as through a ground feed terminal of the feed. The more detailed description of location of the feed(s) and ground(s) of the wireless communication system provided with respect to FIGS. 4A through 7C is generally applicable herein and is not repeated here. The display assembly 172 may be coupled to the upper portion 112 of the housing 110 in a variety of ways and the description of coupling arrangements provided with respect to FIGS. 10A through 15 is generally applicable herein.

As previously mentioned, both the first antenna element and the second antenna element may resonate during operation of the wireless communication system. The antenna element(s) of the wireless communication system may be configured to resonate at one or more desired frequencies or within one or more desired frequency ranges. In some cases, the wireless communication system may be a radio-frequency communication system. As examples, the antenna element(s) of the wireless communication system may be configured to resonate in a frequency range that includes a frequency of about 1.2 GHz, such as from about 0.6 GHz to about 10 GHz or from about 1 GHz to about 9 GHz. In additional examples, the antenna element(s) of the wireless communication system may be configured to resonate in one or more of frequency ranges or bands described herein.

Wireless communication protocols and standards may include established protocols and standards such as IEEE 802.11x, GSM, LTE, CDMA, TDMA, 3G, 4G, 5G, Bluetooth, Bluetooth Low Energy (BLE), ISO/IEC 18000-3, Wi-Fi, Radio-frequency identification (RFID), Near-Field Communication (NFC), Global Positioning System (GPS) or any other target wireless communication protocol or standard (including yet-to-be-developed protocols and/or standards).

In some embodiments, the slot 130 (with the dielectric portion 134) may be configured to operate as a radiating element of the wireless communication system. As shown in the example of FIG. 1, the slot 130 is oriented so that a long direction of the slot 130 is aligned with a lateral dimension of the housing 110. In addition, the slot 130 and the dielectric portion 134 extend across at least two of the four sides defined by the housing 110. The example of FIG. 1 is not limiting and in additional embodiments a housing may include a plurality of openings and one or more of these openings may be configured to operate as a radiating element for an antenna, as shown in the examples of FIGS. 6A to 7C.

In some embodiments, the electronic device may be configured to maintain the performance of the electronic device when the device is submerged or subjected to wet environmental conditions. In some cases, ingress of a conducting fluid like water into a gap (alternately, void) between an interior surface of the housing and one or more internal components of the device can change the electrical properties of the system, which may result in a change in a performance of the antenna or other electronic components of the device. To help reduce the impact of moisture or liquid ingress, the electronic device may include an electrically insulating element configured to maintain the dielectric insulation between components or otherwise maintain the operation of the antenna(s) of the device. In some embodiments, the electrically insulating element(s) may be configured to help to electrically isolate an electrically conducting region or component of the housing by providing an insulating layer and/or by preventing ingress of the fluid into a portion of the gap or other opening. In some implementations described in more detail herein, the electrically insulating element may be positioned between the conductive lower portion of the housing and a connector component transmitting a signal to or from an antenna element of the wireless communication system. Alternately or additionally, the electrically insulating element may be positioned between the conductive upper and lower portions of the housing. FIGS. 16-20 show examples of a variety of electrically insulating elements, which include, but are not limited to, an electrically insulating gasket positioned within the gap and an electrically insulating material disposed over the electrically conducting region of the housing. The description provided with respect to FIGS. 16-20 is generally applicable herein and is not repeated here.

In additional implementations, the electrically insulating element may maintain the operation of one or more sensor systems of the electronic device by maintaining dielectric insulation between a conductive portion of the housing and an internal component of the sensor system that is operably coupled to the conductive portion. In some cases, the conductive portion of the housing may form an electrode or a terminal for the sensor system. For example, the conductive upper portion of the housing may form an electrode or a terminal for the sensor system. As previously discussed, the sensor system may be a health monitoring or biosensor system, such an electrocardiogram (ECG) sensor system, a heart rate sensor system, a galvanic skin response system, a bioimpedance sensor system, or the like. The sensor system may be configured to measure a physical state or condition of a user through physical contact between the user, the electrode, or the terminal, which may occur through the user wearing the electronic device or simply touching the electrode or terminal.

Figure 22:
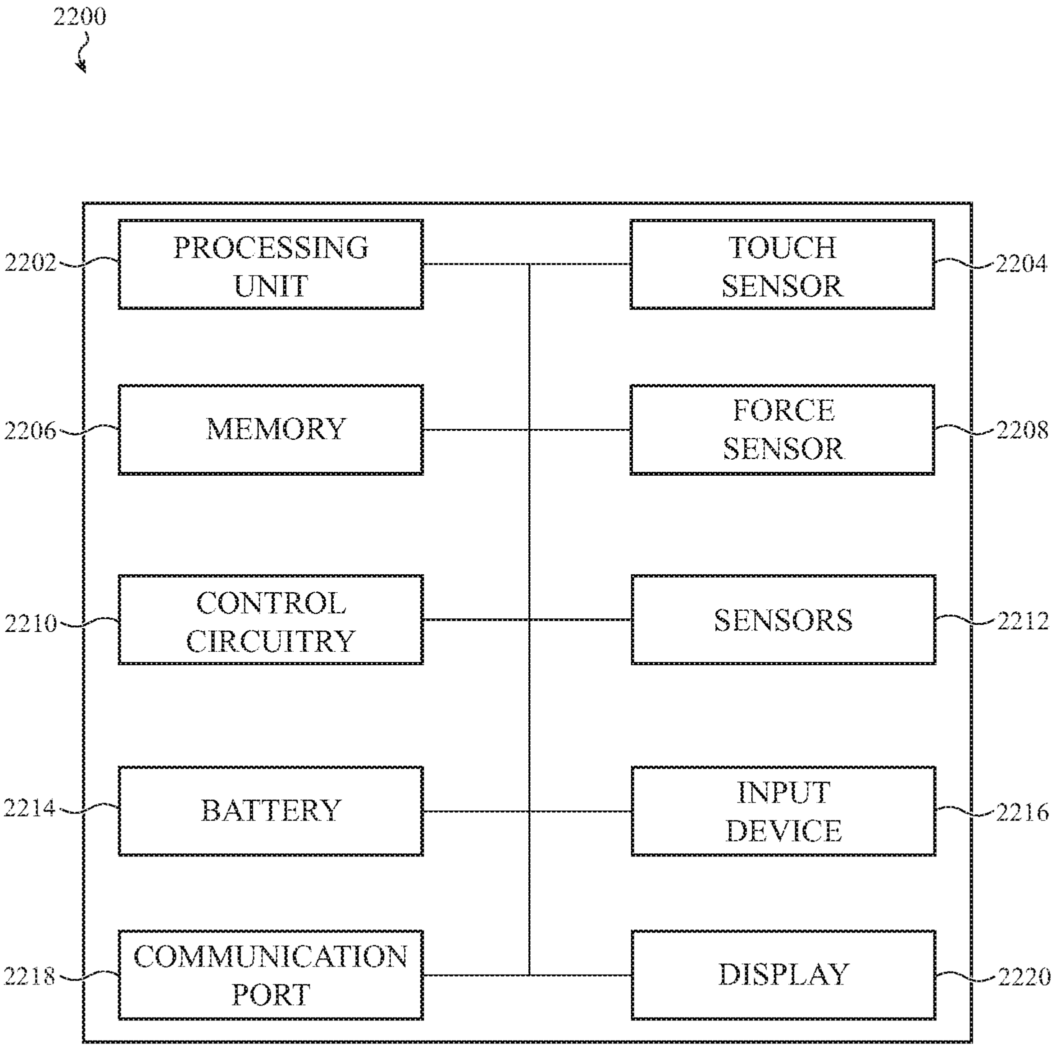
FIG. 22 shows a block diagram of a sample electronic device.

The device 100 may include one or more electronic components in addition to the display assembly 172. For example, the device 100 may include at least one of a receiver, a transmitter, or a transceiver of the wireless communication system and may also include a wireless communication circuit. More generally, these additional components may comprise one or more of a processing unit, control circuitry, memory, an input/output device, a power source (e.g., battery), a charging assembly (e.g., a wireless charging assembly), a network communication interface, an accessory, and a sensor. Components of a sample electronic device are discussed in more detail below with respect to FIG. 22 and the description provided with respect to FIG. 22 is generally applicable herein.

In the example of FIG. 1, the electronic device 100 includes a crown module which includes the input member 103. The crown module may be positioned at least partially within an aperture formed in a side of the housing 110. The input member 103 may have an outer surface configured to receive a rotary user input. In addition, the input member 103 may provide an electrode for a biosensor within the electronic device 100. For example, the input member 103 may include an electrode which can be used for taking an electrocardiogram. The housing 110 can form one or more other electrodes for taking the electrocardiogram or a conductive terminal may be formed on the housing to serve as the other electrode. The input member may be offset with respect to a centerline of the housing 110 as described in more detail with respect to FIG. 3.

The electronic device 100 may also comprise a sensing panel, as shown in FIG. 2A. The sensing panel may include one or more sensor assemblies. For example, the one or more sensor assemblies may be one or more health monitoring sensor assemblies or biosensor assemblies, such an electrocardiogram (ECG) sensor, a photoplethysmogram (PPG) sensor, a heart rate sensor, a pulse oximeter or other oxygen sensor, or other bio-sensor. The additional description of sensors, sensor assemblies, and sensing panels provided with respect to FIGS. 2A and 22 is generally applicable herein.

In some cases, an internal device component is configured to receive radio frequency (RF) signals. For example, the RF signals may be in a frequency range from about 0.6 GHz to about 10 GHz or from about 1 GHz to about 9 GHz. The frequency range may be a "low band" frequency range (e.g., less than 1 GHz, such as about 400 MHz to less than 1 GHz, about 600 MHz to about 900 MHz, or 600 MHz to 700 MHz), a "mid-band" frequency range (e.g., about 1 GHz to about 6 GHz, such as about 1 GHz to about 2.6 GHz, about 2 GHz to about 2.6 GHz, about 2.5 GHz to about 3.5 GHz, or about 3.5 GHz to about 6 GHz), or a "high-band" frequency range (e.g., about 24 GHz to about 40 GHz, about 57 GHz to about 64 GHz, or about 64 GHz to about 71 GHz). In addition, wireless charging ranges may broadly be from about 80 kHz to about 300 kHz or from about 110 kHz to about 205 kHz. In some cases, the housing may comprise a dielectric housing component configured to provide a "window" for an RF transmitter, an RF receiver, and/or an RF transceiver. For example, the RF transmitter, the RF receiver, and/or the RF transceiver may be part of a wireless communication system or a wireless charging system.

FIG. 2A shows an example cross-sectional view of an electronic device. The device 200 may be an example of the electronic device 100 and the cross-section may be taken along A-A. FIG. 2B is a detail view of the device 200 of FIG. 2A in area 1-1.

The electronic device 200 includes a housing 210, a front cover 252, and a rear cover 254. The housing 210, the front cover 252, and the rear cover 254 may together be referred to as an enclosure 205. The device 200 defines a front surface 202, a rear surface 204, and a side surface 206. The housing 210 may also define an internal cavity 201 and a front opening 282 and a rear opening 284 to the internal cavity. The electronic device 200 also includes a display assembly 272 positioned within the internal cavity 201 and under the front cover 252. The display assembly 272 includes a first antenna element 278 (see FIG. 2B) and also includes a display component.

The first antenna element 278 may be a resonating antenna element. The location of the first antenna element 278 shown in FIG. 2B is exemplary rather than limiting. In some examples, the antenna element is formed by a functional electrode layer or existing conductive layer of the display assembly, as previously discussed with respect to FIG. 1. In embodiments, the first antenna element 278 may extend substantially across a lateral area of the display assembly or may be localized to a smaller area, such as near a corner or a side of the housing or centrally within the display assembly. The description provided with respect to the display assembly 172 and conductive coupling of antenna elements of the display assembly to other elements of the wireless communication system is applicable to the display assembly 272 and is not repeated here.

In the example of FIGS. 2A and 2B, the housing 210 includes a conductive upper portion 212 and a conductive lower portion 214. The upper portion 212 at least partially surrounds a side surface 264 of the front cover 252. The upper portion 212 of the housing 210 also defines a second antenna element of a wireless communication system, which may be a resonating antenna element.

Figure 10A:
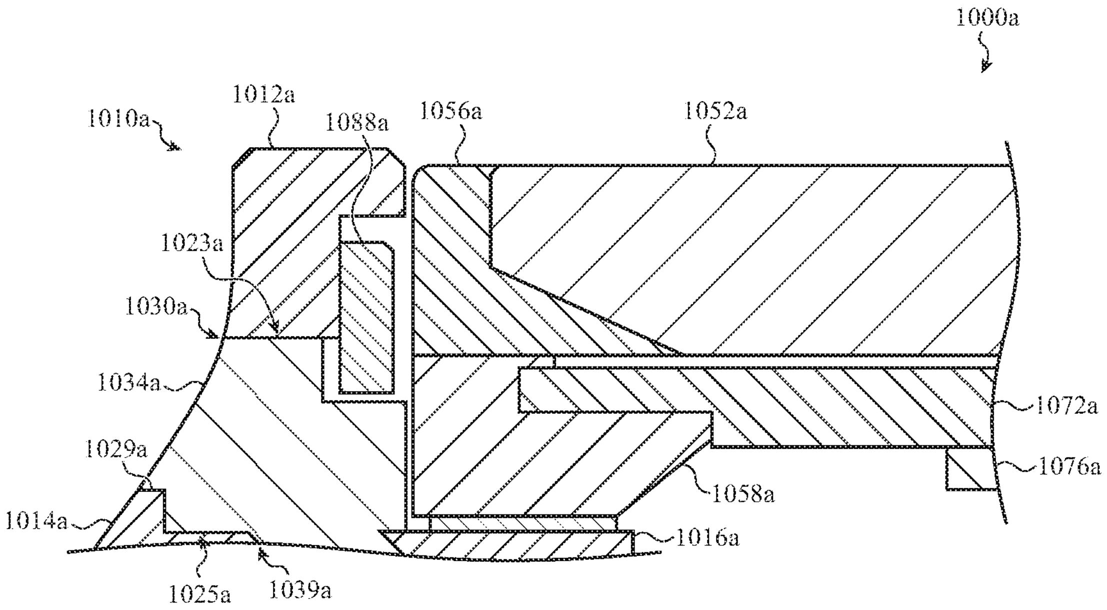
FIG. 10A shows an example of a partial cross-sectional view of an electronic device.
Figure 10B:
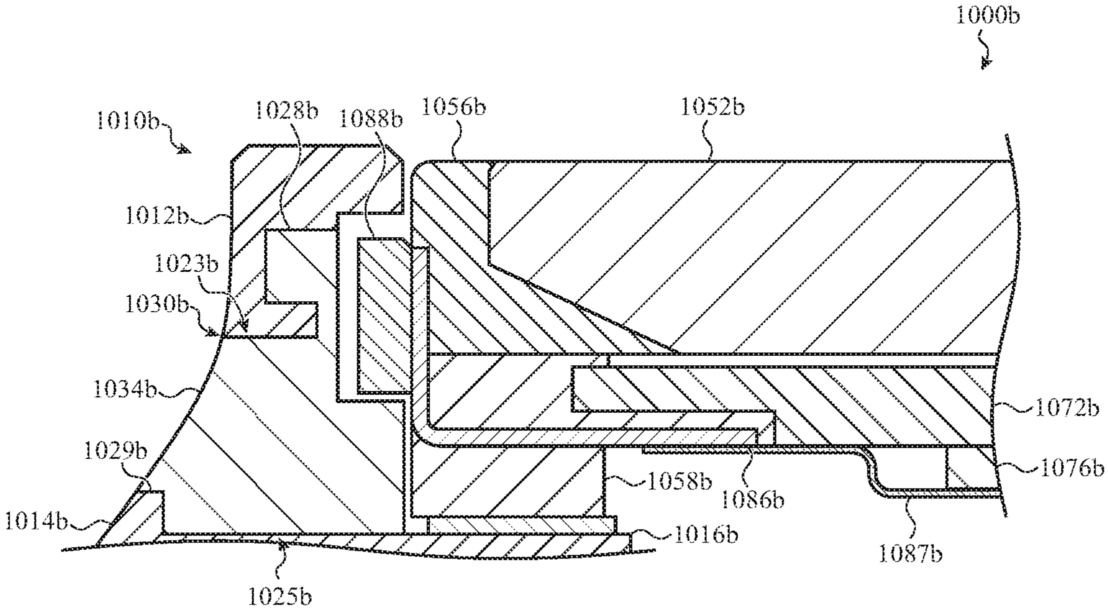
FIG. 10B shows another example of a partial cross-sectional view of an electronic device.

The housing 210 defines a slot 230. The slot 230 is positioned on at least a side surface 217 of the housing 210 and may therefore also be referred to as a side slot. The slot is positioned between the upper portion 212 and the lower portion 214. A dielectric portion 234 of the housing 210 is positioned within the slot 230 and may substantially fill the slot 230. This dielectric portion 234 may also be referred to herein as a dielectric member. In some cases, the dielectric portion 234 may extend beyond the slot 230 and into the interior cavity 201, as shown in the examples of FIGS. 10A and 10B. An example of a slot which has not yet been filled with a dielectric material (other than air) is shown in FIG. 3. The description provided with respect to the housing 110, the upper portion 112, the lower portion 114, the slot 130, the dielectric portion 134, and connective coupling of feed(s) and ground(s) to portions of the housing 110 is applicable to the housing 210, the upper portion 212, the lower portion 214, the slot 230, the dielectric portion 234, and connective coupling of feed(s) and ground(s) to portions of the housing 210 and is not repeated here.

In some embodiments, the slot 230 is configured to operate as a radiating element of the wireless communication system. In some cases, the slot 230 (with the dielectric 234) is configured to radiate electromagnetic radiation at a particular frequency and/or in a particular frequency range. For example, the desired frequency range may be from about 1 GHz to about 9 GHz. The length of the slot may be configured so that the slot radiates at one or more desired frequencies. For example, the length of the slot may be one half of a desired wavelength of electromagnetic radiation (e.g., about 150 mm to about 17 mm). The slot 230 may be oriented so that a long direction of the slot 230 is aligned with a lateral dimension of the housing 210, as was previously shown in FIG. 1 and is also shown in FIGS. 3 through 7C. The slot 230 may extend across multiple sides of the housing as shown in the examples of FIGS. 1 and 3 through 7C.

In additional embodiments, the slot 230 may be configured to define a minimum gap height and/or a minimum overlap between the edges 223 and 225. As shown in the detail view of FIG. 2B, the slot 230 is defined by a surface 223 of the upper portion 212 and by a surface 225 of the lower portion 214. The surfaces 223 and 225 may also be referred to herein as edge surfaces or simply as edges. The edge surface 223 is separated from the edge surface 225 by a distance referred to herein as a gap height $H_2$. As shown in FIG. 2B the gap height $H_2$ is substantially uniform but this example is not limiting and in additional examples the gap height $H_2$ between the surfaces 223 and 225 may vary, as shown in FIGS. 10A, 10B and 13 to 15. The slot may therefore be configured to have a minimum gap height. By the way of example, the gap height, which may in some cases be a minimum gap height, may be from about 1 mm to about 2 mm, from about 1.25 mm to about 2 mm, or from about 1 mm to about 1.75 mm. In some cases, these gap height values may refer to averaged minimum gap height values.

The edge surface 223 may face at least a portion of the edge surface 225 and defines an overlap with the edge surface 225. The upper portion 212 and the lower portion 214 may be configured to define a minimum overlap $O_2$. By the way of example, the minimum overlap may be from 1.0 mm to 2.5 mm or from 1.25 mm to 2.25 mm.

The upper portion 212 may define a front (or upper) surface 221, a side surface 222, an edge surface 223, and an interior surface 224, as shown in the detail view of FIG. 2B. The edge surface 223 may correspond to the lower surface of the upper portion 212. FIG. 2B also shows the side surface 226, the edge surface 225, and the interior surface 227 of the lower portion 214. The edge surface 225 may correspond to the upper surface of the lower portion 214. In the example of FIGS. 2A and 2B, the upper portion 212 defines an internal ledge 216 that supports the front cover 252. In some cases, the upper portion 212 or the lower portion 214 may define an internal ledge which can support the front cover 252, the display assembly 272, or both as shown in the examples of FIGS. 10A through 15.

In some embodiments, the upper portion 212 and the lower portion 214 may differ in height and/or thickness. In the example of FIGS. 2A and 2B, the upper portion 212 has a height less than a height of the lower portion 214 (e.g., as measured from the upper surface 221 to the edge surface 223). In the example of FIGS. 2A and 2B, the upper portion 212 is generally thinner than the lower portion 214, except at the ledge 216 (e.g., as measured from the side surface 222 to the interior surface 224).

The dielectric portion 234 may substantially fill the slot 230 and in some cases may extend beyond the slot, as previously discussed. In other words, in some cases the dielectric portion is thicker than the upper portion 212, the lower portion 214, or both. When the dielectric portion 234 is thicker than an adjacent portion of the housing it can provide support to the adjacent portion of the housing. The dielectric portion may define an upper surface 241, a side surface 242 (also referred to as an exterior surface), a lower surface 243, and an interior surface 244. The upper surface 241 may define an interface with the edge surface 223 and the lower surface 243 may define an interface with the edge surface 225. The upper surfaces 241 and 243 of the dielectric portion 234 may be bonded to the edge surfaces 223 and 225, respectively.

In embodiments, each of the conductive upper portion 212 and the conductive lower portion 214 includes or is formed of a conductive material. In some cases, the (electrically) conductive material comprises one or more metals and, in some cases, may be an iron-based alloy (such as steel), a titanium-based alloy, an aluminum-based alloy, a magnesium-based alloy, or the like. In some examples, the conductive upper portion 212 and the conductive lower portion 214 may form a unitary conductive housing member (also, component) in combination with a conductive bridge portion of the housing, as shown in FIG. 3. In these examples, the upper portion 212, the lower portion 214, and the bridge portion may be formed from a single piece of material.

The dielectric portion 234 may be formed of one or more solid dielectric materials such as a polymer, a ceramic, or a composite of these. Suitable thermoplastic polymers include, but are not limited to, polyester-based polymers such as a polyethylene terephthalate-based polymer or a polybutylene terephthalate-based polymer. Suitable thermoset polymers include, but are not limited to, epoxy-based polymers or polyurethane-based polymers. In some cases, the dielectric material of the dielectric portion may have a dielectric constant (also referred to as the relative permittivity) ranging from 1.5 to 4, from 2 to 4, or 2.5 to 3.5 at a desired frequency range or over a desired frequency range. The description of suitable dielectric materials provided herein is not limited to the example of FIGS. 2A and 2B but is generally applicable herein.

The housing 210 may be configured to help prevent separation of the upper portion 212, the lower portion 214, and the dielectric portion 234 in the event of impact to the housing. For example, the material(s) used to form the dielectric portion may have mechanical properties which provide impact resistance to the housing. In some cases, bonding between the dielectric portion 234 and the upper portion 212 and the lower portion 214 may be enhanced by surface modification of the edge surfaces 223 and 225 and/or formation of retention features (also referred to as interlock features) on the upper portion 212 and/or the lower portion 214. For example, a retention feature may have the form of a recess, a protrusion, and/or an angled portion on a surface of the upper portion 212, the lower portion 214, or both. In some cases, a retention feature may be formed on the edge 223, the edge 225, or both. Alternatively or additionally, a retention feature may be formed along an interior surface of the upper portion 212 and/or the lower portion 214 and the dielectric portion may extend along this interior surface and into and/or around the retention feature. Alternatively or additionally, extension of the dielectric portion beyond the slot 230 and along an interior surface of one or more of the upper portion 212 or the lower portion 214 may help provide structural integrity to the housing 210 even when the interior surface does not define a retention feature. The additional description of retention features provided with respect to FIGS. 10A, 10B, and 13 to 15 is generally applicable herein and not repeated here.

In some cases, a gap is present between an interior surface of the housing 210 and one or more internal components of the device. In the example of FIG. 2B, the interior surface 224 of the upper portion 212 of the housing 210 and the side surface 264 of the front cover 252 partly define a gap 283 (also referred to as a void 283). In this example, the ledge 216 defines a bottom of the gap 283. In additional examples, the gap may extend deeper into the housing and may be defined by additional portions of the housing and/or additional internal components of the electronic device. As examples, an interior surface of the dielectric portion and/or a frame around the display assembly may at least partially define the gap, as shown in the examples of FIGS. 16-20.

In the example of FIG. 2B, the electronic device 200 may not require that an interposing electrically insulating element be provided within the gap 283 in order to prevent liquid or moisture from interfering with the operation of the antenna. However, the front cover 252 is typically coupled to the internal ledge 216 in order to restrict any liquid that may enter the gap 283 from moving deeper into the device.

As previously discussed, in additional examples the electronic device may include an electrically insulating element that is configured to reduce an impact on electrical performance due to a conductive fluid entering the gap. In embodiments, the electrically insulating element(s) may be configured to shield, insulate, encapsulate, or otherwise cover at least a portion of an interior surface of the housing. FIGS. 16-20 show examples of electronic devices including such an electrically insulating element, which may also be referred to herein as an interposing element or a sealing element. In some cases, the electrically insulating element is formed of a dielectric material, such as a polymer material and/or a polymer composite material. The following description of such electrically insulating elements, including the description provided with respect to FIGS. 16-20, is generally applicable herein.

In the example of FIGS. 2A and 2B, the front surface 221 of the housing 210 is substantially flush with a front surface 262 of the cover 252. In additional examples, the front surface 221 may be proud of the front surface 262 of the cover, as shown in FIGS. 10A through 15. In some examples, the front surface 221 defines a plane or a planar region and the plane or planar region is substantially parallel to a plane defined by the front surface 262 of the cover 252. In some examples, the dielectric portion may be positioned closer to the front surface 221 than to the rear surface of the housing.

In the example of FIGS. 2A and 2B, the side surface 222 of the upper portion 212, the side surface 242 of the dielectric portion, and the side surface 226 of the lower portion 114 define a substantially smooth and continuous region of the side surface 206. For example, the side surfaces 222, 226, and 242 may be co-machined to produce the substantially smooth and continuous region of the side surface 206. In some embodiments, the side surfaces 222, 226, and 242 need not be completely flush with one another, as shown in FIG. 2B. In the example of FIG. 2B, the side surface 226 and part of the side surface 242 is proud of the side surface 222.

In some embodiments, the side surface 222 of the upper portion 212 defines a contour which differs from a contour defined by the side surface 226 of the lower portion 214. For example, the side surface 222 may define a contour that includes a first region that is substantially perpendicular to a planar region of the front surface 221 of the housing 210 (and/or a plane defined by the front surface 262 of the cover 252). For example, this first region may define a first angle ranging from about 85 degrees to 100 degrees with respect to a planar region of the front surface 221 of the housing 210 (and/or a plane defined by the front surface 262 of the cover 252). The contour of the side surface 222 may also include a second region that defines a second angle that is greater than the first angle and that is obtuse with respect to a planar region of the front surface 221 of the housing 210 (and/or a plane defined by the front surface 262 of the cover 252). The second region may be positioned closer to the slot 230 than the first region. The side surface 226 of the lower portion 214 may define a variety of contour shapes. For example, a contour of the side surface 226 may include a region near the slot 230 that defines an obtuse angle with respect to a plane defined by the front surface 262 of the cover 252. This obtuse angle may be greater than the obtuse angle defined by the side surface 222 near the slot. The side surface 242 of the dielectric portion 234 may define a contour which provides a transition between the contours defined by the side surfaces 222 and 226. In some cases, the contour defined by the side surface 242 may be concave (e.g., as shown in FIG. 10A).

In embodiments, the front cover 252 is substantially transparent or includes one or more substantially transparent portions over the display assembly 272. The front cover 252 defines a front surface 262 and a side surface 264 (see FIG. 2B). In the example of FIGS. 2A and 2B, the front surface 262 is generally planar. However, this example is not limiting and in additional examples the front surface may define a curved contour. In the example of FIGS. 2A and 2B, the side surface 264 is generally planar. However, this example is not limiting and in additional examples the side surface may include one or more rounds and/or chamfers as shown in the examples of FIGS. 10A to 15. The front surface 262 of the front cover 252 (in combination with any exterior surface coatings) partially defines a front surface 102 of the device. The front cover 252 may be similar to the front cover 152 in terms of materials, dimensions, and other properties and, for brevity, that description is not repeated here.

As shown in FIG. 2A, the rear cover 254 is positioned over a sensing panel 279 (e.g., a rear-facing sensing panel) of the device 200. The sensing panel may include one or more optical modules as discussed in more detail below. Therefore, the rear cover may be configured to transmit light in one or more frequencies used by the optical modules. In additional examples, the rear cover 254 may define one or more openings positioned over one or more of the optical modules and windows may be placed over the openings. The rear cover 254 may be similar to the rear cover described with respect to device 100 in terms of materials and dimensions and, for brevity, that description is not repeated here.

The rear cover 254 defines a rear surface 264. As shown in FIG. 2A, the rear surface 264 defines a convex outer contour. In additional examples, the rear surface 264 may be substantially planar (also referred to as flat). The rear surface 264 (in combination with any exterior surface coatings) partially defines a rear surface 204 of the device, as shown in FIG. 2A.

The electronic device 200 comprises a sensing panel 279. The sensing panel 279 may include one or more sensor assemblies. For example, the one or more sensor assemblies may be one or more health monitoring sensor assemblies or biosensor assemblies, such as an electrocardiogram (ECG) sensor, a photoplethysmogram (PPG) sensor, a heart rate sensor, a pulse oximeter or other oxygen sensor, or other bio-sensor. In some cases, a sensor assembly is configured to illuminate the tissue of the user wearing the device and then measure light that is transmitted back to the device.

In some embodiments, the sensing panel 279 includes a biosensor assembly which includes one or more emitter modules and one or more receiver modules. For example, a heart rate biosensor may include an emitter module which produces a visible light signal (e.g., green light) and which produces an infrared light signal. As another example, a pulse oximetry biosensor (e.g., an $SpO_2$ sensor) may include an emitter module which produces an optical signal over a wavelength range at which the absorption of oxygenated hemoglobin and deoxygenated hemoglobin is different (e.g., red light) and which produces an optical signal over a wavelength range at which the absorption of oxygenated hemoglobin and deoxygenated hemoglobin is similar (e.g., green light or infrared light). The biosensor assembly may include a chassis positioned below the rear cover 254 and the emitter module(s) and receiver module(s) may be attached to the chassis.

The electronic device 200 may further include a crown module which may include an input member as previously described with respect to FIG. 1. The input member may be offset with respect to a centerline of the housing 210 between the front surface 221 and the rear surface. The additional description of the crown module and the input member provided with respect to FIG. 1 is generally applicable herein and is not repeated here.

The internal components 274 and 276, shown schematically in FIG. 2A, may be one or more of a wireless communication component such as a transmitter, a receiver, or a transceiver. Alternately or additionally, the internal components 274 and 276 may be one or more of a processing unit, control circuitry, memory, an input/output device, a power source (e.g., battery), a charging assembly (e.g., a wireless charging assembly), a network communication interface, an accessory, and a sensor. Components of a sample electronic device are discussed in more detail below with respect to FIG. 22 and the description provided with respect to FIG. 22 is generally applicable herein.

FIG. 3 shows a view of an example housing member for an electronic device. The housing member 311 is a unitary structure that defines four sides (306*a*, 306*b*, 306*c*, and 306*d*) and four transitions between the sides (308*a*, 308*b*, 308*c*, and 308*d*). These transitions may also be referred to as corners herein. The housing member 311 may be a simplified example of a housing member included in the electronic device 100, 200, or any other electronic device described herein. The housing member 311 may also be referred to herein as a housing component.

The housing member 311 defines a slot 330 (which may also be referred to herein as an opening). The slot 330 is positioned on at least one side of the housing member 311 and may therefore also be referred to as a side slot. As previously described with respect to FIGS. 2A and 2B, the housing member 311 may be a conductive housing member and the slot 330 may be configured to radiate electromagnetic radiation at a particular frequency and/or in a particular frequency range. The length of the slot, $L_3$, may be configured so that the slot radiates at one or more desired frequencies. For example, the length of the slot may be one half of a desired wavelength of electromagnetic radiation. The example of FIG. 3 is not limiting and in additional embodiments a housing may include a plurality of slots, one or more of which may be configured to operate as a radiating element for an antenna, as shown in the examples of FIGS. 5A to 7C.

In the example of FIG. 3, the slot 330 extends across three of the sides and onto the fourth side so that all four of the sides and all four of the corners define the slot. The slot 330 may also be configured to define a minimum gap height and/or a minimum overlap between the edges defining the slot, as previously described with respect to FIGS. 2A and 2B. The additional description provided with respect to FIGS. 2A and 2B with respect to slot dimensions and frequency ranges is generally applicable herein and is not repeated here. The example of FIG. 3 is not limiting and in additional embodiments a slot may extend across a fewer number of sides and/or may vary in shape, as shown in the examples of FIGS. 5A to 7C.

The housing member 311 comprises an upper portion 312, a lower portion 314, and a bridge portion 318 and these three portions of the housing member define the slot 330. In some cases, the conductive housing member 311 may be formed from a single piece of material. In the example of FIG. 3, the bridge portion is located on only one side 306*a* of the housing member 311, but in additional embodiments the housing member may define multiple bridge portions, such as in the examples of FIGS. 5B and 6B.

The housing member 311 also defines additional openings. For example, the housing member 311 defines a front opening 382 and a rear opening 384. In addition, the housing member defines a side opening 387 and a side opening 388, each of which may accommodate input members. For example, the side opening 387 may accommodate an input member for a crown module and the side opening 388 may accommodate a button input member. The example of FIG. 3 is not limiting, and the housing member may define additional side openings or other openings as desirable.

Figure 4A:
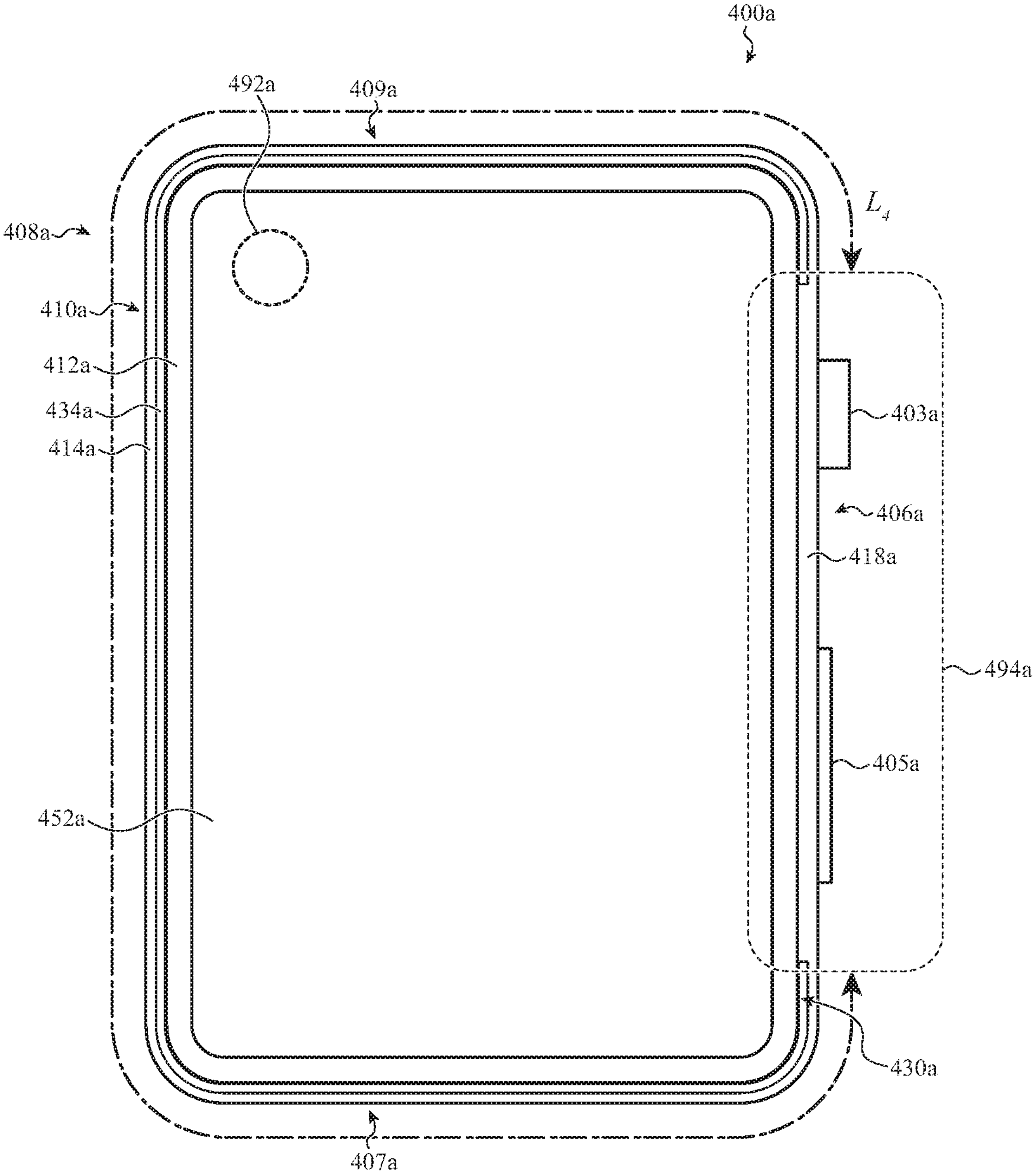
FIGS. 4A and 4B show top views of example electronic devices.

FIG. 4A shows a top view of an example electronic device. The electronic device 400*a* may be an example of the device 100 of FIG. 1. The electronic device 400*a* includes a housing 410*a* and a front cover 452*a* coupled to the housing. The electronic device also includes a wireless communication system. A feed 492*a* and a ground 494*a* of the wireless communication system are schematically illustrated in FIG. 4A and additional elements of the wireless communication system are discussed in more detail below. The electronic device 400*a* also includes an input device 403*a* and an input device 405*a*. The front cover 452*a* may be similar to the front cover 152, the input device 403*a* may be similar to the input device 103 and the input device 405*a* may be any of the input devices described with respect to FIGS. 1 and 22.

The electronic device 400*a* also includes a display assembly positioned under the front cover 452*a* (as previously shown in FIG. 1). The display assembly in turn includes a first antenna element, that may be a resonating antenna element, of a wireless communication system. The display assembly and the first antenna element may be as shown and described with respect to the display assembly 172 and the first antenna element 278 and that description is not repeated here.

The housing 410*a* also includes a conductive upper portion 412*a* and a conductive lower portion 414*a*. The housing 410*a* also defines a slot 430*a*, and a dielectric portion 434*a* of the housing 410*a* is positioned within the slot 430*a*. In embodiments, the conductive upper portion 412*a* defines a second antenna element, that may be a resonating antenna element, of the wireless communication system. The first antenna element may be operatively coupled to the second antenna element. For example, the first antenna element may be conductively coupled to the second antenna element (e.g., the conductive upper portion 412*a*). In embodiments, connections between the display assembly and the upper portion of the housing are made at a plurality of discrete locations, such as from 2 to 10 locations, from 3 to 10 locations, from 4 to 10 locations, or from 4 to 8 locations. In further embodiments, the slot 430*a* is configured to operate as a radiating element of the wireless communication system. The additional description provided with respect to the housings 110 and 210 is applicable to the housing 410*a* and is not repeated here.

As shown in FIG. 4A, the housing 410*a* includes four sides 406*a*, 407*a*, 408*a*, and 409*a*. The first side of the housing 410*a* also includes a conductive bridge portion 418*a*. As previously discussed with respect to FIGS. 1-3, the upper portion 412*a*, the lower portion 414*a*, and the bridge portion 418*a* of the housing 410*a* may be formed of a single piece of conductive material. In the view of FIG. 4A, the dielectric portion 434*a* (and the slot 430*a*) is located on a first region of a first side 406*a*, on each of the sides 407*a*, 408*a*, and 409*a*, and on a second region of the first side 406*a*. In particular, the dielectric portion 434*a* extends across each of the sides 407*a*, 408*a*, and 409*a*. The shape of the dielectric portion 434*a* may be described as a "C-shape." An approximate length $L_4$ of the slot is also shown in FIG. 4A. The side 408*a* may be generally opposite the side 406*a* and the side 409*a* may be generally opposite the side 407*a*.

As shown in FIG. 4A, the feed 492*a* is positioned away from the side 406*a* and near a corner between the sides 408*a* and 409*a*. The feed 492*a* may transmit a positive antenna signal to and/or may receive a positive antenna signal from the wireless communication system. As previously described with respect to FIG. 1, in some embodiments the feed 492*a* is coupled to at least one of the first antenna element and the second antenna element. In some cases, the feed may include a positive feed terminal that is conductively coupled to at least one of the first antenna element or the second antenna element (e.g., the conductive upper portion 412*a*). For example, the positive feed terminal may be coupled to the first antenna element (within the display assembly). The additional description of conductive coupling between these two antenna elements provided with respect to FIGS. 1 and 9 to 15 is generally applicable herein and is not repeated here.

The ground 494*a* is positioned along the side 406*a*. The ground 494*a* is conductively coupled to the side 406*a* of the housing 410*a* and in some embodiments is conductively coupled to the lower portion 414*a*. In the example of FIG. 4A, the ground 494*a* is conductively coupled to the side 406*a* over a region that has a lateral dimension similar to that of the bridge portion 418*a* (as indicated by the dashed line).

During operation of the wireless communication system, the lower portion 414*a* may be held at a ground potential (which may be a ground reference potential). The regions of the upper portion 412*a* which are generally positioned above the slot 430*a* are fed to have a potential which generally differs from that of the ground potential. In some cases, the conductive coupling between the upper portion 412*a* and the antenna element of the display assembly may provide a common potential to both antenna elements.

Figure 4B:
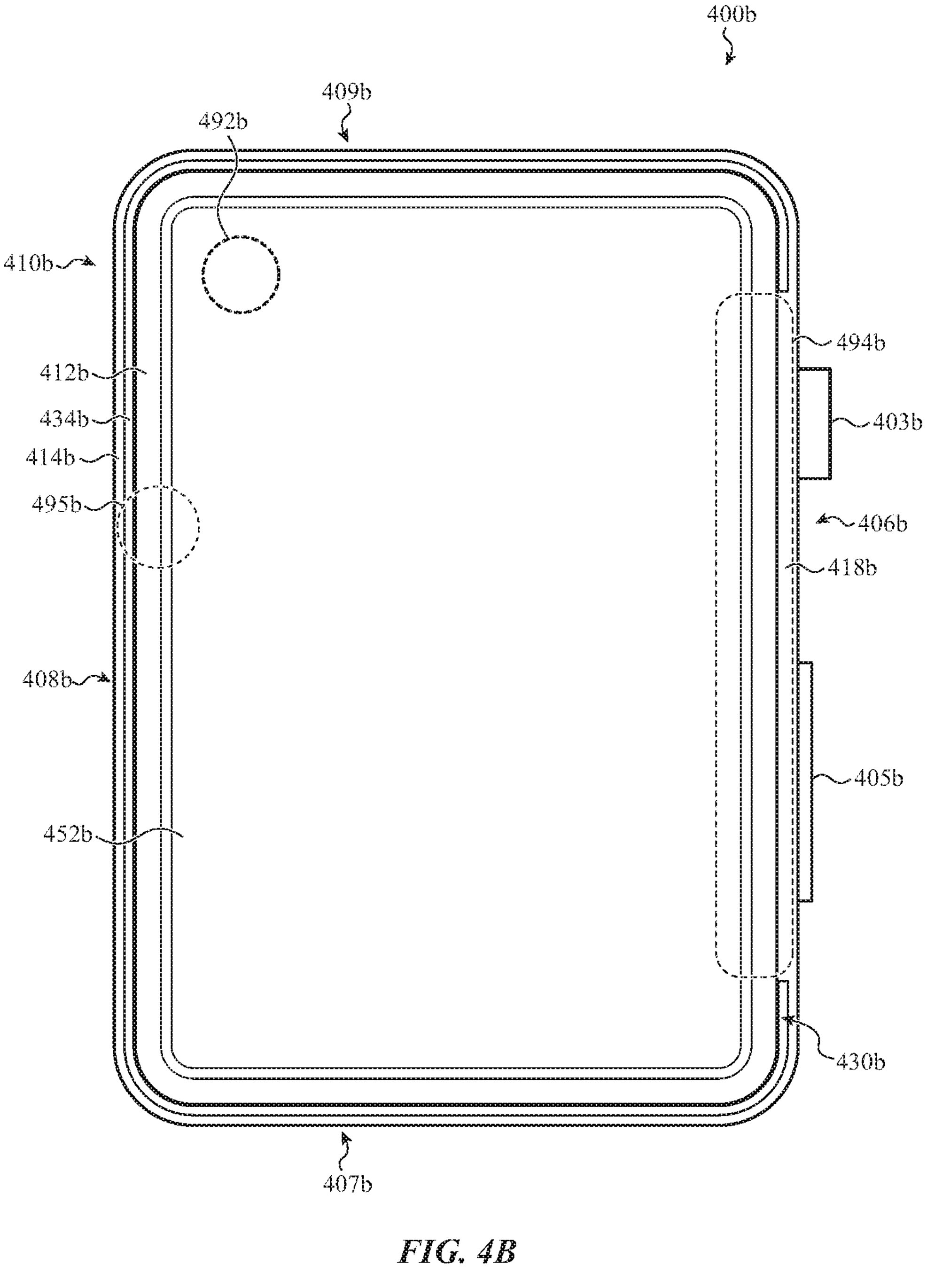

FIG. 4B shows a top view of another example electronic device. The electronic device 400*b* may be another example of the electronic device 100 of FIG. 1. The electronic device 400*b* includes a housing 410*b* and a front cover 452*b* coupled to the housing. The electronic device also includes a wireless communication system. A feed 492*b*, a ground 494*b*, and an optional switchable ground 495*b* of the wireless communication system are schematically illustrated in FIG. 4B and additional elements of the wireless communication system are discussed in more detail below. The electronic device 400*b* also includes an input device 403*b* and an input device 405*b*. The front cover 452*b* may be similar to the front cover 152, the input device 403*b* may be similar to the input device 103 and the input device 405*b* may be any of the input devices described with respect to FIGS. 1 and 22.

The electronic device 400*b* also includes a display assembly positioned under the front cover 452*b* (as previously shown in FIG. 1). The display assembly in turn includes a first antenna element, that may be a resonating antenna element, of a wireless communication system. The display assembly and the first antenna element may be as shown and described with respect to the display assembly 172 and the first antenna element 278 and that description is not repeated here.

The housing 410*b* also includes a conductive upper portion 412*b* and a conductive lower portion 414*b*. The housing 410*b* also defines a slot 430*b*, and a dielectric portion 434*b* of the housing 410*b* is positioned within the slot 430*b*. In embodiments, the conductive upper portion 412*b* defines a second antenna element, that may be a resonating antenna element, of the wireless communication system. The first antenna element may be operatively coupled to the second antenna element. For example, the first antenna element may be conductively coupled to the second antenna element (e.g., the conductive upper portion 412*b*). In embodiments, connections between the display assembly and the upper portion of the housing are made at a plurality of discrete locations, such as from 2 to 10 locations, from 3 to 10 locations, from 4 to 10 locations, or from 4 to 8 locations. In further embodiments, the slot 430*b* is configured to operate as a radiating element of the wireless communication system. The additional description provided with respect to the housings 110, 210*a*, and 210*b* is applicable to the housing 410*b* and is not repeated here.

As shown in FIG. 4B, the housing 410*b* includes four sides 406*b*, 407*b*, 408*b*, and 409*b*. The first side of the housing 410*b* also includes a conductive bridge portion 418*b*. As previously discussed with respect to FIGS. 1-3, the upper portion 412*b*, the lower portion 414*b*, and the bridge portion 418*b* of the housing 410*a* may be formed of a single piece of conductive material. In the view of FIG. 4B, the dielectric portion 434*b* (and the slot 430*b*) is located on a first region of a first side 406*b*, on each of the sides 407*b*, 408*b*, and 409*b*, and on a second region of the first side 406*b*. In particular, the dielectric portion 434*b* extends across each of the sides 407*b*, 408*b*, and 409*b*. The side 408*b* may be generally opposite the side 406*b* and the side 409*b* may be generally opposite the side 407*b*.

As shown in FIG. 4B, the feed 492*b* is positioned away from the side 406*b* and near a transition (e.g., a corner) between the sides 408*b* and 409*b*. The feed 492*b* may transmit a positive antenna signal to and/or may receive a positive antenna signal from the wireless communication system. As previously described with respect to FIGS. 1 and 4A, in some embodiments the feed 492*b* is coupled to at least one of the first antenna element and the second antenna element. The additional description of conductive coupling between these two antenna elements provided with respect to FIGS. 1 and 9 to 15 is generally applicable herein and is not repeated here.

The ground 494*b* is positioned along the side 406*b* of the housing 410*b*. The ground 494*b* is conductively coupled to the side 406*b* and in some embodiments is conductively coupled to the lower portion 414*b* of the housing 410*b*. The switchable ground 495*b* (alternately, switched ground) is positioned along the side 408*b* and in some cases may hold a region of the side 408*a* at a ground potential when the switchable ground 495*b* is activated. In some cases, the switchable ground 495*b* may be conductively coupled to the upper portion 412*b* when activated. The switchable ground 495*b* may be used to modify the resonance of the first and the second antenna elements, such as by shifting one or more resonance peaks.

Figure 5A:
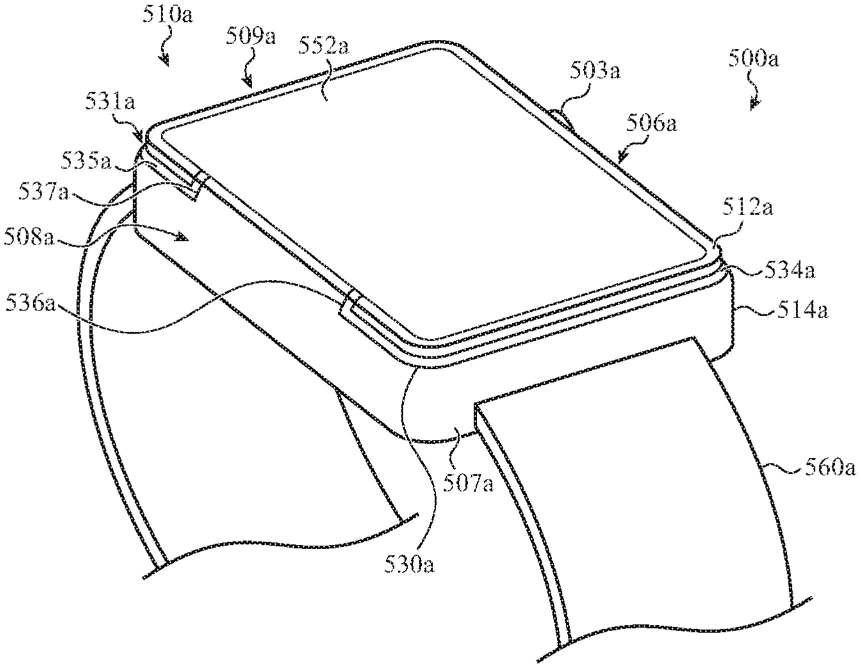
FIG. 5A shows a view of another example electronic device and FIG. 5B shows an example top view of the electronic device of FIG. 5A.

FIG. 5A shows a view of another example electronic device. The electronic device 500*a* includes a housing 510*a* and a front cover 552*a* coupled to the housing. The electronic device also includes a wireless communication system and additional elements of the wireless communication system are discussed in more detail below. The electronic device 500*a* also includes an input device 503*a* and a band 560*a*. The front cover 552*a* may be similar to the front cover 152, the input device 503*a* may be similar to the input device 103, and the band 560*a* may be similar to the band 160.

The electronic device 500*a* also includes a display assembly positioned under the front cover 552*a* (as previously shown in FIG. 1). The display assembly in turn includes a first antenna element, that may be a resonating antenna element, of a wireless communication system. The display assembly and the first antenna element may be as shown and described with respect to the display assembly 172 and the first antenna element 278 and that description is not repeated here.

Figure 5B:
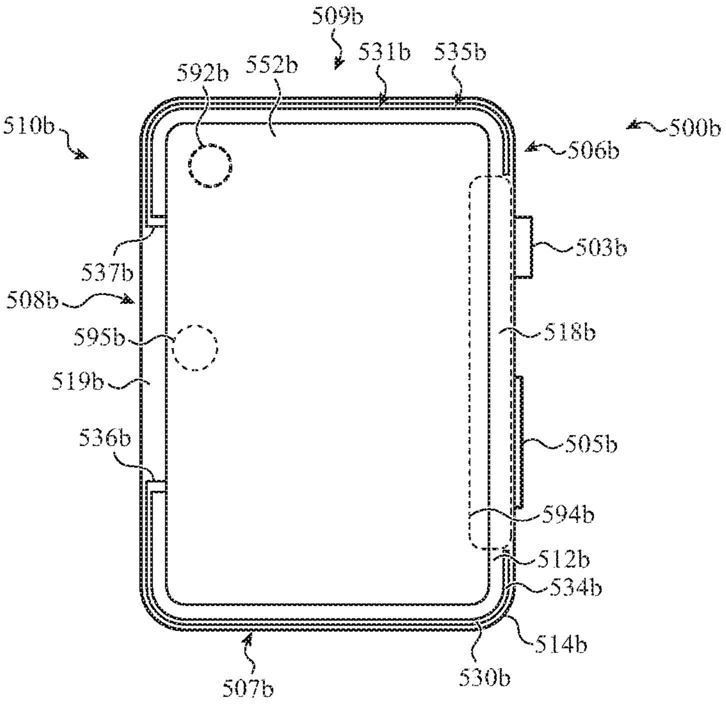

The housing 510*a* includes a conductive upper portion 512*a* and a conductive lower portion 514*a*. The housing 510*a* also includes two conductive bridge portions as described below. The housing 510*a* also defines a slot 530*a*, and a dielectric portion 534*a* of the housing 510*a* is positioned within the slot 530*a*. The housing 510*a* also defines a slot 531*a*, and a dielectric portion 535*a* of the housing 510*a* is positioned within the slot 531*a*. In embodiments, the conductive upper portion 512*a* defines a second antenna element, that may be a resonating antenna element, of the wireless communication system. The first antenna element may be operatively coupled to the second antenna element. For example, the first antenna element may be conductively coupled to the second antenna element (e.g., the conductive upper portion 512*a*). In embodiments, connections between the display assembly and the upper portion of the housing are made at a plurality of discrete locations, such as from 2 to 10 locations, from 3 to 10 locations, from 4 to 10 locations, or from 4 to 8 locations. In further embodiments, the slots 530*a* and 531*a* are configured to operate as a radiating element of the wireless communication system. The additional description provided with respect to the housings 110, 210*a*, and 210*b* is applicable to the housing 510*a* and is not repeated here. FIG. 5B gives an example of how one or more feeds and one or more grounds may be incorporated into the electronic device 500*a*.

As shown in FIG. 5A, the housing 510*a* includes four sides 506*a*, 507*a*, 508*a*, and 509*a*. The view of FIG. 5A shows a conductive bridge portion on the side 508*a*; another conductive bridge portion is present on the side 506*a* as shown in the top view of FIG. 5B (519*b* and 518*b*, respectively). As previously discussed with respect to FIGS. 1-3, the upper portion 512*a*, the lower portion 514*a*, and the bridge portions of the housing 510*a* may be formed of a single piece of conductive material. In the view of FIG. 5A, the dielectric portion 534*a* (and the slot 530*a*) is located on a first region of the side 506*a*, on the side 507*a*, and on a first region of the side 508*a*. The dielectric portion 535*a* (and the slot 531*a*) is located on a second region of the side 506*a*, on the side 509*a*, and on a second region of the side 508*a*. In addition, although the dielectric portions 534*a* and 535*a* generally have a long dimension that aligns with a lateral dimension of the housing, each of the dielectric portions 534*a* and 535*a* defines a "step" (alternately, "jog") (536*a*, 537*a*) that aligns with a vertical dimension of the housing 510*a*. The side 508*a* may be generally opposite the side 506*a* and the side 509*a* may be generally opposite the side 507*a*.

FIG. 5B shows a top view of an example electronic device, which may be an example of the device of FIG. 5A. The electronic device 500*b* includes a housing 510*b* and a front cover 552*b* coupled to the housing. The electronic device also includes a wireless communication system. A feed 592*b*, a ground 594*b*, and an optional switchable ground 595*b* of the wireless communication system are schematically illustrated in FIG. 5B and additional elements of the wireless communication system are discussed in more detail below. The electronic device 500*b* also includes an input device 503*b* and an input device 505*b*. The front cover 552*b* may be similar to the front cover 152, the input device 503*b* may be similar to the input device 103 and the input device 505*b* may be any of the input devices described with respect to FIGS. 1 and 22.

The electronic device 500*b* also includes a display assembly positioned under the front cover 552*b* (as previously shown in FIG. 1). The display assembly in turn includes a first antenna element, that may be a resonating antenna element, of a wireless communication system. The display assembly and the first antenna element may be as shown and described with respect to the display assembly 172 and the first antenna element 278 and that description is not repeated here.

The housing 510*b* includes a conductive upper portion 512*b* and a conductive lower portion 514*b*, and conductive bridge portions 518*b* and 519*b*. The housing 510*b* also defines a slot 530*b*, and a dielectric portion 534*b* of the housing 510*b* is positioned within the slot 530*b*. The housing 510*b* also defines a slot 531*b*, and a dielectric portion 535*b* of the housing 510*b* is positioned within the slot 531*b*. In embodiments, the conductive upper portion 512*b* defines a second antenna element, that may be a resonating antenna element, of the wireless communication system. The first antenna element may be operatively coupled to the second antenna element. For example, the first antenna element may be conductively coupled to the second antenna element (e.g., the conductive upper portion 512*b*). In embodiments, connections between the display assembly and the upper portion of the housing are made at a plurality of discrete locations, such as from 2 to 10 locations, from 3 to 10 locations, from 4 to 10 locations, or from 4 to 8 locations. In further embodiments, the slots 530*b* and 531*b* are configured to operate as a radiating element of the wireless communication system. The additional description provided with respect to the housings 110, 210*a*, and 210*b* is applicable to the housing 510*a* and is not repeated here.

As shown in FIG. 5B, the housing 510*b* includes four sides 506*b*, 507*b*, 508*b*, and 509*b*. In the view of FIG. 5A, the dielectric portion 534*b* (and the slot 530*b*) is located on a first region of the side 506*b*, on the side 507*b*, and on a first region of the side 508*b*. The dielectric portion 535*b* (and the slot 531*b*) is located on a second region of the side 506*b*, on the side 509*b*, and on a second region of the side 508*b*. Each of the dielectric portions 534*b* and 535*b* also defines a "step" (536*b*, 537*b*) similar to that previously described with respect to FIG. 5A and that description is not repeated here. The bridge portions 518*b* and 519*b* are respectively positioned on the sides 506*b* and 508*b*. The side 508*a* may be generally opposite the side 506*a* and the side 509*a* may be generally opposite the side 507*a*.

The feed 592*b* is positioned away from the side 506*b* and near a transition (e.g., a corner) between the sides 508*b* and 509*b*. The feed 592*b* may transmit a positive antenna signal to and/or may receive a positive antenna signal from the wireless communication system. As previously described with respect to FIGS. 1 and 4A, in some embodiments the feed 592*b* is coupled to at least one of the first antenna element and the second antenna element. The additional description of conductive coupling between these two antenna elements provided with respect to FIGS. 1, 4A, and 9 to 15 is generally applicable herein and is not repeated here.

As schematically shown in FIG. 5B, the ground 594*b* is positioned along the side 506*b* (between the dielectric portions 534*b* and 535*b*). The ground 594*b* is conductively coupled to the side 506*b* of the housing 510*b* and in some embodiments is conductively coupled to the lower portion 514*b*. The switchable ground 595*b* is positioned along the side 508*b* and generally proximate the bridge 519*b*. In some cases, the switchable ground is optional and if present may be operated as previously described with respect to FIG. 4B.

Figure 6A:
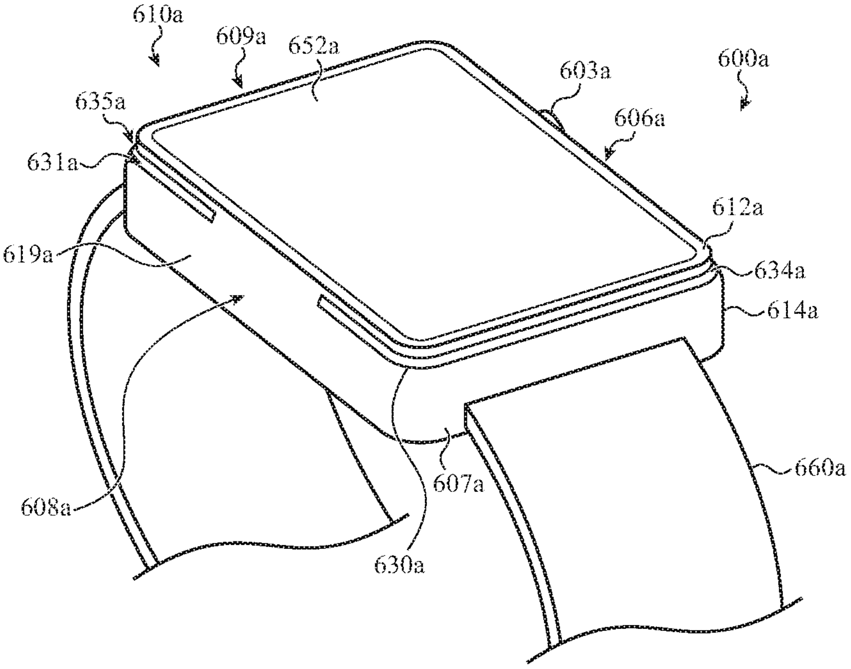
FIG. 6A shows a view of another example electronic device and FIG. 6B shows an example top view of the electronic device of FIG. 6A.

FIG. 6A shows a view of another example electronic device. The electronic device 600*a* includes a housing 610*a* and a front cover 652*a* coupled to the housing. The electronic device also includes a wireless communication system and additional elements of the wireless communication system are discussed in more detail below. The electronic device 600*a* also includes an input device 603*a* and a band 660. The front cover 652*a* may be similar to the front cover 152, the input device 603*a* may be similar to the input device 103, and the band 660*a* may be similar to the band 160.

The electronic device 600*a* also includes a display assembly positioned under the front cover 652*a* (as previously shown in FIG. 1). The display assembly in turn includes an antenna element, that may be a resonating antenna element, of a wireless communication system. The display assembly and its antenna element may be as shown and described with respect to the display assembly 172 and the first antenna element 278 and that description is not repeated here.

Figure 6B:
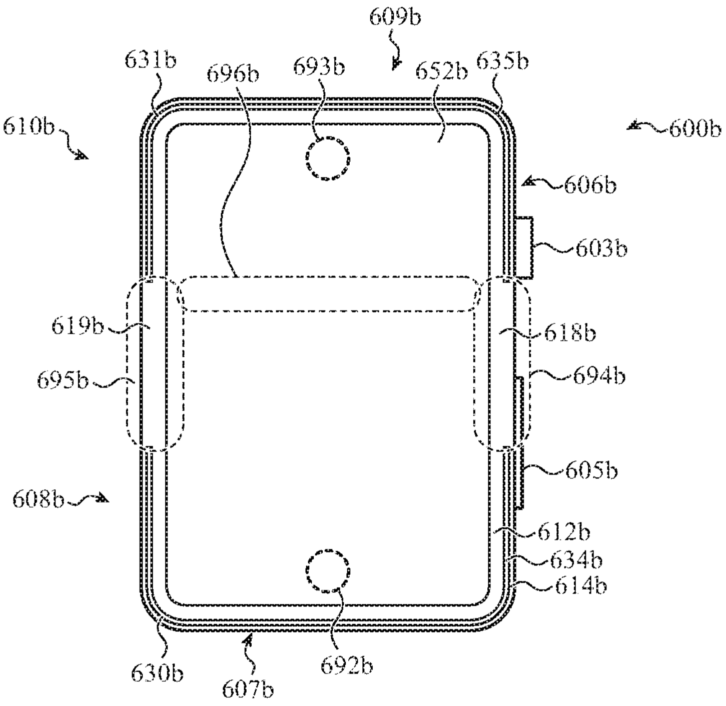

The housing 610*a* includes a conductive upper portion 612*a* and a conductive lower portion 614*a*. The housing 610*a* also includes two conductive bridge portions as described below. The housing 610*a* also defines a slot 630*a*, and a dielectric portion 634*a* of the housing 610*a* is positioned within the slot 630*a*. The housing 610*a* also defines a slot 631*a*, and a dielectric portion 635*a* of the housing 610*a* is positioned within the slot 631*a*. In embodiments, the conductive upper portion 612*a* defines one or more antenna elements, that may be one or more resonating antenna elements, of the wireless communication system. The antenna element of the display assembly may be operatively coupled to the antenna element(s) of the housing 610*a*. For example, the display antenna element may be conductively coupled to the housing antenna element(s). In further embodiments, each of the slots 630*a* and 631*a* are configured to operate as a radiating element of the wireless communication system. The additional description provided with respect to the housings 110, 210*a*, and 210*b* is applicable to the housing 610*a* and is not repeated here. FIG. 6B gives an example of how one or more feeds and one or more grounds may be incorporated into the electronic device 600*a*.

As shown in FIG. 6A, the housing 610*a* includes four sides 606*a*, 607*a*, 608*a*, and 609*a*. The view of FIG. 6A shows a conductive bridge portion 619*a* on the side 608*a*; another conductive bridge portion is present on the side 606*a* as shown in the top view of FIG. 6B. As previously discussed with respect to FIGS. 1-3, the upper portion 612*a*, the lower portion 614*a*, and the bridge portions (e.g., 619*a*) of the housing 610*a* may be formed of a single piece of conductive material. In the view of FIG. 6A, the dielectric portion 634*a* (and the slot 630*a*) is located on a first region of the side 606*a*, on the side 607*a*, and on a first region of the side 608*a*. The dielectric portion 635*a* (and the slot 631*a*) is located on a second region of the side 606*a*, on the side 609*a*, and on a second region of the side 608*a*. The side 608*a* may be generally opposite the side 606*a* and the side 609*a* may be generally opposite the side 607*a*.

FIG. 6B shows a top view of an example electronic device, which may be an example of the device of FIG. 6A. The electronic device 600*b* includes a housing 610*b* and a front cover 652*b* coupled to the housing. The electronic device also includes a wireless communication system. Feeds 692*b* and 693*b* and grounds 694*b*, 695*b*, and 696*b* of the wireless communication system are schematically illustrated in FIG. 6B and additional elements of the wireless communication system are discussed in more detail below. The electronic device 600*b* also includes an input device 603*b* and an input device 605*b*. The front cover 652*b* may be similar to the front cover 152, the input device 603*b* may be similar to the input device 103 and the input device 605*b* may be any of the input devices described with respect to FIGS. 1 and 22.

The electronic device 600*b* also includes a display assembly positioned under the front cover 652*b* (as previously shown in FIG. 1). The display assembly in turn includes an antenna element, that may be a resonating antenna element, of a wireless communication system. The display assembly and its antenna element may be as shown and described with respect to the display assembly 172 and the first antenna element 278 and that description is not repeated here.

The housing 610*b* includes a conductive upper portion 612*b* and a conductive lower portion 614*b*. The housing 610*b* also includes two conductive bridge portions as described below. The housing 610*b* also defines a slot 630*b*, and a dielectric portion 634*b* of the housing 610*b* is positioned within the slot 630*b*. The housing 610*a* also defines a slot 631*b*, and a dielectric portion 635*b* of the housing 610*b* is positioned within the slot 631*b*. In embodiments, the conductive upper portion 612*b* defines one or more antenna elements, that may be resonating antenna elements, of the wireless communication system. The antenna element of the display assembly may be operatively coupled to the antenna element(s) of the housing 610*b*. For example, the display antenna element may be conductively coupled to the housing antenna element(s). In further embodiments, each of the slots 630*b* and 631*b* are configured to operate as a radiating element of the wireless communication system. The additional description provided with respect to the housings 110, 210*a*, and 210*b* is applicable to the housing 610*a* and is not repeated here.

As shown in FIG. 6B, the housing 610*b* includes four sides 606*b*, 607*b*, 608*b*, and 609*b*. In the view of FIG. 6A, the dielectric portion 634*b* (and the slot 630*b*) is located on a first region of the side 606*b*, on the side 607*b*, and on a first region of the side 608*b*. The dielectric portion 635*b* (and the slot 631*b*) is located on a second region of the side 606*b*, on the side 609*b*, and on a second region of the side 608*b*. The bridge portions 618*b* and 619*b* are respectively positioned on the sides 606*b* and 608*b*. The side 608*b* may be generally opposite the side 606*b* and the side 609*b* may be generally opposite the side 607*b*.

The feed 692*b* is positioned centrally along the side 607*b* of the housing, while the feed 693*b* is positioned centrally along the side 609*b* of the housing 610*a*. Each of the feeds 692*b* and 693*b* may transmit a positive antenna signal to and/or may receive a positive antenna signal from the wireless communication system. In some embodiments, the upper portion 612*b* defines an antenna element along the side 607*b* and the upper portion 612*b* defines an additional antenna element along the side 609*b* of the housing. In some cases, the feed 692*b* may transmit a positive antenna signal (and/or may receive an antenna signal from) the housing antenna element along the side 607*b*. In these cases, the feed 693*b* may transmit a positive antenna signal (and/or may receive an antenna signal from) the housing antenna element along the side 609*b*. The additional description of conductive coupling between the display and housing antenna elements provided with respect to FIGS. 1, 4B, and 9 to 15 is generally applicable herein and is not repeated here.

As schematically shown in FIG. 6B, the ground 694*b* is positioned along and conductively coupled to the side 606*b* of the housing 610*b* (between the dielectric portions 634*b* and 635*b*). The ground 695*b* is positioned along and conductively coupled to the side 608*b* of the housing 610*b* (between the dielectric portions 634*b* and 635*b*). The ground 696*b* extends between the sides 606*b* and 608*b* of the housing 610*b* and along a central portion of the display assembly.

Figure 7A:
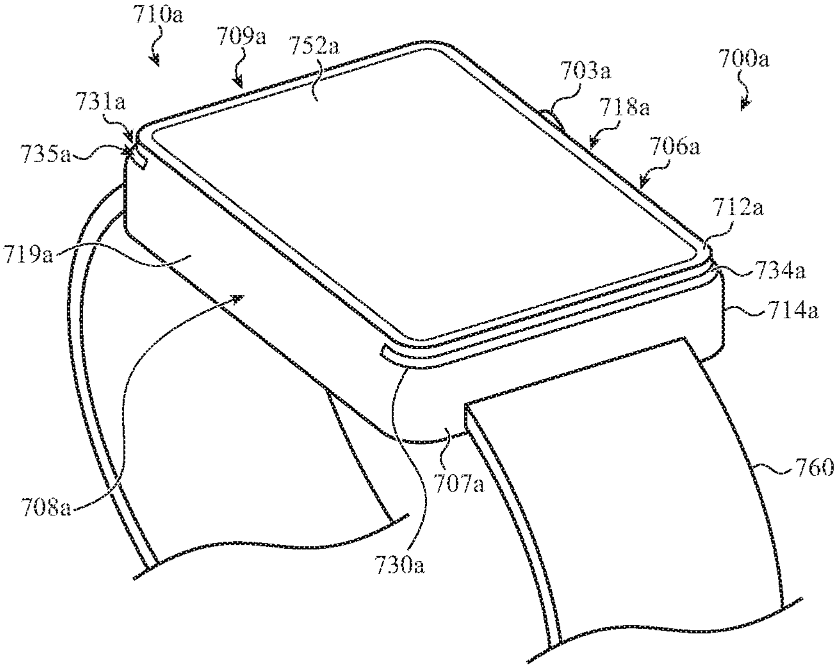
FIG. 7A shows a view of another example electronic device and FIGS. 7B and 7C shows example top views of the electronic device of FIG. 7A.

FIG. 7A shows a view of another example electronic device. The electronic device 700*a* includes a housing 710*a* and a front cover 752*a* coupled to the housing. The electronic device also includes a wireless communication system and additional elements of the wireless communication system are discussed in more detail below. The electronic device 700*a* also includes an input device 703*a* and a band 760. The front cover 752*a* may be similar to the front cover 152, the input device 703*a* may be similar to the input device 103, and the band 760 may be similar to the band 160.

The electronic device 700*a* also includes a display assembly positioned under the front cover 752*a* (as previously shown in FIG. 1). The display assembly in turn includes an antenna element, that may be a resonating antenna element, of a wireless communication system. The display assembly and its antenna element may be as shown and described with respect to the display assembly 172 and the first antenna element 278 and that description is not repeated here.

Figure 7B:
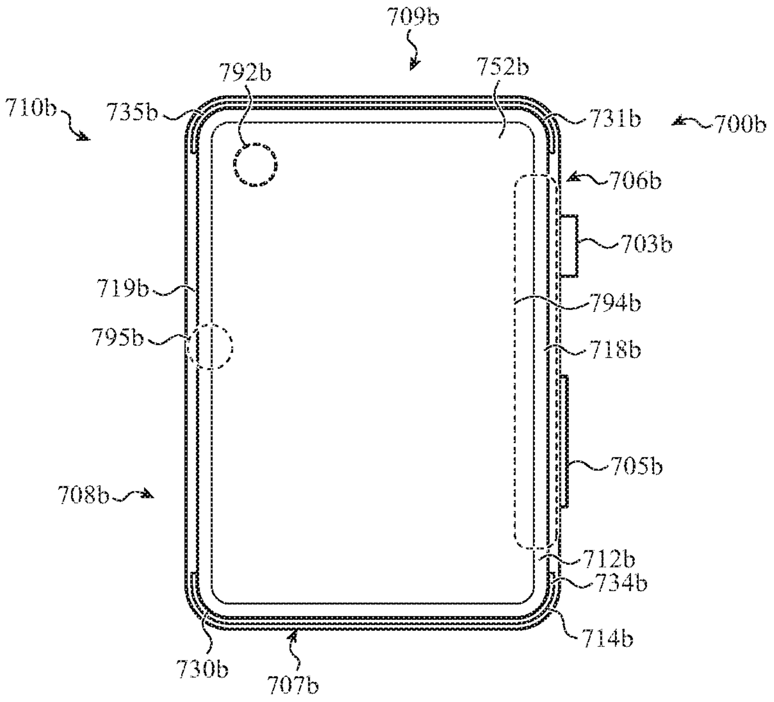
Figure 7C:
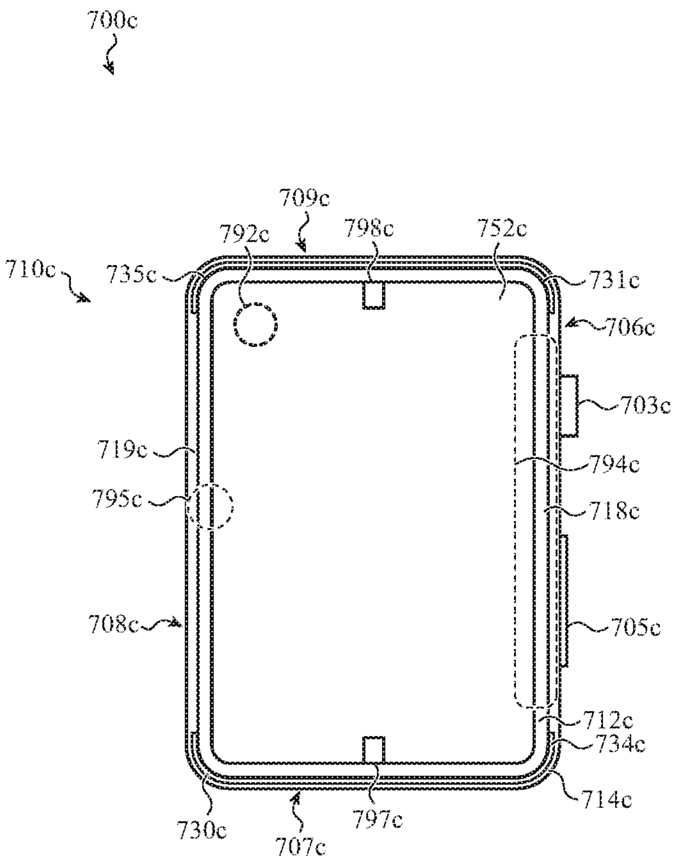

The housing 710*a* includes a conductive upper portion 712*a* and a conductive lower portion 714*a*. The housing 710*a* also includes two conductive bridge portions as described below. The housing 710*a* also defines a slot 730*a* and a dielectric portion 734*a* of the housing 710*a* is positioned within the slot 730*a*. The housing 710*a* also defines a slot 731*a*, and a dielectric portion 735*a* of the housing 710*a* is positioned within the slot 731*a*. In embodiments, the conductive upper portion 712*a* defines one or more antenna elements, that may be one or more resonating antenna elements, of the wireless communication system. The antenna element of the display assembly may be operatively coupled to the antenna element(s) of the housing 710*a*. For example, the display antenna element may be conductively coupled to the housing antenna element(s). In embodiments, connections between the display assembly and the upper portion of the housing are made at a plurality of discrete locations, such as from 2 to 10 locations, from 3 to 10 locations, from 4 to 10 locations, or from 4 to 8 locations. In further embodiments, each of the slots 730*a* and 731*a* is configured to operate as a radiating element of the wireless communication system. The additional description provided with respect to the housings 110, 210*a*, and 210*b* is applicable to the housing 710*a* and is not repeated here. FIGS. 7B and 7C give examples of how one or more feeds and one or more grounds may be incorporated into the electronic device 700*a*.

As shown in FIG. 7A, the housing 710*a* includes four sides 706*a*, 707*a*, 708*a*, and 709*a*. The view of FIG. 7A shows a conductive bridge portion 719*a* on the side 708*a*; another conductive bridge portion is present on the side 706*a* as shown in the top view of FIG. 7B. As previously discussed with respect to FIGS. 1-3, the upper portion 712*a*, the lower portion 714*a*, and the bridge portions 718*a* and 719*a* of the housing 710*a* may be formed of a single piece of conductive material. As shown in FIG. 7A, the bridge portions 718*a* and 719*a* are longer than those shown in FIGS. 5B and 6B. In the view of FIG. 7A, the dielectric portion 734*a* (and the slot 730*a*) is located on a first region of the side 706*a*, on the side 707*a*, and on a first region of the side 708*a*. The dielectric portion 735*a* (and the slot 731*a*) is located on a second region of the side 706*a*, on the side 709*a*, and on a second region of the side 708*a*. The side 708*a* may be generally opposite the side 706*a* and the side 709*a* may be generally opposite the side 707*a*.

FIG. 7B shows a top view of an example electronic device, which may be an example of the device of FIG. 7A. The electronic device 700*b* includes a housing 710*b* and a front cover 752*b* coupled to the housing. The electronic device also includes a wireless communication system. A feed 792*b*, a ground 794*b*, and an optional switchable ground 795*b* of the wireless communication system are schematically illustrated in FIG. 7B and additional elements of the wireless communication system are discussed in more detail below. The electronic device 700*b* also includes an input device 703*b* and an input device 705*b*. The front cover 752*b* may be similar to the front cover 152, the input device 703*b* may be similar to the input device 103 and the input device 705*b* may be any of the input devices described with respect to FIGS. 1 and 22.

The electronic device 700*b* also includes a display assembly positioned under the front cover 752*b* (as previously shown in FIG. 1). The display assembly in turn includes an antenna element, that may be a resonating antenna element, of a wireless communication system. The display assembly and its antenna element may be as shown and described with respect to the display assembly 172 and the first antenna element 278 and that description is not repeated here.

The housing 710*b* includes a conductive upper portion 712*b* and a conductive lower portion 714*b*. The housing 710*b* also includes two conductive bridge portions as described below. The housing 710*b* also defines a slot 730*b*, and a dielectric portion 734*b* of the housing 710*b* is positioned within the slot 730*b*. The housing 710*a* also defines a slot 731*b* and a dielectric portion 735*b* of the housing 710*b* is positioned within the slot 731*b*. In embodiments, the conductive upper portion 712*b* defines one or more antenna elements, that may be one or more resonating antenna elements, of the wireless communication system. The antenna element of the display assembly may be operatively coupled to the antenna element(s) of the housing 710*b*. For example, the display antenna element may be conductively coupled to the housing antenna element(s). In embodiments, connections between the display assembly and the upper portion of the housing are made at a plurality of discrete locations, such as from 2 to 10 locations, from 3 to 10 locations, from 4 to 10 locations, or from 4 to 8 locations. In further embodiments, each of the slots 730*b* and 731*b* is configured to operate as a radiating element of the wireless communication system. The additional description provided with respect to the housings 110, 210*a*, and 210*b* is applicable to the housing 710*b* and is not repeated here.

As shown in FIG. 7B, the housing 710*b* includes four sides 706*b*, 707*b*, 708*b*, and 709*b*. In the view of FIG. 7B, the dielectric portion 734*b* (and the slot 730*b*) is located on a first region of the side 706*b*, on the side 707*b*, and on a first region of the side 708*b*. The dielectric portion 735*b* (and the slot 731*b*) is located on a second region of the side 706*b*, on the side 709*b*, and on a second region of the side 708*b*. The bridge portions 718*b* and 719*b* are respectively positioned on the sides 706*b* and 708*b*. The side 708*b* may be generally opposite the side 706*b* and the side 709*b* may be generally opposite the side 707*b*.

The feed 792*b* is positioned away from the side 706*b* and near a transition (e.g., a corner) between the sides 708*b* and 709*b*. The feed 792*b* may transmit a positive antenna signal to and/or may receive a positive antenna signal from the wireless communication system. As previously described with respect to FIGS. 1 and 4A, in some embodiments the feed 792*b* is coupled to at least one of the first antenna element and the second antenna element. The additional description of conductive coupling between these two antenna elements provided with respect to FIGS. 1, 4A and 9 to 15 is generally applicable herein and is not repeated here.

As schematically shown in FIG. 7B, the ground 794*b* is positioned along the side 706*b* (between the dielectric portions 734*b* and 735*b*). The ground 794*b* is conductively coupled to the side 706*b* of the housing 710*b* and in some embodiments is conductively coupled to the lower portion 714*b*. The switchable ground 795*b* is positioned along the side 708*b* and generally proximate the bridge 719*b*. In some cases, the switchable ground is optional and if present may be operated as previously described with respect to FIG. 4B.

FIG. 7C shows a top view of an example electronic device, which may be an example of the device of FIG. 7A. The electronic device 700*c* includes a housing 710*c* and a front cover 752*c* coupled to the housing. A feed 792*c*, a ground 794*c*, and an optional switchable ground 795*c* of the wireless communication system are schematically illustrated in FIG. 7C. The electronic device 700*c* also includes an input device 703*c* and an input device 705*c*. The front cover 752*c* may be similar to the front cover 152, the input device 703*c* may be similar to the input device 103, and the input device 705*c* may be similar to any of the input devices described with respect to FIGS. 1 and 22.

The electronic device 700*c* also includes a display assembly positioned under the front cover 752*c* (as previously shown in FIG. 1). The display assembly in turn includes an antenna element, that may be a resonating antenna element, of a wireless communication system. The display assembly and its antenna element may be as shown and described with respect to the display assembly 172 and the first antenna element 278 and that description is not repeated here.

The housing 710*c* may be similar to the housing 710*b*. In embodiments, the conductive upper portion 712*c* defines one or more antenna elements, that may be resonating antenna elements. In further embodiments, each of the slots 730*c* and 731*c* are configured to operate as a radiating element of the wireless communication system. The conductive upper portion 712*c*, the conductive lower portion 714*c*, the conductive bridge portions 718*c* and 719*c*, the slots 730*c* and 731*c*, the dielectric portions 734*c* and 735*c*, and the sides 706*c*, 707*c*, 708*c*, and 709*c* may be similar in form and materials to the conductive upper portion 712*b*, the conductive lower portion 714*b*, the conductive bridge portions 718*b* and 719*b*, the slots 730*b* and 731*b*, the dielectric portions 734*b* and 735*b*, and the sides 706*b*, 707*b*, 708*b*, and 709*b* and that description is not repeated here.

In embodiments, the antenna element of the display assembly is operatively coupled to the antenna element(s) of the housing 710*c*. For example, the display antenna element may be conductively coupled to the housing antenna element(s) defined by the conductive upper portion 712*c*. As previously discussed, these antenna elements may be conductively coupled by coupling a circuit assembly of the display assembly to a conductive upper portion of a housing.

The example of FIG. 7C shows two connector components, 797*c* and 798*c*, used to connect the display assembly to the conductive upper portion 712*c*. In some cases, the connector components 797*c* and 798*c* connect a circuit assembly of the display assembly to the conductive upper portion 712*c*. The connector component 797*c* is positioned centrally along the side 707*c* while the connector component 798*c* is positioned centrally along the side 709*c* of the housing 710*c*. The electronic device 700*c* of FIG. 7C may have a fewer number of connections between the display assembly and the housing 712*c* than the electronic devices 400*b*, 500*b*, 600*b*, and 700*b*. The position of the feed 792*c*, the ground 794*c*, and the switchable ground 795*c* may be similar to that of the feed 792*b*, the ground 794*b*, and the (optional) switchable ground 795*b*.

Figure 8:
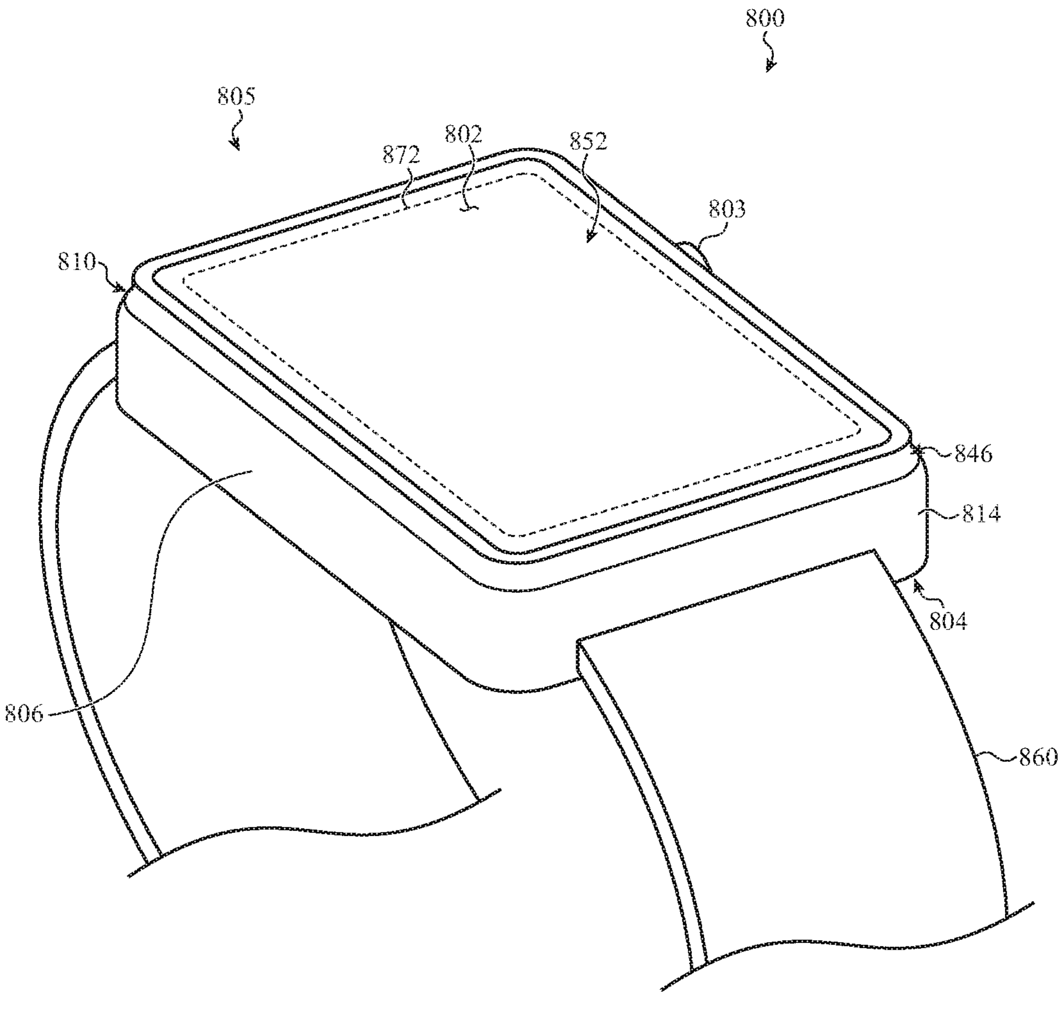
FIG. 8 shows a view of another example electronic device.

FIG. 8 shows a view of another example electronic device. The electronic device 800 includes an enclosure 805. The enclosure includes a housing 810 and a front cover 852. The front cover 852 is positioned over a display assembly 872 (indicated with a dashed line). The enclosure may also include a rear cover, which may be similar to that shown in the cross-section view of FIG. 2A. The rear cover may be positioned over a sensing panel as previously discussed with respect to FIG. 2A. The device 800 defines a front surface 802, a rear surface 804, and a side surface 806. In the example of FIG. 8, the device 800 defines four sides, each of which may partially define the side surface 806.

The housing 810 includes a lower portion 814 and an upper dielectric portion 846. In embodiments, the lower portion 814 is conductive. As shown in FIG. 8, the upper dielectric portion 846 extends around a periphery of the housing 810 and along all four sides (and corners). The lower portion 814 may be formed of similar materials as previously described for the lower portion 114, and the upper dielectric portion 846 may be formed of similar materials as previously described for the dielectric portion 134 of FIG. 1 and those details are not repeated here.

The display assembly 872 may comprise an antenna element, also referred to as a display antenna element. During operation of the electronic device 800, the lower portion 814 of the housing 810 may be connected to an electrical ground and the display antenna element may be conductively coupled to a feed terminal. The upper dielectric portion 846 of the housing 810 can allow for greater separation between the display antenna element and the grounded lower portion 814 of the housing 810 as compared to a wholly conductive housing having a shape similar to that of the housing 810. In some cases, using a housing 810 having an upper dielectric portion 846, rather than a conductive housing, can maintain the performance of the display antenna element and/or allow use of a display assembly having a larger lateral dimension.

The electronic device 800 may include a feed for the display antenna and a ground. In some cases, the feed and the ground may be positioned similarly to the feed and ground positions shown in the examples of FIGS. 5B and 7B. In some cases, the electronic device also includes a switchable ground, and the switchable ground may also be positioned and operated similarly to the switchable ground positions shown in the examples of FIGS. 5B and FIG. 7B.

The electronic device also includes an input device 803, which may be a dial having an outer surface configured to receive a rotary input. A band 860 is attached to the housing 810 and configured to secure the electronic device 800 to a user. The cover 852 may be similar to the cover 152, the display 872 may be similar to the display 172, and the input device 803 may be similar to the input device 103 and that description is not repeated here.

FIG. 9 shows an exploded view of several elements of an example electronic device. In the example of FIG. 9, the connector element 986 and the connector element 988 are used to conductively couple the housing 910 to a circuit assembly 973 of the electronic device 900. The circuit assembly 973 may be part of a display assembly. The electronic device also includes input devices 903 and 905 and a band 960 configured to secure the electronic device 900 to a user. FIGS. 10A and 10B show examples of partial cross-sectional views of the device 900; these cross-sectional views show additional device elements such as the display assembly and the display cover.

The housing 910 includes an upper portion 912, a lower portion 914, and a dielectric portion 934. In embodiments, each of the upper portion 912 and the lower portion 914 is conductive (and may also be referred to as an upper conductive portion 912 and a lower conductive portion 914). The dielectric portion 934 is positioned within a slot 930 and the slot is positioned along a side surface 906 of the electronic device 900. In embodiments, the housing 910 defines an antenna element and the slot 930 is configured to radiate at one or more desired frequencies, as previously discussed with respect to FIG. 1. The antenna element defined by the housing may also be referred to herein as a housing antenna element.

The electronic device 900 also includes a circuit assembly 973 of a display assembly. The circuit assembly 973 may include a display antenna element, as previously discussed with respect to FIGS. 1 and 2A-2B. The circuit assembly may include one or more conductive structures formed on a dielectric substrate. For example, the conductive structures may include conductive structures configured to operate as an antenna element. The conductive structures may be provided on a dielectric substrate of the circuit assembly. For example, the dielectric substrate may be a circuit board and the conductive structures may be printed on the circuit board. In some cases, other components may be included in the circuit assembly, such as an element configured to provide a feed signal to one or more antenna elements. Other parts of the display assembly, as well as a cover over the display assembly are shown in the cross-sectional views of FIGS. 10A and 10B.

The connector element 988 is configured to contact one or more locations on an interior surface of the upper portion 912 of the housing 910. The connector element 988 has the form of a ring that defines a gap. The connector element 988 is also configured to contact one or more locations of the connector 986. For example, the connector element 988 may be shaped to have slight variations in the inside and the outside diameter of the ring to allow some portions of the ring to contact the upper portion 912 of the housing and other portions of the ring to contact the connector element 986, as illustrated in the cross-sectional views of FIGS. 10A and 10B. Therefore, the connector component 988 may have a "wavy" profile as viewed from that top so that it can (alternately) contact both the upper portion 912 of the housing 910 and the circuit assembly 973 (through the connector element 986). The connector component 988 may be spring loaded to maintain contact. In the example of FIG. 9, the gap is positioned on a side of the housing 910 opposite the input device 903. The connector element 988 may include or be formed of a conductive material, such as a metal or metal alloy, to provide conductive coupling of the upper portion 912 and the connector element 986.

The connector element 986 is configured to allow conductive coupling between the connector element 986 and the circuit assembly 973 or other parts of the display assembly. In some embodiments, the connector element 986 may include one or more tab features. For example, the tab feature 985*b*, which has a substantially horizontal orientation, can be used to conductively couple the connector element 986 and the display assembly as shown in the example of FIG. 10B. In addition, the connector element 986 is configured to allow conductive coupling between the connector element 986 and the connector element 988. For example, the tab feature 985*a*, which has a substantially vertical orientation, can be used to conductively couple the connector element 986 and the connector element 988 as shown in the example of FIG. 10A. The number and position of the tab features 985*a* and 985*b* shown in FIG. 9 is exemplary rather than limiting and in additional examples the tab features may be different in number and/or positioned differently than shown in FIG. 9. As shown in FIG. 9, the connector element 986 also has the form of a ring defining a gap, with the gap positioned on the same side of the housing as the input device 903. The connector element 986 may include or be formed of a conductive material, such as a metal or metal alloy, to provide conductive coupling to the connector element 988.

FIG. 10A shows an example of a partial cross-sectional view of an electronic device. The electronic device 1000*a* may be an example cross-section of the electronic device 900 of FIG. 9. The electronic device 1000*a* includes a housing 1010*a*, a display assembly 1072*a* positioned within the housing, and a front cover 1052*a* positioned over the display assembly 1072*a*.

The housing 1010*a* includes a conductive upper portion 1012*a*, a conductive lower portion 1014*a*, and a dielectric portion 1034*a*. The dielectric portion 1034*a* is positioned within a slot 1030*a*. The slot 1030*a* is defined by a surface 1023*a* of the upper portion 1012*a* and by a surface 1025*a* of the lower portion 1014*a* in a similar fashion as previously described with respect to FIGS. 2A and 2B. The surfaces 1023*a* and 1025*a* may define a minimum or average minimum gap height as previously described with respect to FIGS. 2A and 2B. In embodiments, the upper portion 1012*a* of the housing 1010*a* defines an antenna element and the slot 1030*a* is configured to radiate at one or more desired frequencies, as previously discussed with respect to FIG. 1. The antenna element defined by the housing may also be referred to herein as a housing antenna element. The lower portion 1014*a* defines a ledge 1016*a* that supports the cover 1052*a* and the display assembly 1072*a* as described in more detail below.

As previously described with respect to FIG. 1, the upper 1012*a* and/or the lower portion 1014*a* of the housing 1010*a* may be configured to define one or more retention features. These retention features can allow one or more structural interlocks to be formed between the dielectric component 1034*a* and the upper 1012*a* and/or the lower portion 1014*a* of the housing 1010*a*. As shown in the example of FIG. 10A, the lower portion 1014*a* of the housing 1010*a* defines several retention features. For example, the lower portion 1014*a* defines a retention feature 1029*a* in the form of a protrusion at a peripheral region of the surface 1025*a*. The lower portion 1014*a* also defines an opening 1039*a* which provides an interlock between the dielectric component 1034*a* and the lower portion 1014*a*.

The display assembly 1072*a* includes an element 1076*a*, which in some cases may be a display control circuit. In some cases, the display control circuit may be provided on a circuit assembly as previously described (e.g., 973). In additional cases, the element 1076*a* may include a feed terminal, which may be part of the circuit assembly. The display assembly typically also includes one or more display components such as a pixel definition layer, a touch sensitive layer and the like. As shown in FIG. 10A, a periphery of the display assembly 1072*a* is at least partially surrounded by a display frame 1058*a*. A periphery of the front cover 1052*a* is surrounded by a cover frame 1056*a*. Each of the display frame 1058*a* and the cover frame 1056*a* may be formed from or may include a dielectric material, such as a polymer material or a polymer matrix composite. The display frame 1058*a* may be coupled to the ledge 1016*a*, such as with an adhesive. The cover frame 1056*a* may be coupled to the display frame 1058*a* by directly bonding the dielectric materials of the two frames or by coupling the two frames with an adhesive.

In the view of FIG. 10A, the connector component 1088*a* is positioned so that it contacts and is conductively coupled to the upper portion 1012*a* of the housing 1010*a*. The component 1088*a* does not contact any elements of the display assembly 1072*a* in the plane of this cross-section. As previously described with respect to the connector component 988, the connector component 1088*a* may have a "wavy" profile as viewed from that top so that it can (alternately) contact both the upper portion 1012*a* of the housing and the display assembly 1072*a*. The connector component 1088*a* may be spring loaded to maintain contact. The connector component 1088*a* may be formed of similar materials as those previously described for the connector component 988. Additional details provided with respect to the geometry of the connector component 988 are generally applicable herein.

FIG. 10B shows an example of a partial cross-sectional view of an electronic device. The electronic device 1000*b* may be another example cross-section of the electronic device 900 of FIG. 9. The electronic device 1000*b* includes a housing 1010*b*, a display assembly 1072*b* positioned within the housing, and a front cover 1052*b* positioned over the display assembly 1072*b*. The housing 1010*b*, the display assembly 1072*b*, the element 1076*b*, the front cover 1052*b*, the frames 1056*b* and 1058*b*, and the connector 1088*b* may be the same as or similar to the housing 1010*a*, a display assembly 1072*a*, the element 1076*a*, the front cover 1052*a*, the frames 1056*a* and 1058*a*, and the connector 1088*a*.

The housing 1010*b* includes a conductive upper portion 1012*b*, a conductive lower portion 1014*b*, and a dielectric portion 1034*b*. The dielectric portion 1034*b* is positioned within a slot 1030*b*. The slot 1030*b* is defined by a surface 1023*b* of the upper portion 1012*b* and by a surface 1025*b* of the lower portion 1014*b* in a similar fashion as previously described with respect to FIGS. 2A and 2B. The surfaces 1023*b* and 1025*b* may define a minimum or average minimum gap height as previously described with respect to FIGS. 2A and 2B. In embodiments, the upper portion 1012*b* of the housing 1010*b* defines an antenna element and the slot 1030*b* is configured to radiate at one or more desired frequencies, as previously discussed with respect to FIG. 1. The antenna element defined by the housing may also be referred to herein as a housing antenna element. The lower portion 1014*b* defines a ledge 1016*b* that supports the cover 1052*b* and the display assembly 1072*b* as described in more detail below.

As previously described with respect to FIGS. 1 and 10A, the upper 1012*b* and/or the lower portion 1014*b* of the housing 1010*b* may be configured to define one or more retention features. As shown in the example of FIG. 10B, the housing 1010*b* defines several retention features. For example, the upper portion 1012*b* defines a recess 1028*b* which provides an interlock between the dielectric component 1034*b* and the upper portion 1012*b*. The lower portion 1014*b* defines a protruding retention feature 1029*b* which is similar to the retention feature 1029*a* described with respect to FIG. 10A.

The display assembly 1072*b* includes an element 1076*b*. The display assembly 1072*b* and the element 1076*b* may be as previously described for the display assembly 1072*a* and the element 1076*a* and that description is not repeated here. A periphery of the display assembly 1072*b* may be at least partially surrounded by a display frame 1058*b*. A periphery of the front cover 1052*b* may be surrounded by a cover frame 1056*b*. Each of the display frame 1058*b* and the cover frame 1056*b* may be formed from or may include a dielectric material, such as a polymer material or a polymer matrix composite. The display frame 1058*b* may be coupled to the ledge 1016*b*, such as with an adhesive. The cover frame 1056*b* may be coupled to the display frame 1058*b* by directly bonding the dielectric materials of the two frames or by coupling the two frames with an adhesive.

As shown in FIG. 10B, the connector component 1088*b* is positioned so that it contacts and is conductively coupled to the connector component 1086*b* (this connector component is not visible in the cross-section of FIG. 10A). However, the connector component 1088*b* does not contact the upper portion 1012*a* of the housing 1010*a* in the plane of this cross-section. The connector component 1086*b* passes through the display frame 1058*b* and is conductively coupled to the element 1076*b* by the connector component 1087*b*. For example, the connector component 1086*b* may be conductively coupled to the display assembly 1072*b* by a conductive adhesive, by solder, or the like. The connector components 1086*b* and 1088*b* may be formed of similar materials as those previously described for the connector components 986 and 988. The connector component 1087*b* may be formed from or include a conductive material such as a metal or metal alloy and may be flexible. For example, the connector component 1087*b* may be a metallic wire, strip, or tape. The connector component 1086*b* may be configured to be more rigid than the connector component 1087*b*.

Figure 11:
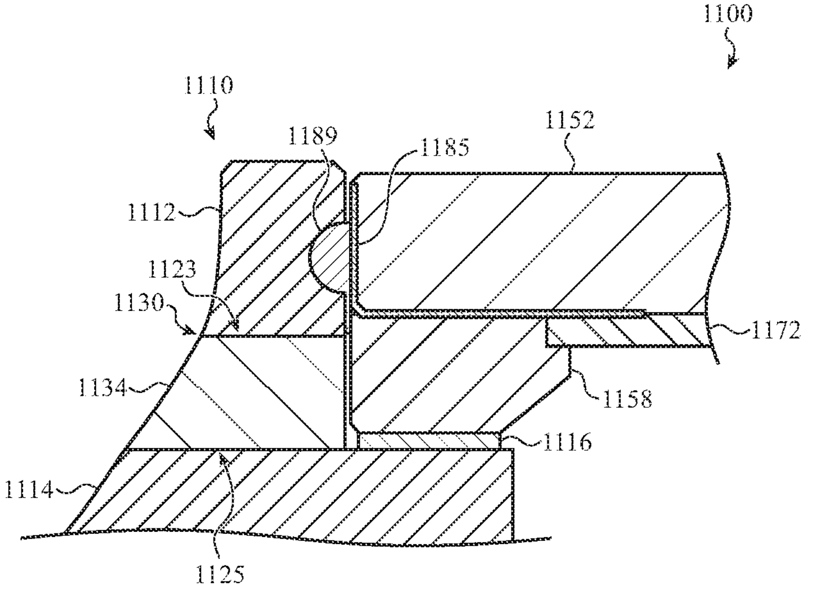
FIG. 11 shows another example of a partial cross-sectional view of an electronic device.

FIG. 11 shows another example of a partial cross-sectional view of an electronic device. The electronic device 1100 may be an example cross-section of the electronic device 100 of FIG. 1 or the electronic device of any one of FIGS. 4A through 7C. The electronic device 1100 includes a housing 1110, a display assembly 1172 positioned within the housing, and a front cover 1152 positioned over the display assembly 1172.

The housing 1110 includes an upper conductive portion 1112, a lower conductive portion 1114, and a dielectric portion 1134. The dielectric portion 1134 is positioned within a slot 1130. The slot 1130 is defined by a surface 1123 of the upper portion 1112 and by a surface 1125 of the lower portion 1114 in a similar fashion as previously described with respect to FIGS. 2A and 2B. The surfaces 1123 and 1125 may define a minimum or average minimum gap height as previously described with respect to FIGS. 2A and 2B. In embodiments, the upper portion 1112 of the housing 1110 defines an antenna element and the slot 1130 is configured to radiate at one or more desired frequencies, as previously discussed with respect to FIG. 1. The antenna element defined by the housing may also be referred to herein as a housing antenna element. The lower portion 1114 defines a ledge 1116 that supports the cover 1152 and the display assembly 1172.

In the example of FIG. 11, periphery of the display assembly 1172 is surrounded by a display frame 1158. The display frame 1158 may be formed from or may include a dielectric material, such as a polymer material or a polymer matrix composite. The display frame 1158 may be coupled to the ledge 1116, such as with an adhesive.

As shown in FIG. 11, the connector component 1189 is positioned so that it contacts and is conductively coupled to the upper portion 1112 of the housing 1110. In some cases, the connector component 1189 may be formed from a conductive adhesive. The connector component 1185 is positioned so that it contacts and is conductively coupled to the connector component 1189 and also contacts a side surface and a rear surface of the front cover 1152. In some cases, the connector component 1185 is formed from a thin layer of conductive material, such as a metal or metal alloy, deposited on the side and rear surfaces of the front cover 1152. As shown in FIG. 11, the connector component 1185 contacts a front surface of the display assembly 1172. If it is desirable to conductively couple the connector component 1185 with a component (e.g., a circuit assembly) positioned within an interior of or at a rear surface of the display assembly, an additional connector such as a via can be included in the electronic device.

Figure 12:
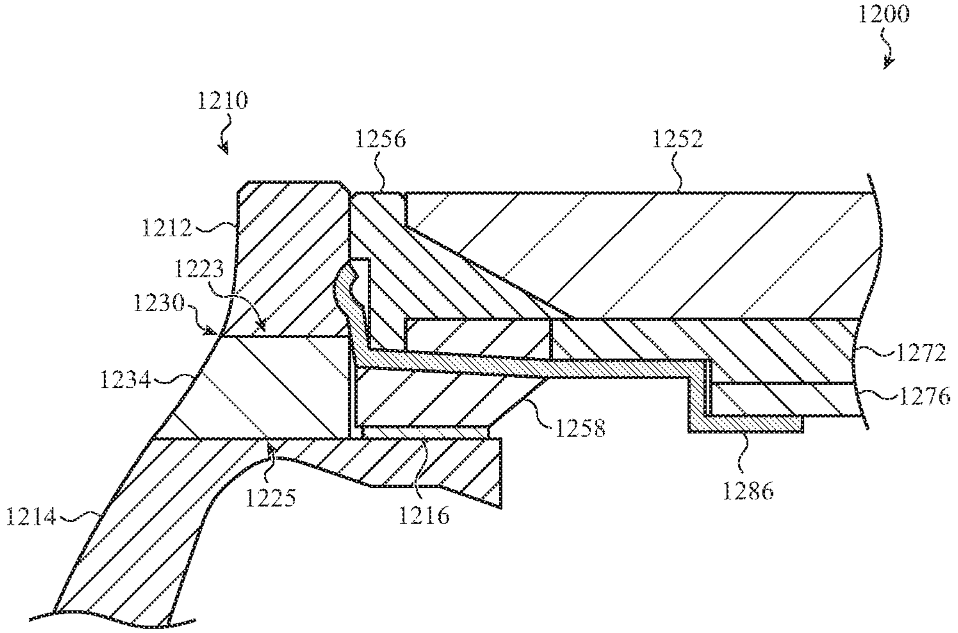
FIG. 12 shows another example of a partial cross-sectional view of an electronic device.

FIG. 12 shows another example of a partial cross-sectional view of an electronic device. The electronic device 1200 may be an example cross-section of the electronic device 100 of FIG. 1 or the electronic device of any one of FIGS. 4A through 7C. The electronic device 1200 includes a housing 1210, a display assembly 1272 positioned within the housing 1210, and a front cover 1252 positioned over the display assembly 1272.

The housing 1210 includes a conductive upper portion 1212, a conductive lower portion 1214, and a dielectric portion 1234. The dielectric portion 1234 is positioned within a slot 1230. The slot 1230 is defined by a surface 1223 of the upper portion 1212 and by a surface 1225 of the lower portion 1214 in a similar fashion as previously described with respect to FIGS. 2A and 2B. The surfaces 1223 and 1225 may define a minimum or average minimum gap height as previously described with respect to FIGS. 2A and 2B. In embodiments, the upper portion 1212 of the housing 1210 defines an antenna element and the slot 1230 is configured to radiate at one or more desired frequencies, as previously discussed with respect to FIG. 1. The antenna element defined by the housing may also be referred to herein as a housing antenna element. The lower portion 1214 defines a ledge 1216 that supports the cover 1252 and the display assembly 1272.

In the example of FIG. 12, the display assembly 1272 includes an element 1276. The element 1276 may be similar to the elements 1076*a*, 1076*b* and that description is not repeated here. As shown in FIG. 12, a periphery of the display assembly 1272 is at least partially surrounded by a display frame 1258 and a periphery of the front cover 1252 is surrounded by a cover frame 1256. Each of the display frame 1258 and the cover frame 1256 may be formed from or may include a dielectric material, such as a polymer material or a polymer matrix composite. The display frame 1258 may be coupled to the ledge 1216, such as with an adhesive. The cover frame 1256 may be coupled to the display frame 1258 by directly bonding the dielectric materials of the two frames or by coupling the two frames with an adhesive.

As shown in FIG. 12, the connector component 1286 is positioned so that it contacts and is conductively coupled to the upper portion 1212 of the housing 1210. The connector component 1286 also passes through the display frame 1258 and is conductively coupled to the element 1276. The connector element 1286 may include or be formed of a conductive material, such as a metal or metal alloy. In some cases, an end of the connector element 1286 may define a spring contact (e.g., at the upper portion 1212).

Figure 13:
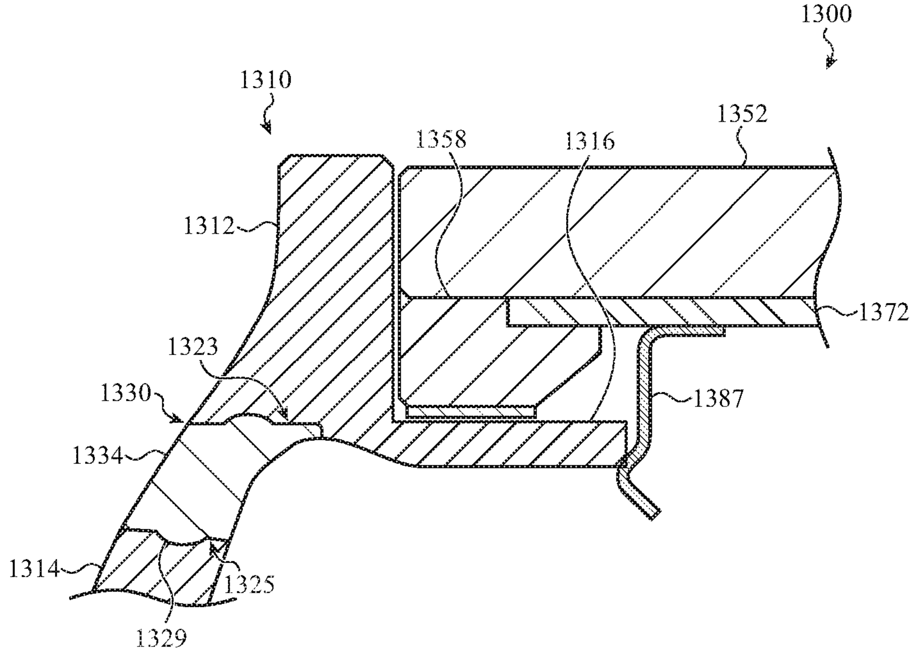
FIG. 13 shows another example of a partial cross-sectional view of an electronic device.

FIG. 13 shows another example of a partial cross-sectional view of an electronic device. The electronic device 1300 may be an example cross-section of the electronic device 100 of FIG. 1 or the electronic device of any one of FIGS. 4A through 7C. The electronic device 1300 includes a housing 1310, a display assembly 1372 positioned within the housing, and a front cover 1352 positioned over the display assembly 1372.

The housing 1310 includes a conductive upper portion 1312, a conductive lower portion 1314, and a dielectric portion 1334. The dielectric portion 1334 is positioned within a slot 1330. The slot 1330 is defined by a surface 1323 of the upper portion 1312 and by a surface 1325 of the lower portion 1314 in a similar fashion as previously described with respect to FIGS. 2A and 2B. The surfaces 1323 and 1325 may define a minimum or average minimum gap height as previously described with respect to FIGS. 2A and 2B. In embodiments, the upper portion 1312 of the housing 1310 defines an antenna element and the slot 1330 is configured to radiate at one or more desired frequencies, as previously discussed with respect to FIG. 1. The antenna element defined by the housing may also be referred to herein as a housing antenna element. The upper portion 1312 defines a ledge 1316 that supports the cover 1352 and the display assembly 1372. As compared to the examples of FIGS. 10A through 12, the surface 1323 is at a lower position with respect to a top surface of the upper portion 1312.

As previously described with respect to FIG. 1, the upper 1312 and/or the lower portion 1314 of the housing 1310 may be configured to define one or more retention features. These retention features can allow one or more structural interlocks to be formed between the dielectric component 1334 and the upper 1312 and/or the lower portion 1314 of the housing 1310. As shown in the example of FIG. 13, the surface 1323 of the upper portion 1312 and the surface 1325 of the lower portion 1314 each define depressions (e.g., 1329) that can act as a retention feature.

In the example of FIG. 13, a periphery of the display assembly 1372 is surrounded by a display frame 1358. The display frame 1358 may be formed from or may include a dielectric material, such as a polymer material or a polymer matrix composite. The display frame 1358 may be coupled to the ledge 1316, such as with an adhesive.

As shown in FIG. 13, the connector component 1387 is positioned so that it contacts and is conductively coupled to ledge 1316 defined by the upper portion 1312 of the housing 1310. The connector component 1387 is also conductively coupled to the display assembly 1372 and in some cases may be conductively coupled to a circuit assembly of the display assembly 1372, as previously discussed with respect to FIGS. 10A, 10B, and 12. The connector component 1387 may be formed of a conductive material such as a metal or metal alloy. In some cases, the connector component 1387 may define a metallic spring finger.

Figure 14:
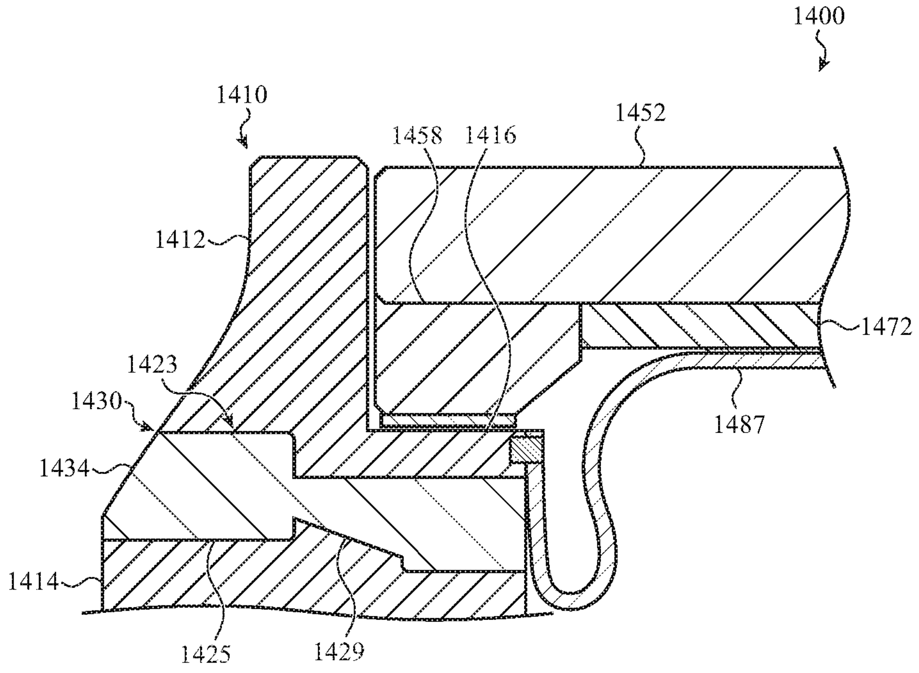
FIG. 14 shows another example of a partial cross-sectional view of an electronic device.

FIG. 14 shows another example of a partial cross-sectional view of an electronic device. The electronic device 1400 may be an example cross-section of the electronic device 100 of FIG. 1 or the electronic device of any one of FIGS. 4A through 7C. The electronic device 1400 includes a housing 1410, a display assembly 1472 positioned within the housing, and a front cover 1452 positioned over the display assembly 1472.

The housing 1410 includes a conductive upper portion 1412, a conductive lower portion 1414, and a dielectric portion 1434. The dielectric portion 1434 is positioned within a slot 1430. The slot 1430 is defined by a surface 1423 of the upper portion 1412 and by a surface 1425 of the lower portion 1414 in a similar fashion as previously described with respect to FIGS. 2A and 2B. The surfaces 1423 and 1425 may define a minimum or average minimum gap height as previously described with respect to FIGS. 2A and 2B. In embodiments, the upper portion 1412 of the housing 1410 defines an antenna element and the slot 1430 is configured to radiate at one or more desired frequencies, as previously discussed with respect to FIG. 1. The antenna element defined by the housing may also be referred to herein as a housing antenna element. The upper portion 1412 defines a ledge 1416 that supports the cover 1452 and the display assembly 1472. As compared to the examples of FIGS. 10A through 12, the surface 1423 is at a lower position with respect to a top surface of the upper portion 1412.

As previously described with respect to FIG. 1, the upper 1412 and/or the lower portion 1414 of the housing 1410 may be configured to define one or more retention features. These retention features can allow one or more structural interlocks to be formed between the dielectric component 1434 and the upper 1412 and/or the lower portion 1414 of the housing 1410. As shown in the example of FIG. 14, the surface 1423 of the upper portion 1412 of the housing 1410 defines a step that can act as a retention feature. The surface 1425 of the lower portion 1414 defines an angled feature 1429 that can act as a retention feature as well as a smaller step.

In the example of FIG. 14, a periphery of the display assembly 1472 may be surrounded by a display frame 1458. The display frame 1458 may be formed from or may include a dielectric material, such as a polymer material or a polymer matrix composite. The display frame 1458 may be coupled to the ledge 1416, such as with an adhesive.

As shown in FIG. 14, the connector component 1487 is positioned so that it contacts and is conductively coupled to the ledge 1416 defined by the upper portion 1412 of the housing 1410. For example, the connector component 1487 may be conductively coupled to the ledge 1416 by a conductive adhesive, by soldering, by laser welding, or the like. The connector component 1487 is also conductively coupled to the display assembly 1472 and in some cases may be conductively coupled to a circuit assembly of the display assembly 1472, as previously discussed with respect to FIGS. 10A, 10B, and 12. For example, the connector component 1487 may be conductively coupled to the display assembly 1472 by a conductive adhesive, by solder, or the like. The connector component 1487 may be formed of a conductive material such as a metal or metal alloy and may be flexible. For example, the connector component 1487 may be a metallic wire or strip.

Figure 15:
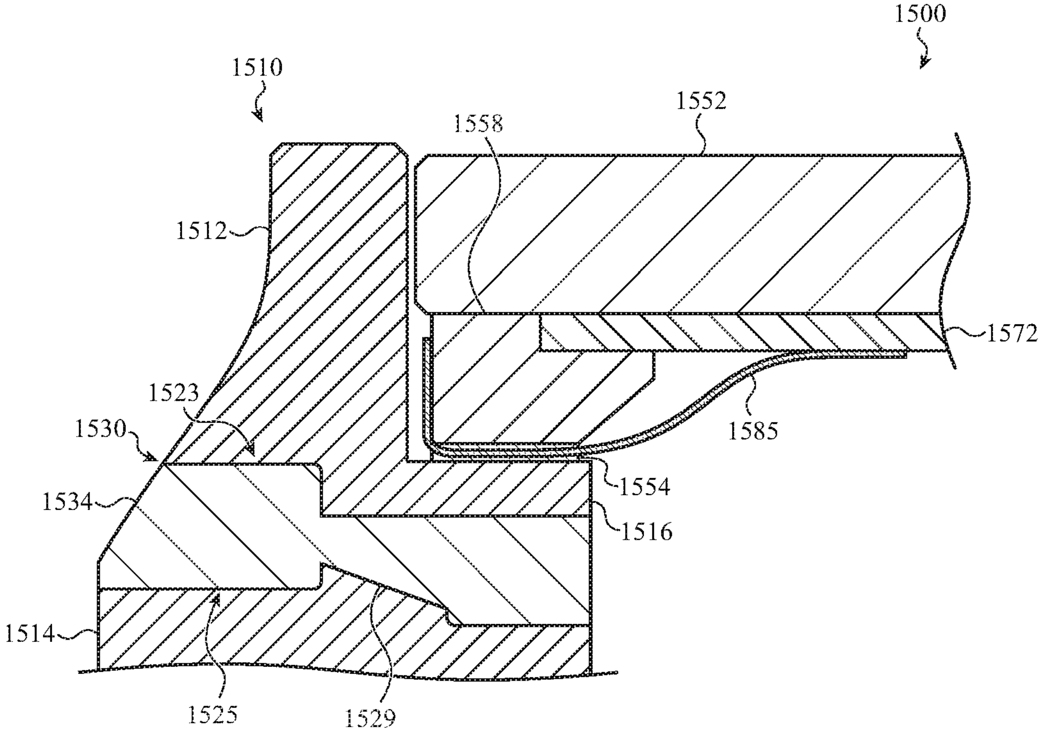
FIG. 15 shows another example of a partial cross-sectional view of an electronic device.

FIG. 15 shows another example of a partial cross-sectional view of an electronic device. The electronic device 1500 may be an example cross-section of the electronic device 100 of FIG. 1 or the electronic devices of any one of FIGS. 4A through 7C. The electronic device 1500 includes a housing 1510, a display assembly 1572 positioned within the housing, and a front cover 1552 positioned over the display assembly 1572.

The housing 1510 includes a conductive upper portion 1512, a conductive lower portion 1514, and a dielectric portion 1534. The dielectric portion 1534 is positioned within a slot 1530. The slot 1530 is defined by a surface 1523 of the upper portion 1512 and by a surface 1525 of the lower portion 1514 in a similar fashion as previously described with respect to FIGS. 2A and 2B. The surfaces 1523 and 1525 may define a minimum or average minimum gap height as previously described with respect to FIGS. 2A and 2B. In embodiments, the upper portion 1512 of the housing 1510 defines an antenna element and the slot 1530 is configured to radiate at one or more desired frequencies, as previously discussed with respect to FIG. 1. The antenna element defined by the housing may also be referred to herein as a housing antenna element. The upper portion 1512 defines a ledge 1516 that supports the display assembly 1572. As compared to the examples of FIGS. 10A through 12, the surface 1523 is at a lower position with respect to a top surface of the upper portion 1512.

As previously described with respect to FIG. 1, the upper 1512 and/or the lower portion 1514 of the housing 1510 may be configured to define one or more retention features. These retention features can allow one or more structural interlocks to be formed between the dielectric component 1534 and the upper 1512 and/or the lower portion 1514 of the housing 1510. As shown in the example of FIG. 15, the surface 1523 of the upper portion 1512 of the housing 1510 defines a step that can act as a retention feature. The surface 1525 of the lower portion 1514 defines an angled feature 1529 that can act as a retention feature as well as a smaller step.

In the example of FIG. 15, a periphery of the display assembly 1572 is surrounded by a display frame 1558. The display frame 1558 may be formed from or may include a dielectric material, such as a polymer material or a polymer matrix composite. The display frame 1558 may be coupled to the ledge 1516, such as with a seal 1554.

As shown in FIG. 15, the connector component 1585 is positioned so that it passes through the seal 1554 and then conforms to a side surface of the display frame 1558. The connector component 1585 may be conductively coupled to an interior surface of the upper portion 1512 of the housing 1510 by a conductive adhesive, a spring contact, or the like. The connector component 1585 is also conductively coupled to the display assembly 1572 and in some cases may be conductively coupled to a circuit assembly of the display assembly 1572, as previously discussed with respect to FIGS. 10A, 10B, and 12. For example, the connector component 1585 may be conductively coupled to the display assembly 1572 by a conductive adhesive, by solder, or the like. The connector component 1585 may be formed of a conductive material such as a metal or metal alloy and may be sufficiently flexible to conform to a side surface of the display frame 1558 after passing through the seal 1554.

Figure 16:
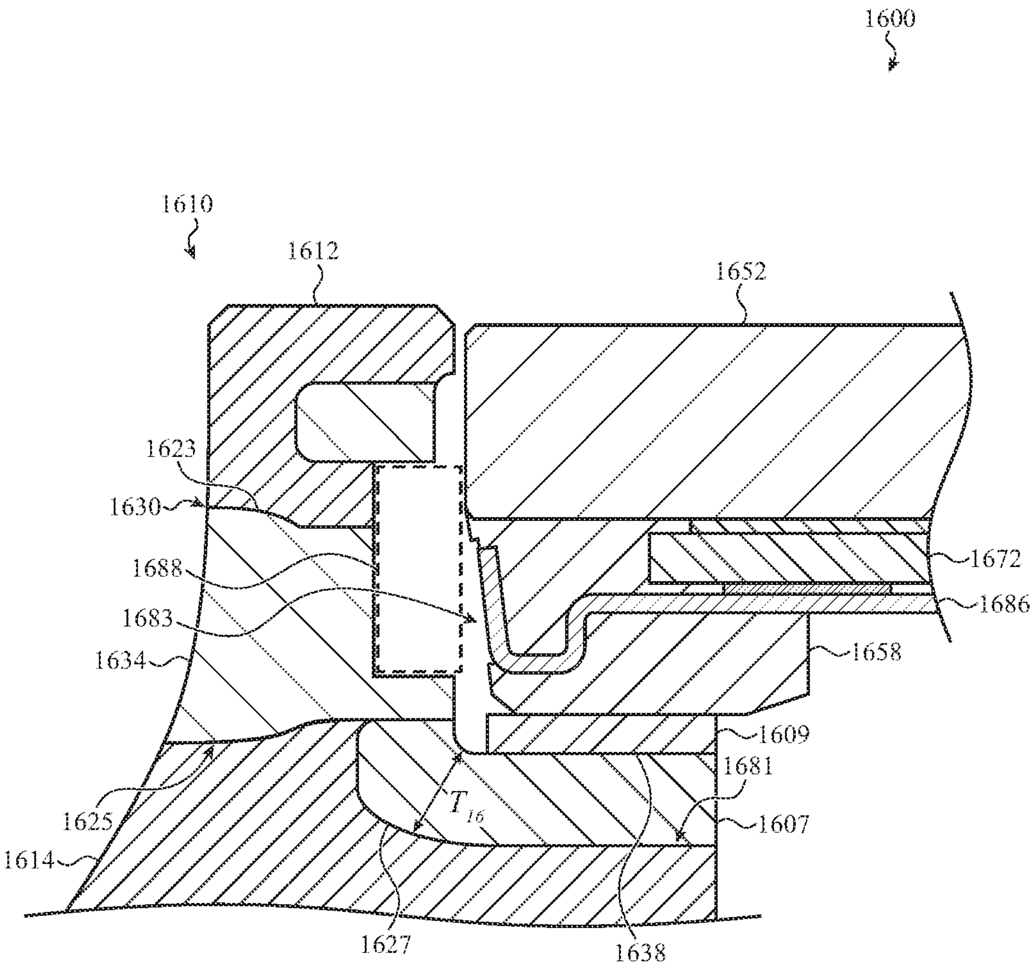
FIG. 16 shows another example of a partial cross-sectional view of an electronic device.

FIG. 16 shows another example of a partial cross-sectional view of an electronic device. The electronic device 1600 may be an example cross-section of the electronic device 100 of FIG. 1 or the electronic devices of any one of FIGS. 4A through 7C. The electronic device 1600 includes a housing 1610, a display assembly 1672 positioned within the housing, and a front cover 1652 positioned over the display assembly 1672.

The housing 1610 includes a conductive upper portion 1612, a conductive lower portion 1614, and a dielectric portion 1634. The dielectric portion 1634 is positioned within a slot 1630. The slot 1630 is defined at least in part by a surface 1623 of the upper portion 1612 and by a surface 1625 of the lower portion 1614. In embodiments, the upper portion 1612 of the housing 1610 defines at least a portion of an antenna element and the slot 1630 is configured to radiate at one or more desired frequencies, as previously discussed with respect to FIG. 1. The housing 1610, the conductive upper portion 1612, the conductive lower portion 1614, the dielectric portion 1634, and the slot 1630 may be formed of similar materials as the housing 110, the conductive upper portion 112, the conductive lower portion 114, the dielectric portion 134, and the slot 130 and that description is not repeated here.

In the example of FIG. 16, an electrically insulating element 1607 is disposed over an interior surface region 1627 of the lower portion 1614 of the housing 1610. The electrically insulating element 1607 also defines a bottom of the gap 1683. As previously discussed, the electrically insulating element 1607 may ensure consistent and reliable operation of the antenna by providing an additional layer of non-conductive material, such as a dielectric material, within a void or gap in the enclosure in which an ingress of fluid may enter and become trapped. The electrically insulating element 1607 may maintain sufficient isolation between conductive and non-conductive components in order to ensure consistent or acceptable operation of the antenna. In some cases, the electrically insulating element 1607 may restrict or prevent an unintended current in case a conducting fluid enters the gap 1683. One example of a conducting fluid is an aqueous fluid including dissolved ions, such as saltwater. The description provided herein of using a layer or other form of non-conductive material to ensure consistent and reliable operation of the antenna is not limited to the example of FIG. 16 but applies more generally to other electronic devices described herein.

The electrically insulating element 1607 may be configured to limit ingress of a fluid that may be present within the gap 1683 towards the interior surface region 1627. For example, the electrically insulating element 1607 may be substantially non-porous and may also be configured to inhibit significant diffusion of the fluid and/or its ions through the electrically insulating element (e.g., the electrically insulating element 1607 may be waterproof). Suitable materials for the electrically insulating element 1607 include, but are not limited to, polymer materials and polymer composite materials, such as epoxy-based materials and composite materials having an epoxy-based matrix. In some cases, the electrically insulating element 1607 may be formed from a thermosetting resin adhesive (e.g., an epoxy-based resin adhesive). In some cases, the electrically insulating element 1607 may be bonded to interior surface region 1627. The bonding of the electrically insulating element 1607 to the interior surface region 1627 may be enhanced by surface modification of the interior surface region and/or formation of one or more retention features (also referred to as interlock features) on the interior surface region 1627. In the example of FIG. 16, the electrically insulating element 1607 extends under the dielectric portion 1634. Therefore, the electrically insulating element 1607 also helps to limit ingress of a fluid that may be present within the gap 1683 towards the surface 1625 that defines the slot 1630.

The electrically insulating element 1607 can thus reduce or prevent a current along an unintended path between the lower portion 1614 of the housing and the upper portion 1612 and/or the connector 1686 when a conducting fluid is present within the gap 1683. In some cases, the reduction or prevention of a current along an unintended path between the lower portion 1614 and the upper portion 1612 and/or the connector 1686 can maintain the performance of the wireless communication system when a conducting fluid is present within the gap 1683. As shown in FIG. 16, the electrically insulating element 1607 may have a thickness $T_{16}$ that is sufficient to provide the desired electrical isolation between any trapped fluid and the conductive material of the lower portion 1614.

In the example of FIG. 16, at least a portion of the interior surface region 1627 is recessed with respect to the region of the surface 1625 that defines the slot. In some cases, the electrically insulating element 1607 may be molded within a recess 1681 defined by the interior surface region 1627. For example, a curable polymer resin may be disposed within the recess 1681 and then cured to form the electrically conducting element. In some cases, the electrically conducting element is substantially rigid after curing and a machining process, a grinding process, or the like may be used to further adjust the shape of the cured electrically conducting element.

As shown in FIG. 16, a periphery of the display assembly 1672 is at least partially surrounded by a display frame 1658. The electrically insulating element 1607 supports the display frame 1658 as well as the front cover 1652. For example, the electrically insulating element 1607 may be coupled to the display frame 1658 by a coupling element 1609, which may be an adhesive layer. The electrically insulating element 1607 may have a machined surface or other dimensionally stable surface 1638 that is used to mount the coupling element 1609 and ensure a consistent display stack position within the device 1600. The display frame 1658 may be formed from or may include a dielectric material, such as a polymer material or a polymer matrix composite. In some embodiments, the display frame 1658 may be assembled from multiple components. The front cover 1652 may be coupled to the display frame 1658 with an adhesive. In additional examples, a periphery of the front cover 1652 may be at least partially surrounded by a cover frame, examples of which were previously shown in FIGS. 10A, 10B, and 12. The display assembly 1672 and the front cover 1652 may be similar in function and materials to the display assembly 172 and the front cover 152.

The electronic device 1600 includes a connector component 1686 that passes through the display frame 1658 and is conductively coupled to display assembly. For example, the connector component 1686 may be conductively coupled to the display assembly 1672 by a conductive adhesive, by solder, or the like. In some cases, the display assembly may include a display control circuit and the connector component 1686 may be conductively coupled to the display control circuit as previously discussed with respect to FIG. 12. The connector component 1686 may be formed of similar materials as those previously described for the connector components 986 and 988.

In some embodiments, the electronic device 1600 includes an additional connector component 1688 which may be similar in at least some aspects to the conductor component 988. The connector component 1688 is shown with dashed lines in FIG. 16 to represent a volume of the gap 1683 which may be occupied by the connector component 1688. The connector component 1688 does not completely fill the gap 1683 and may be configured so that it can (alternately) contact both the upper portion 1612 of the housing and the connector component 1686. The details previously provided with respect to the materials and the geometry of the connector component 988 are generally applicable herein.

Figure 17:
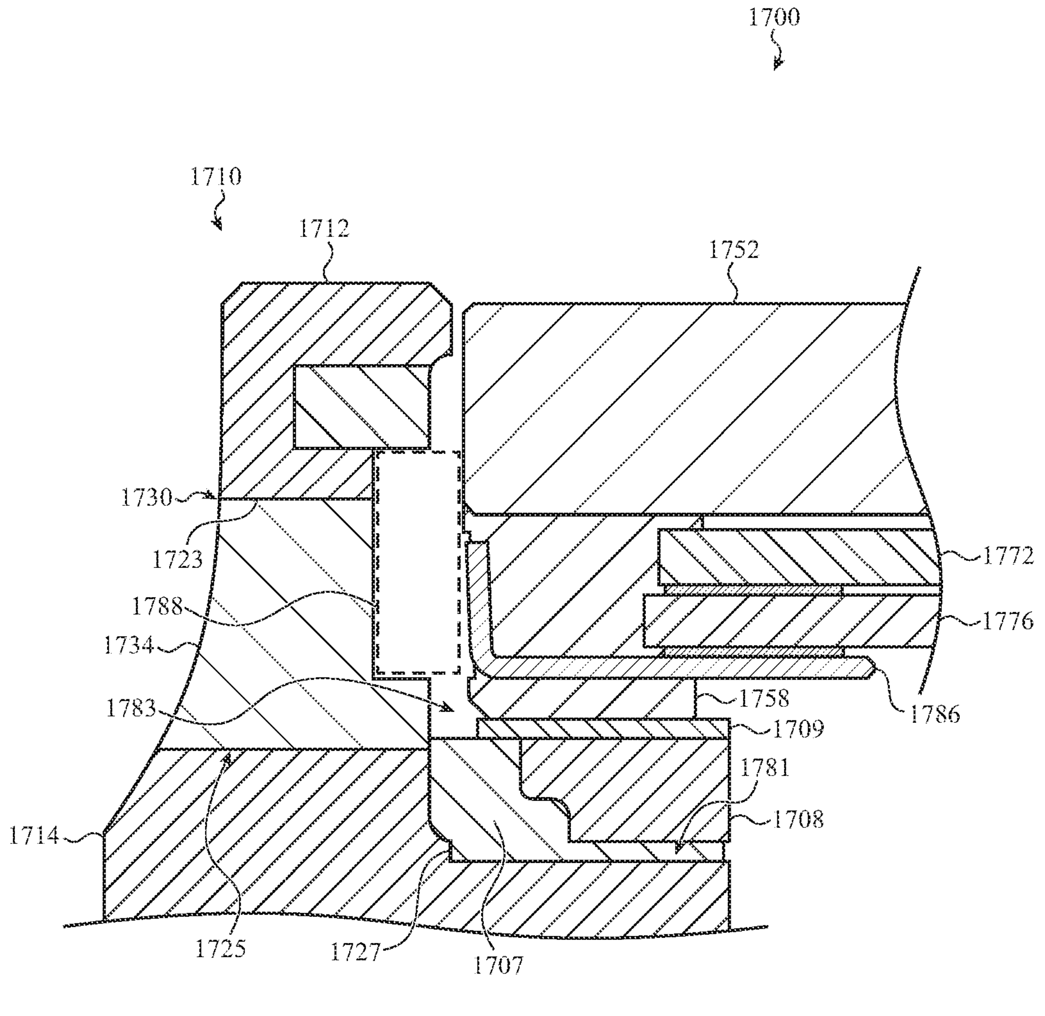
FIG. 17 shows another example of a partial cross-sectional view of an electronic device.

FIG. 17 shows another example of a partial cross-sectional view of an electronic device. The electronic device 1700 may be an example cross-section of the electronic device 100 of FIG. 1 or the electronic devices of any one of FIGS. 4A through 7C. The electronic device 1700 includes a housing 1710, a display assembly 1772 positioned within the housing, and a front cover 1752 positioned over the display assembly 1772.

The housing 1710 includes a conductive upper portion 1712, a conductive lower portion 1714, and a dielectric portion 1734. The dielectric portion 1734 is positioned within a slot 1730. The slot 1730 is defined at least in part by a surface 1723 of the upper portion 1712 and by a surface 1725 of the lower portion 1714. In embodiments, the upper portion 1712 of the housing 1710 defines at least a portion of an antenna element and the slot 1730 is configured to radiate at one or more desired frequencies, as previously discussed with respect to FIG. 1. The housing 1710, the conductive upper portion 1712, the conductive lower portion 1714, the dielectric portion 1734, and the slot 1730 may be formed of similar materials as the housing 110, the conductive upper portion 112, the conductive lower portion 114, the dielectric portion 134, and the slot 130 and that description is not repeated here.

In the example of FIG. 17, an electrically insulating element 1707 is disposed over an interior surface region 1727 of the lower portion 1714 of the housing 1710. The electrically insulating element 1707 also defines a bottom of the gap 1783. The electrically insulating element 1707 may ensure consistent and reliable operation of the antenna by providing an additional layer of non-conductive material, such as a dielectric material, within a void or gap in the enclosure in which an ingress of fluid may enter and become trapped. The electrically insulating element 1707 may maintain sufficient isolation between conductive and non-conductive components in order to ensure consistent or acceptable operation of the antenna in a similar fashion as previously described with respect to FIG. 16. The electrically insulating element 1707 may be bonded to the interior surface region 1727 and may be formed of similar materials as previously described with respect to the electrically insulating element 1607 and that description is not repeated here.

In the example of FIG. 17, the electrically insulating element 1707 protrudes above the level of the region of the surface 1725 that defines the slot 1730. The electrically insulating element 1707 therefore extends along a portion of an interior surface of the dielectric portion 1734. In some cases, the electrically insulating element 1707 can thus reduce or prevent a current along an unintended path between the lower portion 1714 of the housing and the upper portion 1712 and/or the connector 1786 and can maintain the performance of the wireless communication system when a conducting fluid is present within the gap 1783, in a similar fashion as previously discussed with respect to FIG. 16.

In the example of FIG. 17, the electrically insulating element 1707 is coupled to a support element 1708. The electrically insulating element 1707 and the support element 1708 together substantially fill the recess 1781 and, as previously discussed, protrude to some extent from the recess. In the example of FIG. 17, the electrically insulating element 1707 extends underneath and along a side of the support element 1708. In some cases, the electrically insulating element may be bonded to the support element 1708. The support element 1708 is coupled to the display frame 1758 by the coupling element 1709. The support element 1708 may have a machined or other dimensionally stable surface that is used to mount the coupling element 1709 and ensure a consistent display stack position within the device 1700.

The electrically insulating element 1707 and the support element 1708 may be formed from different materials. However, each of the electrically insulating element 1707 and the support element 1708 may be formed from an electrically insulating material, particularly in examples where the support element 1708 at least partially defines a bottom of the recess 1783. The electrically insulating element 1707 may be substantially non-porous, may be configured to inhibit significant diffusion of the fluid and/or its ions through the electrically insulating element, and in some cases may be formed from similar materials as previously described with respect to the electrically insulating element 1607. In some examples, the electrically insulating element 1707 may be formed from a curable adhesive material, which may be cured in place around the support element 1708. In a similar fashion as previously discussed with respect to FIG. 16, the bonding of the electrically insulating element 1707 to the interior surface region 1727 may be enhanced by surface modification of and/or formation of one or more retention features on the interior surface region 1727. Suitable materials for the support element 1708 include thermoset or thermoplastic polymer materials.

As shown in FIG. 17, a periphery of the display assembly 1772 is at least partially surrounded by a display frame 1758. The material(s) of the display frame 1758 may be similar to those previously described for the display frame 1658. The display frame 1758 may be coupled to the support element 1708 by a coupling element 1709, which may be an adhesive layer. The front cover 1752 may be coupled to the display frame 1758 with an adhesive. In additional examples, a periphery of the front cover 1752 may be at least partially surrounded by a cover frame, examples of which were previously shown in FIGS. 10A, 10B, and 12. The display assembly 1772 and the front cover 1752 may be similar in function and materials to the display assembly 172 and the front cover 152.

The electronic device 1700 includes a connector component 1786 that passes through the display frame 1758 and is conductively coupled to the display assembly 1772. In the example of FIG. 17, the display assembly 1772 includes an element 1776, which in some cases may be a display control circuit and the connector component 1786 is conductively coupled to the element 1776. For example, the connector component 1786 may be conductively coupled to the element 1776 by a conductive adhesive, by solder, or the like. The connector component 1786 may be formed of similar materials as those previously described for the connector components 986 and 988.

In some embodiments, the electronic device 1700 includes an additional connector component 1788 which may be similar in at least some aspects to the conductor component 988. The connector component 1788 is shown with dashed lines in FIG. 17 to represent a volume of the gap 1783 which may be occupied by the connector component 1788. The connector component 1788 does not completely fill the gap 1783 and may be configured so that it can (alternately) contact both the upper portion 1712 of the housing and the connector component 1786. The details previously provided with respect to the materials and the geometry of the connector component 988 are generally applicable herein.

Figure 18:
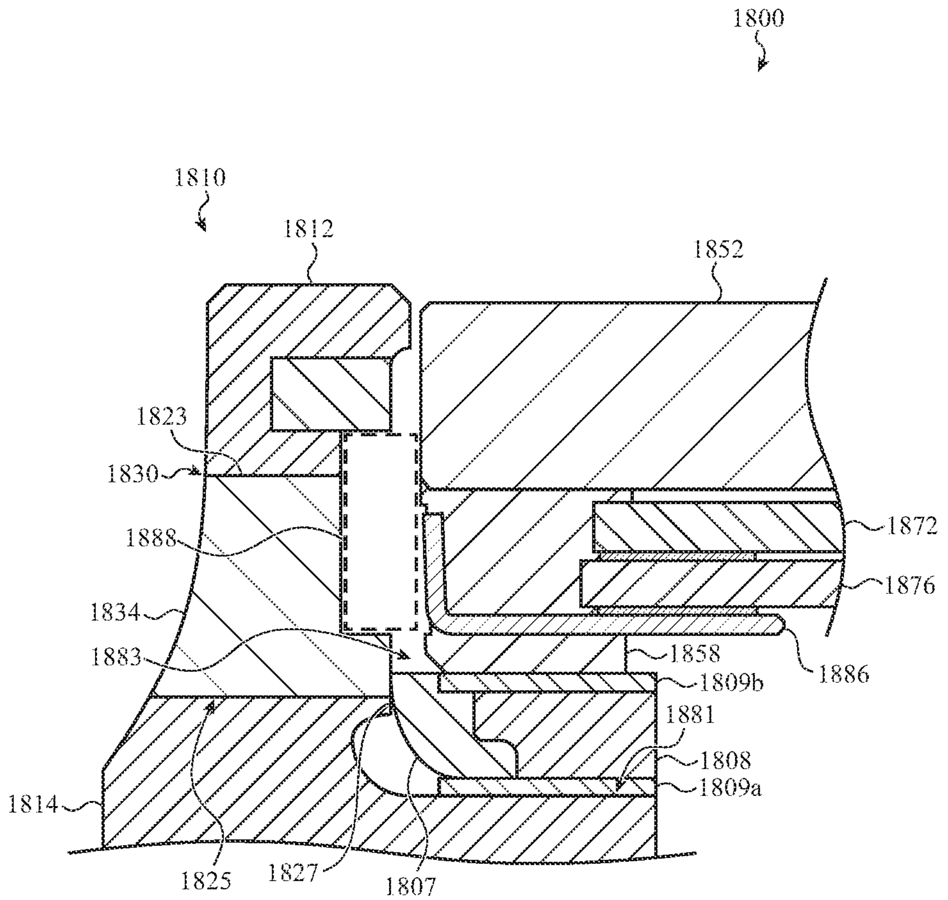
FIG. 18 shows another example of a partial cross-sectional view of an electronic device.

FIG. 18 shows another example of a partial cross-sectional view of an electronic device. The electronic device 1800 may be an example cross-section of the electronic device 100 of FIG. 1 or the electronic devices of any one of FIGS. 4A through 7C. The electronic device 1800 includes a housing 1810, a display assembly 1872 positioned within the housing, and a front cover 1852 positioned over the display assembly 1872.

The housing 1810 includes a conductive upper portion 1812, a conductive lower portion 1814, and a dielectric portion 1834. The dielectric portion 1834 is positioned within a slot 1830. The slot 1830 is defined at least in part by a surface 1823 of the upper portion 1812 and by a surface 1825 of the lower portion 1814. In embodiments, the upper portion 1812 of the housing 1810 defines at least a portion of an antenna element and the slot 1830 is configured to radiate at one or more desired frequencies, as previously discussed with respect to FIG. 1. The housing 1810, the conductive upper portion 1812, the conductive lower portion 1814, the dielectric portion 1834, and the slot 1830 may be formed of similar materials as the housing 110, the conductive upper portion 112, the conductive lower portion 114, the dielectric portion 134, and the slot 130 and that description is not repeated here.

In the example of FIG. 18, an electrically insulating element 1807 is interposed between the gap 1883 and an interior surface region 1827 of the lower portion 1814 of the housing. As shown in FIG. 18, the electrically insulating element 1807 is disposed over some of the interior surface region 1827 but is not disposed over all of the interior surface region 1827. In other words, the electrically insulating element 1807 only contacts part of the interior surface region 1827. The electrically insulating element 1807 also defines a bottom of the gap 1883. The electrically insulating element 1807 may ensure consistent and reliable operation of the antenna by providing an additional layer of non-conductive material, such as a dielectric material, within a void or gap in the enclosure in which an ingress of fluid may enter and become trapped. The electrically insulating element 1807 may maintain sufficient isolation between conductive and non-conductive components in order to ensure consistent or acceptable operation of the antenna in a similar fashion as previously discussed with respect to FIG. 16.

In the example of FIG. 18, the electrically insulating element 1807 protrudes above the level of the region of the surface 1825 that defines the slot 1830. The electrically insulating element 1807 therefore extends along a portion of an interior surface of the dielectric portion 1834. The electrically insulating element 1807 can thus reduce or prevent a current along an unintended path between the lower portion 1814 of the housing and the upper portion 1812 and/or the connector 1886 and can maintain the performance of the wireless communication system when a conducting fluid is present within the gap 1883, in a similar fashion as previously discussed with respect to FIGS. 16 and 17.

In the example of FIG. 18, the electrically insulating element 1807 is coupled to a support element 1808. The electrically insulating element 1807 and the support element 1808 together at least partially fill the recess 1881. In the example of FIG. 18, the electrically insulating element 1807 protrudes from the recess. The electrically insulating element 1807 and the support element 1808 are coupled to the lower portion 1814 by the coupling element 1809*a*. The support element 1808 is coupled to the display frame 1858 by the coupling element 1809*b*. The support element 1808 may ensure a consistent display stack position within the device 1800 in a similar fashion as previously described with respect to the support element 1708.

The electrically insulating element 1807 and the support element 1808 may be formed from different materials. However, each of the electrically insulating element 1807 and the support element 1808 may be formed from an electrically insulating material, particularly in examples where the support element 1808 at least partially defines a bottom of the gap 1883. In some cases, the electrically insulating element 1807 may be deformed to a suitable shape for providing a seal against the ingress of fluid upon coupling of the support element 1808 to the electrically insulating element 1807. In some cases, the electrically insulating element 1807 is deformed in response to an assembly process in which the display assembly and cover 1852 are inserted into the enclosure or housing assembly. Suitable materials for the electrically insulating element 1807 include elastomeric polymer materials that allow for a predicted amount of deflection while providing a seal to prevent further ingress of trapped liquid. Suitable materials for the electrically insulating element 1807 may also be substantially non-porous and configured to inhibit significant diffusion of the fluid and/or its ions through the electrically insulating element.

The support element 1808 may be formed from a similar material as previously described with respect to the support element 1708. In the example of FIG. 18, the support element 1808 is coupled to the lower element 1814 of the housing 1810 by the coupling element 1809*a* and is coupled to the display frame 1858 by the coupling element 1809*b*. The coupling elements 1809*a* and 1809*b* may be similar to the coupling elements 1609 and 1709 and that description is not repeated here.

As shown in FIG. 18, a periphery of the display assembly 1872 is at least partially surrounded by the display frame 1858. The material(s) of the display frame 1858 may be similar to those previously described for the display frame 1658. The front cover 1852 may be coupled to the display frame 1858 with an adhesive. In additional examples, a periphery of the front cover 1852 may be at least partially surrounded by a cover frame, examples of which were previously shown in FIGS. 10A, 10B, and 12. The display assembly 1872 and the front cover 1852 may be similar in function and materials to the display assembly 172 and the front cover 152.

The electronic device 1800 includes a connector component 1886 that passes through the display frame 1858 and is conductively coupled to the display assembly. In the example of FIG. 18, the display assembly 1872 includes an element 1876, which in some cases may be a display control circuit and the connector component 1886 is conductively coupled to the element 1876. For example, the connector component 1886 may be conductively coupled to the element 1876 as previously discussed with respect to FIG. 17. The connector component 1886 may be formed of similar materials as those previously described for the connector components 986 and 988.

In some embodiments, the electronic device 1800 includes an additional connector component 1888 which may be similar in at least some aspects to the conductor component 988. The connector component 1888 is shown with dashed lines in FIG. 18 to represent a volume of the gap 1883 which may be occupied by the connector component 1888. The connector component 1888 does not completely fill the gap 1883 and may be configured so that it can (alternately) contact both the upper portion 1812 of the housing and the connector component 1886. The details previously provided with respect to the materials and the geometry of the connector component 988 are generally applicable herein.

Figure 19:
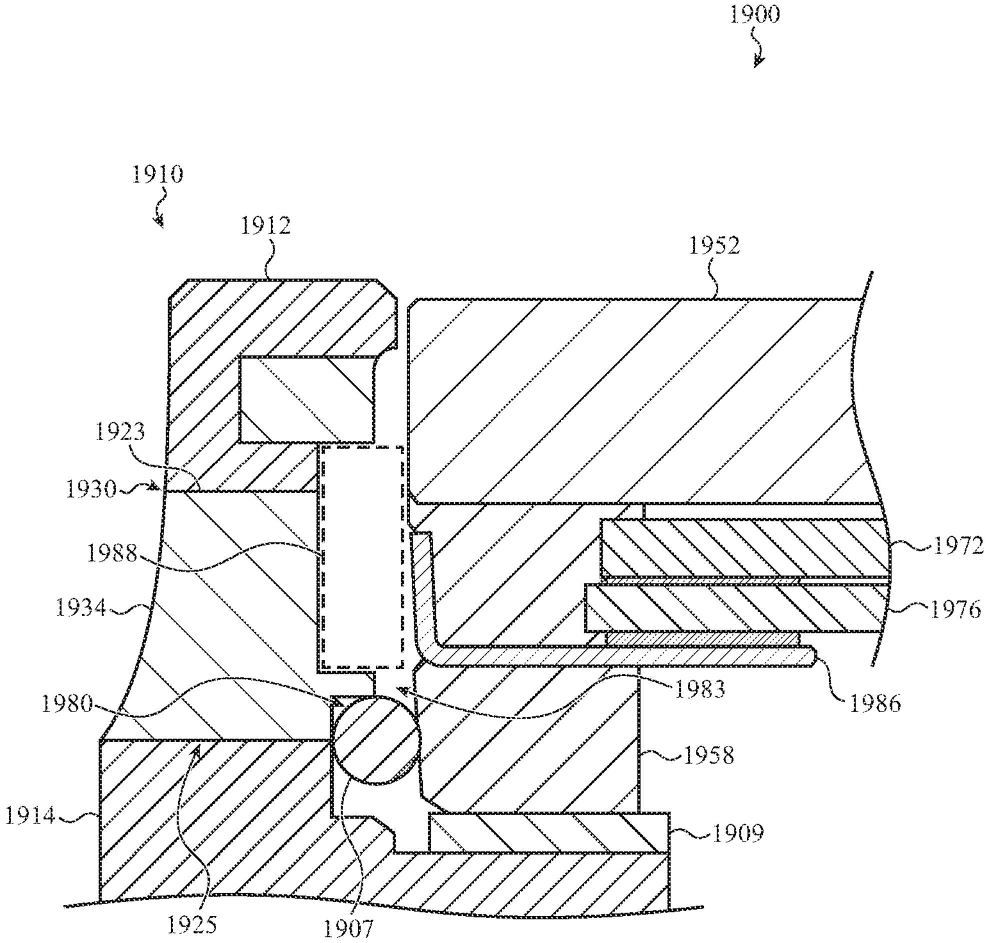
FIG. 19 shows another example of a partial cross-sectional view of an electronic device.

FIG. 19 shows another example of a partial cross-sectional view of an electronic device. The electronic device 1900 may be an example cross-section of the electronic device 100 of FIG. 1 or the electronic devices of any one of FIGS. 4A through 7C. The electronic device 1900 includes a housing 1910, a display assembly 1972 positioned within the housing, and a front cover 1952 positioned over the display assembly 1972.

The housing 1910 includes a conductive upper portion 1912, a conductive lower portion 1914, and a dielectric portion 1934. The dielectric portion 1934 is positioned within a slot 1930. The slot 1930 is defined at least in part by a surface 1923 of the upper portion 1912 and by a surface 1925 of the lower portion 1914. In embodiments, the upper portion 1912 of the housing 1910 defines at least a portion of an antenna element and the slot 1930 is configured to radiate at one or more desired frequencies, as previously discussed with respect to FIG. 1. The housing 1910, the conductive upper portion 1912, the conductive lower portion 1914, the dielectric portion 1934, and the slot 1930 may be formed of similar materials as the housing 110, the conductive upper portion 112, the conductive lower portion 114, the dielectric portion 134, and the slot 130 and that description is not repeated here.

In the example of FIG. 19, an electrically insulating element 1907 is used to form a mechanical seal. The electrically insulating element 1907 may ensure consistent and reliable operation of the antenna by preventing ingress of fluid into at least part of a void or gap of the enclosure. The electrically insulating element 1907 may thus maintain sufficient isolation between conductive and non-conductive components in order to ensure consistent or acceptable operation of the antenna. In some cases, the electrically insulating element 1907 reduces or prevents a current along an unintended path between the lower portion 1914 of the housing and the upper portion 1912 and/or the connector 1986. The electrically insulating element 1907 may be in the form of a gasket, such as an O-ring. The gap 1983 includes a groove portion 1980 and the electrically insulating element 1907 is positioned with the groove portion 1980. In the example of FIG. 19, the groove portion 1980 is defined by the lower portion 1914 of the housing, the dielectric portion 1934, and the dielectric frame 1958, but in additional examples the groove portion may be defined by different components of the electronic device. The electrically insulating element 1907 has a generally circular cross-section, but this example is not limiting and, in other examples, the electrically insulating element may have a square or rectangular cross-section. In some cases, the electrically insulating element 1907 is formed from an elastomeric polymer material, such as an acrylonitrile butadiene rubber, a chloroprene rubber, an ethylene-propylene diene rubber, or the like. The electrically insulating element 1907 may have similar properties to the materials previously described with respect to the electrically insulating element 1807.

As shown in FIG. 19, a periphery of the display assembly 1972 is at least partially surrounded by a display frame 1958. The material(s) of the display frame 1958 may be similar to those previously described for the display frame 1658. The front cover 1952 may be coupled to the display frame 1958 with an adhesive. In additional examples, a periphery of the front cover 1952 may be at least partially surrounded by a cover frame, examples of which were previously shown in FIGS. 10A, 10B, and 12. The display frame 1958 is coupled to the lower portion 1914 of the housing by the coupling element 1909. The coupling element 1909 may be similar to the coupling elements 1609 and 1709. The front cover 1952 may be coupled to the display frame 1958 with an adhesive. The display assembly 1972 and the front cover 1952 may be similar in function and materials to the display assembly 172 and the front cover 152.

The electronic device 1900 includes a connector component 1986 that passes through the display frame 1958 and is conductively coupled to display assembly. In the example of FIG. 19, the display assembly 1972 includes an element 1976, which in some cases may be a display control circuit and the connector component 1986 is conductively coupled to the element 1976. For example, the connector component 1986 may be conductively coupled to the element 1976 as previously discussed with respect to FIG. 17. The connector component 1986 may be formed of similar materials as those previously described for the connector components 986 and 988.

In some embodiments, the electronic device 1900 includes an additional connector component 1988 which may be similar in at least some aspects to the conductor component 988. The connector component 1988 is shown with dashed lines in FIG. 19 to represent a volume of the gap 1983 which may be occupied by the connector component 1988. The connector component 1988 does not completely fill the gap 1983 and may be configured so that it can (alternately) contact both the upper portion 1912 of the housing and the connector component 1986. The details previously provided with respect to the materials and the geometry of the connector component 988 are generally applicable herein.

Figure 20:
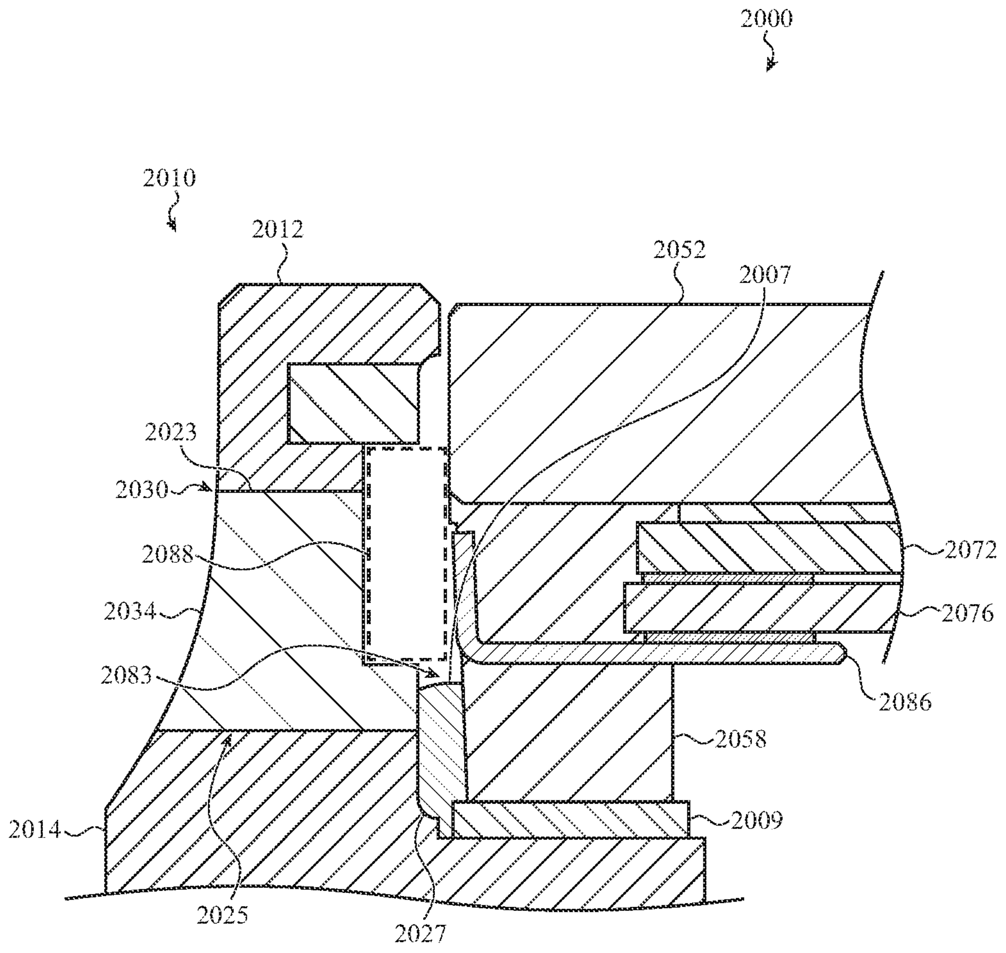
FIG. 20 shows another example of a partial cross-sectional view of an electronic device.

FIG. 20 shows another example of a partial cross-sectional view of an electronic device. The electronic device 2000 may be an example cross-section of the electronic device 100 of FIG. 1 or the electronic devices of any one of FIGS. 4A through 7C. The electronic device 2000 includes a housing 2010, a display assembly 2072 positioned within the housing, and a front cover 2052 positioned over the display assembly 2072.

The housing 2010 includes a conductive upper portion 2012, a conductive lower portion 2014, and a dielectric portion 2034. The dielectric portion 2034 is positioned within a slot 2030. The slot 2030 is defined at least in part by a surface 2023 of the upper portion 2012 and by a surface 2025 of the lower portion 2014. In embodiments, the upper portion 2012 of the housing 2010 defines at least a portion of an antenna element and the slot 2030 is configured to radiate at one or more desired frequencies, as previously discussed with respect to FIG. 1. The housing 2010, the conductive upper portion 2012, the conductive lower portion 2014, the dielectric portion 2034, and the slot 2030 may be formed of similar materials as the housing 110, the conductive upper portion 112, the conductive lower portion 114, the dielectric portion 134, and the slot 130 and that description is not repeated here.

In the example of FIG. 20, an electrically insulating element 2007 is interposed between the gap 2083 and an interior surface region 2027 of the lower portion 2014 of the housing. As shown in FIG. 20, the electrically insulating element 2007 is disposed over some of the interior surface region 2027 but is not disposed over all of the interior surface region 2027. In other words, the electrically insulating element 2007 only contacts part of the interior surface region 2027. In other examples, the electrically insulating element 2007 may completely cover (e.g., contact) an entirety of the interior surface region 2027 or may be positioned higher up in the device so that the electrically insulating element does not contact any of the interior surface region 2027. The electrically insulating element 2007 may ensure consistent and reliable operation of the antenna by providing an additional layer of non-conductive material, such as a dielectric material, within a void or gap in the enclosure in which an ingress of fluid may enter and become trapped. The electrically insulating element 2007 may maintain sufficient isolation between conductive and non-conductive components in order to ensure consistent or acceptable operation of the antenna in a similar fashion as previously discussed with respect to FIG. 16.

The electrically insulating element 2007 may be bonded to one or more portions of the housing and to one or more internal components of the device that define the gap 2083. In the example of FIG. 20, the electrically insulating element 2007 may be bonded to the lower portion 2014 of the housing, the dielectric portion 2034, and the display frame 2058. The electrically insulating element 2007 may be chemically bonded, mechanically bonded, or both to one or more elements of the electronic device. In some cases, the electrically insulating element 2007 may be formed from a curable adhesive material, such as a thermosetting resin adhesive (e.g., an epoxy-based resin). The curable adhesive material may be introduced into the gap 2083 between the front cover 2052 and the upper portion 2012 of the housing and then cured at a desired location.

As shown in FIG. 20, a periphery of the display assembly 2072 is at least partially surrounded by a display frame 2058. The material(s) of the display frame 2058 may be similar to those previously described for the display frame 1658. The display frame 2058 may be coupled to the lower portion 2014 of the housing by a coupling element 2009, which may be an adhesive layer. The coupling element 2009 may be similar to the coupling elements 1609 and 1709. The front cover 2052 may be coupled to the display frame 1658 with an adhesive. In additional examples, a periphery of the front cover 2052 may be at least partially surrounded by a cover frame, examples of which were previously shown in FIGS. 10A, 10B, and 12. The display assembly 2072 and the front cover 2052 may be similar in function and materials to the display assembly 172 and the front cover 152.

The electronic device 2000 includes a connector component 2086 that passes through the display frame 2058 and is conductively coupled to the display assembly 2072. For example, the connector component 2086 may be conductively coupled to the display assembly 2072 as previously discussed with respect to FIG. 17. In the example of FIG. 20, the display assembly 2072 includes an element 2076, which in some cases may be a display control circuit and the connector component 2086 is conductively coupled to the element 2076. For example, the connector component 2086 may be conductively coupled to the element 2076 as previously discussed with respect to FIG. 17. The connector component 2086 may be formed of similar materials as those previously described for the connector components 986 and 988.

In some embodiments, the electronic device 2000 includes an additional connector component 2088 which may be similar in at least some aspects to the conductor component 988. The connector component 2088 is shown with dashed lines in FIG. 20 to represent a volume of the gap 2083 which may be occupied by the connector component 2088. The connector component 2088 does not completely fill the gap 2083 and may be configured so that it can (alternately) contact both the upper portion 2012 of the housing and the connector component 2086. The details previously provided with respect to the materials and the geometry of the connector component 988 are generally applicable herein.

Figure 21:
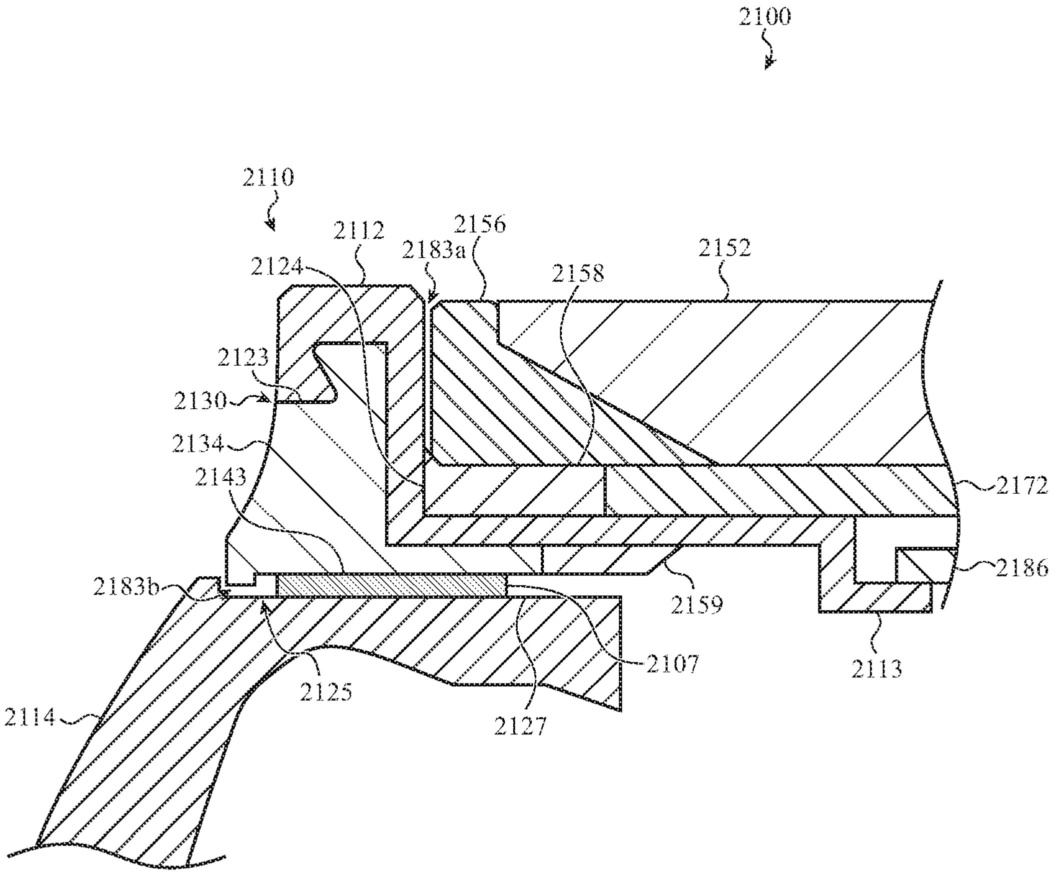
FIG. 21 shows another example of a partial cross-sectional view of an electronic device.

FIG. 21 shows another example of a partial cross-sectional view of an electronic device. The electronic device 2100 may be an example cross-section of the electronic device 100 of FIG. 1 or the electronic devices of any one of FIGS. 4A through 7C. The electronic device 2100 includes a housing 2110, a display assembly 2172 positioned within the housing, and a front cover 2152 positioned over the display assembly 2172.

The housing 2110 includes a conductive upper portion 2112, a conductive lower portion 2114, and a dielectric portion 2134. The dielectric portion 2134 is positioned within a slot 2130. The slot 2130 is defined at least in part by a surface 2123 of the upper portion 2112 and by a surface 2125 of the lower portion 2114. In embodiments, the upper portion 2112 of the housing 2110 defines at least a portion of an antenna element and the slot 2130 is configured to radiate at one or more desired frequencies, as previously discussed with respect to FIG. 1. The housing 2110, the conductive upper portion 2112, the conductive lower portion 2114, the dielectric portion 2134, and the slot 2130 may be formed of similar materials as the housing 110, the conductive upper portion 112, the conductive lower portion 114, the dielectric portion 134, and the slot 130 and that description is not repeated here.

In the example of FIG. 21, the upper portion 2112 of the housing defines a protruding portion 2113 that is conductively coupled to the display assembly. For example, the protruding portion 2113 may be conductively coupled to the display assembly 2172 by a conductive adhesive, by solder, or the like. The protruding portion extends from an interior surface 2124 of the upper portion and extends below the display frame 2158. The protruding portion may be coupled to the display frame 2158. The protruding portion 2113 also extends over the dielectric portion 2134 and may be coupled to the dielectric portion. In the example of FIG. 21, the protruding portion 2113 also extends over a support element 2159. The support element 2159 may be coupled to the protruding portion and also to the dielectric portion 2134. The support element 2159 may be formed of an electrically insulating material, such as the materials previously described with respect to the support elements 1708 and 1808.

The electronic device 2100 is configured to prevent ingress of fluid through each of two gaps, 2183*a* and 2183*b*. The upper portion 2112 of the housing 2110 and the cover frame 2156 partially define the gap 2183*a*. The display frame 2158 defines a bottom of the gap 2183*a*. The cover frame 2156 and the display frame 2158 may be configured to prevent ingress of a liquid that may be present within the gap 2183*a* towards the lower portion 2114 of the electronic device. The conductive lower portion 2114 and the dielectric portion 2134 of the housing define the gap 2183*b*. An electrically insulating element 2107 is positioned between the surface 2143 of the dielectric portion 2134 and the surface 2143 of the conductive lower portion 2114. The electrically insulating element 2107 may be configured to prevent ingress of a liquid that may be present in the gap 2183*b* towards the interior surface region 2127 of the conductive lower portion 2114. Suitable materials for the electrically insulating element 2107 include, but are not limited to, curable adhesive materials, such as a thermosetting resin adhesive (e.g., an epoxy-based resin adhesive). In some cases, the bonding of the electrically insulating element 2107 to one or more of the surfaces may be enhanced by surface modification of one or more of the surface 2143 or the surface 2125. Configuration of the electronic device 2100 to limit ingress of a conductive fluid into an interior region of the device may help maintain the performance of the wireless communication in a similar fashion as previously described with respect to at least FIGS. 16 and 19.

The display assembly 2172 includes an element 2186, which may be a display control circuit, and the protruding portion 2113 may be conductively coupled to the display control circuit as previously discussed with respect to FIG. 17. As shown in FIG. 21, a periphery of the display assembly 2172 is at least partially surrounded by a display frame 2158. The material(s) of the display frame 2158 may be similar to those previously described for the display frame 1658. A periphery of the front cover 2152 is at least partially surrounded by a cover frame 2156. In some cases, the cover frame is coupled to the display frame 2158, such as with an adhesive. The display assembly 2172 and the front cover 2152 may be similar in function and materials to the display assembly 172 and the front cover 152.

FIG. 22 shows a block diagram of a sample electronic device that can incorporate a housing as described herein. The schematic representation depicted in FIG. 22 may correspond to components of the devices depicted in FIGS. 1 to 21 as described above. However, FIG. 22 may also more generally represent other types of electronic devices including a housing as described herein.

In embodiments, an electronic device 2200 may include sensors 2212 to provide information regarding configuration and/or orientation of the electronic device in order to control the output of the display. For example, a portion of the display 2220 may be turned off, disabled, or put in a low energy state when all or part of the viewable area of the display 2220 is blocked or substantially obscured. As another example, the display 2220 may be adapted to rotate the display of graphical output based on changes in orientation of the device 2200 (e.g., 90 degrees or 180 degrees) in response to the device 2200 being rotated.

The electronic device 2200 also includes a processing unit 2202 operably connected with a computer-readable memory 2206. The processing unit 2202 may be operatively connected to the memory 2206 component via an electronic bus or bridge. The processing unit 2202 may be implemented as one or more computer processors or microcontrollers configured to perform operations in response to computer-readable instructions. The processing unit 2202 may include a central processing unit (CPU) of the device 2200. Additionally, and/or alternatively, the processing unit 2202 may include other electronic circuitry within the device 2200 including application specific integrated chips (ASIC) and other microcontroller devices. The processing unit 2202 may be configured to perform functionality described in the examples above.

The memory 2206 may include a variety of types of non-transitory computer-readable storage media, including, for example, read access memory (RAM), read-only memory (ROM), erasable programmable memory (e.g., EPROM and EEPROM), or flash memory. The memory 2206 is configured to store computer-readable instructions, sensor values, and other persistent software elements.

The electronic device 2200 may include control circuitry 2210. The control circuitry 2210 may be implemented in a single control unit and not necessarily as distinct electrical circuit elements. As used herein, "control unit" will be used synonymously with "control circuitry." The control circuitry 2210 may receive signals from the processing unit 2202 or from other elements of the electronic device 2200.

As shown in FIG. 22, the electronic device 2200 includes a battery 2214 that is configured to provide electrical power to the components of the electronic device 2200. The battery 2214 may include one or more power storage cells that are linked together to provide an internal supply of electrical power. The battery 2214 may be operatively coupled to power management circuitry that is configured to provide appropriate voltage and power levels for individual components or groups of components within the electronic device 2200. The battery 2214, via power management circuitry, may be configured to receive power from an external source, such as an alternating current power outlet. The battery 2214 may store received power so that the electronic device 2200 may operate without connection to an external power source for an extended period of time, which may range from several hours to several days.

In some embodiments, the electronic device 2200 includes one or more input devices 2216. The input device 2216 is a device that is configured to receive input from a user or the environment. The input device 2216 may include, for example, a push button, a touch-activated button, a capacitive touch sensor, a touch screen (e.g., a touch-sensitive display or a force-sensitive display), a capacitive touch button, dial, crown, or the like. In some embodiments, the input device 2216 may provide a dedicated or primary function, including, for example, a power button, volume buttons, home buttons, scroll wheels, and camera buttons.

The device 2200 may also include one or more sensors or sensor modules, such as a touch sensor 2204, a force sensor 2208, or other sensors 2212 such as a capacitive sensor, an accelerometer, a barometer, a gyroscope, a proximity sensor, a light sensor, or the like. In some cases, the device 2200 includes a sensor array (also referred to as a sensing array) which includes multiple sensors. For example, a sensor array associated with a protruding feature of a cover member may include an ambient light sensor, a Lidar sensor, and a microphone. The sensors may be operably coupled to processing circuitry. In some embodiments, the sensors may detect deformation and/or changes in configuration of the electronic device and be operably coupled to processing circuitry that controls the display based on the sensor signals. In some implementations, output from the sensors is used to reconfigure the display output to correspond to an orientation or folded/unfolded configuration or state of the device. Example sensors for this purpose include accelerometers, gyroscopes, magnetometers, and other similar types of position/orientation sensing devices. In addition, the sensors may include a microphone, acoustic sensor, light sensor (including ambient light, infrared (IR) light, ultraviolet (UV) light, optical facial recognition sensor, a depth measuring sensor (e.g., a time-of-flight sensor), a health monitoring sensor (e.g., an electrocardiogram (erg) sensor, a heart rate sensor, a photoplethysmogram (ppg) sensor, a pulse oximeter, a biometric sensor (e.g., a fingerprint sensor), or other types of sensing device.

In some embodiments, the electronic device 2200 includes one or more output devices configured to provide output to a user. The output device may include a display 2220 that renders visual information generated by the processing unit 2202. The output device may also include one or more speakers to provide audio output. The output device may also include one or more haptic devices that are configured to produce a haptic or tactile output along an exterior surface of the device 2200.

The display 2220 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 2220 is a liquid-crystal display or an electrophoretic ink display, the display 2220 may also include a backlight component that can be controlled to provide variable levels of display brightness. If the display 2220 is an organic light-emitting diode or an organic electroluminescent-type display, the brightness of the display 2220 may be controlled by modifying the electrical signals that are provided to display elements. In addition, information regarding configuration and/or orientation of the electronic device may be used to control the output of the display as described with respect to the sensors 2212. In some cases, the display is integrated with a touch and/or force sensor in order to detect touches and/or forces applied along an exterior surface of the device 2200.

The electronic device 2200 may also include a communication port 2218 that is configured to transmit and/or receive signals or electrical communication from an external or separate device. The communication port 2218 may be configured to couple to an external device via a cable, adaptor, or other type of electrical connector. In some embodiments, the communication port 2218 may be used to couple the electronic device 2200 to a host computer.

The electronic device 2200 may also include at least one accessory, such as a camera, a flash for the camera, or other such device. The camera may be part of a camera array or sensing array that may be connected to other parts of the electronic device 2200 such as the control circuitry 2210.

As used herein, the terms "about," "approximately," "substantially," "similar," and the like are used to account for relatively small variations, such as a variation of +/−10%, +/−5%, +/−2%, or +/−1%. In addition, use of the term "about" in reference to the endpoint of a range may signify a variation of +/−10%, +/−5%, +/−2%, or +/−1% of the endpoint value. In addition, disclosure of a range in which at least one endpoint is described as being "about" a specified value includes disclosure of the range in which the endpoint is equal to the specified value.

As used herein, the phrase "one or more of" or "at least one of" or "preceding a series of items, with the term "and" or "or" to separate any of the items, modifies the list as a whole, rather than each member of the list. The phrase "one or more of" or "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "one or more of A, B, and C" or "one or more of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
a display assembly comprising a first antenna element of a wireless communication system;
a cover positioned over the display assembly; and
a housing defining:
an upper conductive portion at least partly surrounding the cover and defining a first portion of the exterior of the housing, the upper conductive portion defining a second antenna element of the wireless communication system, the second antenna element operably coupled to the first antenna element;
a lower conductive portion defining a second portion of the exterior of the housing;
a conductive bridge portion electrically connecting the upper conductive portion and the lower conductive portion of the housing and defining a third portion of the exterior of the housing;
a slot defined between the upper conductive portion and the lower conductive portion of the housing; and
a dielectric portion positioned at least partly within the slot.

2. The electronic device of claim 1, wherein the wireless communication system is configured to resonate each of the first antenna element and the second antenna element.

3. The electronic device of claim 1, wherein the first antenna element is conductively coupled to the second antenna element.

4. The electronic device of claim 3, wherein the first antenna element is conductively coupled to the upper conductive portion of the housing at a plurality of discrete locations.

5. The electronic device of claim 1, wherein the lower conductive portion of the housing is conductively coupled to an electrical ground.

6. The electronic device of claim 1, wherein:
the exterior of the housing includes four side surfaces;
each of the four side surfaces defines a region of the slot; and
the conductive bridge portion is located on one of the four side surfaces.

7. The electronic device of claim 1, wherein:
the electronic device is a wearable device;
the slot has a length ranging from 17 mm to 150 mm; and
the slot is configured to radiate in a frequency range from 1 GHz to 9 GHz.

8. An electronic device comprising:
a display assembly comprising a display component and a first antenna element;
a front cover positioned over the display assembly;
a housing comprising:
a housing member formed from a conductive material, the housing member defining:
a first portion at least partly surrounding the front cover and defining:
an upper portion of a side surface of the housing; and
a second antenna element operably coupled to the first antenna element; and
a second portion defining a lower portion of the side surface of the housing;
a third portion extending from the first portion to the second portion and defining an intermediate portion of the side surface of the housing; and
a dielectric member positioned at least partially within a slot defined at least in part by the first, the second, and the third portions of the housing member; and
a wireless communication circuit operably coupled to the first antenna element and the second antenna element and configured to transmit wireless signals along a region of the housing including the slot.

9. The electronic device of claim 8, wherein:
the first antenna element is defined by a conductive layer of the display component and is configured to resonate at a first frequency; and
the conductive layer is conductively coupled to the first portion of the housing member.

10. The electronic device of claim 9, wherein:
the second portion of the housing member is coupled to an electrical ground; and
the electronic device further comprises a switchable ground conductively coupled to the first portion of the housing member.

11. The electronic device of claim 8, wherein at least one of the first portion or the second portion of the housing member defines a retention feature that interlocks with the dielectric member.

12. The electronic device of claim 8, wherein:
the slot is a first slot, and the dielectric member is a first dielectric member;
the housing member further defines a second slot positioned between the first portion and the second portion of the housing member; and
the housing further comprises a second dielectric member positioned within the second slot.

13. The electronic device of claim 8, wherein:
the electronic device is a watch; and
the watch comprises:
a sensing panel; and
a rear cover positioned over the sensing panel and coupled to the lower portion of the housing member.

14. The electronic device of claim 13, wherein:
the first, the second, and the third portions of the housing member are formed from a titanium-based alloy; and
the dielectric member is formed from a polymer material molded into the slot defined between the first and the second portions of the housing.

15. An electronic device comprising:
a display assembly comprising a circuit assembly comprising a first antenna element of a wireless communication system;
a housing defining:
a first conductive portion defining a first portion of an exterior surface of the housing and a second antenna element of the wireless communication system, the second antenna element conductively coupled to the first antenna element;
a second conductive portion defining a second portion of the exterior surface;
a third conductive portion connecting the first and the second conductive portions and defining a third portion of the exterior surface, the first, the second, and the third conductive portions of the housing at least partially defining a slot; and a dielectric portion positioned at least partially within the slot and defining a fourth portion of the exterior surface; and a cover positioned over the display assembly.

16. The electronic device of claim 15, wherein:

the slot is configured to operate as a radiating element of the wireless communication system; and the second conductive portion is conductively coupled to an electrical ground.

17. The electronic device of claim 16, wherein the housing defines four sides and the slot extends across three of the four sides.

18. The electronic device of claim 16, wherein an edge of the first conductive portion is separated from an edge of the second conductive portion by an average distance ranging from 1 mm to 2 mm.

19. The electronic device of claim 16, wherein the dielectric portion of the housing is formed from a material having a dielectric constant ranging from 2 to 4.

20. The electronic device of claim 15, further comprising a display frame at least partially surrounding the display assembly, wherein:

an outer surface of the display frame and an interior surface of at least one of the first conductive portion or the dielectric portion at least partially defines a gap;

at least one connector component extends into the gap and operatively couples the first antenna element to the second antenna element; and the electronic device further comprises an electrically insulating element interposed between the at least one connector component and an interior surface of the second conductive portion.

* * * * *